(12) United States Patent
Yamakita et al.

(10) Patent No.: US 6,285,780 B1
(45) Date of Patent: *Sep. 4, 2001

(54) APPARATUS FOR IDENTIFYING INDIVIDUAL ANIMALS AND IMAGE PROCESSING METHOD

(75) Inventors: Osamu Yamakita; Yuji Kuno, both of Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,073

(22) Filed: Mar. 27, 1998

(30) Foreign Application Priority Data

Mar. 28, 1997 (JP) .................................. 9-094548
Mar. 28, 1997 (JP) .................................. 9-094549
Nov. 28, 1997 (JP) .................................. 9-343840

(51) Int. Cl.$^7$ ................................................. G06K 9/00
(52) U.S. Cl. ........................................... 382/110; 382/117
(58) Field of Search ................................. 382/110, 117, 382/115, 100; 351/205, 206, 211

(56) References Cited

U.S. PATENT DOCUMENTS 4,641,349 * 2/1987 Flom et al. ........................... 382/2
6,081,607 * 6/2000 Mori et al. ........................... 382/117

OTHER PUBLICATIONS

Japan Publication No. F–1936, pp. 152–165, and English translation.

* cited by examiner

Primary Examiner—Bhavesh Mehta
(74) Attorney, Agent, or Firm—Venable; Robert J. Frank; Allen Wood

(57) ABSTRACT

An individual animal identification apparatus has an eye region image pick-up unit for obtaining an input image by taking a picture of an eye, including an iridial granule, of an animal to be registered and identified, a geometric normalizer for performing a coordinate transformation process by using a specified parameter to move the iridial granule region of the input image onto predetermined coordinates, a feature extractor for extracting the feature of the normalized iridial granule, a dictionary memory for registering data on the features of the iridial granule regions corresponding to animals to be registered, the data having been extracted by the feature extractor, and a collator for checking whether or not an animal to be identified has been registered by comparing data on the feature of the iridial granule region corresponding to the animal under identification, the feature having been extracted by the feature extractor, with the feature data registered in the dictionary memory.

19 Claims, 28 Drawing Sheets

Fig. 17

| ID | ID INFORMATION OF HORSES / CAMERA ANGLES | | | | | | | | | | | | | | | FEATURE DATA |
|----|---|---|---|---|---|---|---|---|---|---|---|---|---|---|---|---|
| | α | 0 | | | | 0 | | | | 10 | | | | A | | |
| | θ | 0 | 10 | 20 | B | 0 | 10 | 20 | B | --- | 0 | 10 | 20 | 0 | 10 | 20 | B |
| 1 | | | | | | | | | | | | | | | | | |
| 2 | | | | | | | | | | | | | | | | | |
| 3 | | | | | | | | | | | | | | | | | |
| --- | | | | | | | | | | | | | | | | | |
| C | | | | | | | | | | | | | | | | | |

*Fig. 19*

| ID INFORMATION | IRIDIAL GRANULE FEATURE DATA | REPRESENTATIVE DICTIONARY MARK | HISTORY MARK |
|---|---|---|---|
| 1 | | — | — |
| 2 | | ○ | ○ |
| 3 | | — | ○ |
| ---- | --- | ---- | ---- |

ID INFORMATION OF HORSE

Fig. 24

| | |
|---|---|
| (a) | $X_k = \frac{1}{N}\sum_{n=0}^{N-1} x_i W^{kn}$ |
| (b) | $W = e^{-j\frac{2\pi}{N}kn} = \cos\left(\frac{2\pi}{N}kn\right) - j\sin\left(\frac{2\pi}{N}kn\right)$ |
| (c) | $A_k = \sqrt{R(X_k)^2 + I(X_k)^2}$ |
| (d) | $D = \frac{1}{M}\sum_{i=1}^{M} |f_i - g_{i+m}|$ |

| (1) | $y = \dfrac{S_{xy}}{S_{xx}}(x - x_c) + y_c$ |
| --- | --- |
| (2) | $S_{xx} = \dfrac{1}{N_Q}\sum_{x}^{Q}(x - x_c)^2$ |
| (3) | $S_{xy} = \dfrac{1}{N_Q}\sum_{x}^{Q}\sum_{y}^{Q}(x - x_c)(y - y_c)$ |
| (4) | $y = -\dfrac{S_{xx}}{S_{xy}}(x - x_c) + y_c$ |
| (5) | $R(u,v) = \sum_{x,y}^{L} P_{x+u,\,y+v}$ |
| (6) | $x_g = \cos\theta\,(X_G - X_C) - \sin\theta\,(Y_G - X_C)/A$ |
| (7) | $y_g = \sin\theta\,(X_G - X_C) + \cos\theta\,(Y_G - X_C)/B$ |
| (8) | $\theta = \arctan\left(\dfrac{S_{xy}}{S_{xx}}\right)$ |
| (9) | $d = \sqrt{(x_1 - x_2)^2 + (y_1 - y_2)^2}$ |

APPARATUS FOR IDENTIFYING INDIVIDUAL ANIMALS AND IMAGE PROCESSING METHOD

BACKGROUND OF THE INVENTION

1. Field of the Invention

The present invention relates to an individual animal identification apparatus for storing data for identification of individual animals and collating the features of the animals with stored data in organizations which individually manage animals, such as horses (for horse racing) or cattle (for livestock farming) and so on.

2. Prior Art

The identification of thoroughbreds in the racing tracks, auctions or breeding farms is done under the leadership of pedigree management organizations. The current identification method in Japan is by colors, white marks of the legs and the head. There are other methods, such as by blood types, brands or tattoos, which are used in some countries of the world. (References: "Uma no Chishiki" (Knowledge about the Horse) 11-3, "Uma no Miwakekata" (How to Identify Horses) pp. 153–154)

In identifying cattle, identification tags, such as collars or ear tags, brands or tattoos have been adopted in stock farms in general. An identification method of animals currently drawing attention is by the use of a micro chip (MC). A micro chip in this case is encapsulated in a glass tube, and buried in the body of an animal by using some injecting means, such as a syringe, and when an animal is identified, the buried micro chip is scanned with a non-contact detector to detect an output signal from which ID information of the animal is obtained.

In the above-mentioned prior art, there is a problem which must be solved. Identification by the colors, white marks, and whorls tends to be incomplete with horses without salient features or horses with similar features. Furthermore, there are possibilities that the brands or tattoos wear off or are falsified. It has been desired that those methods be improved partly from a viewpoint of prevention of cruelty to animals, such as, causing a pain or a festering wound to the animals. The identification by blood types is accurate, but the process takes time until a decision is made, and is expensive.

The use of identification plates entails the risk of being lost or stolen. As in the case of horses, brands or tattoos made on animals have possibilities of wearing off or being falsified. Even if falsification is found, it is difficult to prove where the animal belongs.

The MC method has advantages of semi-permanent effectiveness once a micro chip is planted in the body of an animal and also high convenience. This MC method, however, involves many problems: the workability of the MC and an acute pain during implantation, the local reactions, such as swelling, oppressive pain, festering, hypokinesia of the animal, clinical abnormality, the MC's tendency to move in the animal body, the operability, stability and reliability of the detector, and the variation of detection sensitivity. Many people have shown opposition to the adoption of the MC method from nothing other than the standpoint of preventing cruelty to animals. So, there has been demand for a more convenient identification method to replace the MC method.

SUMMARY OF THE INVENTION

To solve the above problems, the present invention adopts the following arrangements.

<Arrangement 1>

An individual animal identification apparatus comprising: an eye region image pick-up unit for obtaining an input image by taking a picture of an eye, including the iridial granule, of an animal to be registered and identified; a geometric normalizer for performing a coordinate transformation process by using a specified parameter to move the iridial granule region of the input image onto predetermined coordinates; a feature extractor for extracting the feature of the normalized iridial granule; a dictionary memory for recording data on the feature of the iridial granule regions corresponding to animals to be registered, namely, the data having been extracted by the feature extractor; and a collator for checking whether or not an animal to be identified has been registered by comparing data on the feature of the iridial granule region corresponding to the animal under identification, the feature having been extracted by the feature extractor, with the feature data registered in the dictionary memory.

<Arrangement 2>

An individual animal identification apparatus according to Arrangement 1, wherein the geometric normalizer decides the position of the center of gravity of the iridial granule region as a predetermined parameter and performs a coordinate transformation process by using this parameter.

<Arrangement 3>

An individual animal identification apparatus according to Arrangement 1, wherein the geometric normalizer decides the inclination of a principal component of the iridial granule region to a reference line as the parameter and performs a coordinate transformation process by using this parameter.

<Arrangement 4>

An individual animal identification apparatus according to Arrangement 1, wherein the geometric normalizer decides a longitudinal length of the iridial granule region as the parameter and performs a coordinate transformation by using this parameter.

<Arrangement 5>

An individual animal identification apparatus according to Arrangement 1, further comprising a density normalizer for calculating a mean value of the density of the iridial granule region in connection with the contrast, and normalizing the density of the iridial granule region on the basis of the mean value.

<Arrangement 6>

An individual animal identification apparatus according to Arrangement 5, wherein the density normalizer calculates a standard deviation of the density of the iridial granule region by regarding the standard deviation as the contrast, and normalizes the density by using the standard deviation and the mean value.

<Arrangement 7>

In an individual animal identification apparatus according to Arrangement 1, the feature extractor divides an iridial granule region into a plurality of subdivisions, converts the subdivisions into compressed regions each having a mean value of pixel densities, and uses the density values of the compressed regions as data on the feature.

<Arrangement 8>

In an individual animal identification apparatus according to Arrangements 1 and 7, the collator performs an arithmetic operation on differences between the density values of the compressed regions extracted by the feature extractor and the density values of the compressed regions registered in the dictionary memory, and uses an obtained difference as a difference for identification of the animal.

<Arrangement 9>

An individual animal identification apparatus according to Arrangement 8, wherein the collator calculates a mean density difference of the compressed regions by dividing the total sum of the density values by the number of the compressed regions, and uses the mean density difference as a difference.

<Arrangement 10>

An individual animal identification apparatus according to Arrangement 1, further comprising a plurality of geometric normalizers, wherein the geometric normalizers respectively perform a coordinate transformation process on the iridial granule region by using a parameter which is different from the parameters used by the other normalizers.

<Arrangement 11>

An individual animal identification apparatus comprising:

an eye region image pick-up unit for capturing an image of an eye, including an iridial granule, of an animal at camera angles to obtain an input image, the animal to be registered in a registration mode of the apparatus while identified in an identification mode of the apparatus;

a camera angle determining section for deriving data on the camera angles;

a feature extracting section for extracting a feature of a region of the iridial granule from the input image to derive corresponding feature data;

a dictionary memory for, in the registration mode, registering the feature data of the animal to be registered along with the corresponding camera angle data; and a collating section for, in the identification mode, collating the feature data of the animal to be identified, derived at the feature extracting section, with the feature data registered in the dictionary memory during the registration mode and having the camera angle data corresponding to the camera angle data of the feature data of the animal to be identified, so as to determine whether the animal to be identified is registered in the dictionary memory.

<Arrangement 12>

An individual animal identification apparatus comprising:

an eye region image pick-up unit for capturing an image of an eye, including an iridial granule, of an animal to obtain an input image, the animal to be registered in a registration mode of the apparatus while identified in an identification mode of the apparatus;

a feature extracting section for extracting a feature of a region of the iridial granule from the input image to derive corresponding feature data;

a data classifying means for, in the registration mode, classifying a plurality of the feature data, received from the feature extracting section, of the animal to be registered into a plurality of groups based on image pick-up conditions, respectively;

a representative dictionary setting means for, in the registration mode, determining representative feature data in each of the groups and registering in a dictionary memory the representative feature data determined in each of the groups; and a collating section for, in the identification mode, collating the feature data of the animal to be identified, derived at the feature extracting section, with each of the representative feature data registered in the dictionary memory during the registration mode, so as to determine whether the animal to be identified is registered in the dictionary memory.

<Arrangement 13>

An individual animal identification apparatus according to Arrangement 12, wherein the data classifying means determines a plurality of temporary representative feature data among the plurality of the feature data received from the feature extracting section and classifies the plurality of the feature data into the groups each having one of the temporary representative feature data and those feature data having small difference degrees relative to the one of the temporary representative feature data.

<Arrangement 14>

An individual animal identification apparatus according to Arrangement 12, wherein the representative dictionary setting means derives mean pixel values of the feature data in each of the groups and determines, as the representative feature data, the feature data having pixel values which are the closest to the mean pixel values.

<Arrangement 15>

An individual animal identification apparatus comprising:

an eye region image pick-up unit for capturing an image of an eye, including an iridial granule, of an animal to obtain an input image, the animal to be registered in a registration mode of the apparatus while identified in an identification mode of the apparatus;

a feature extracting section for extracting a feature of a region of the iridial granule from the input image to derive corresponding feature data;

a region selecting means for, in the registration mode, selecting a stable identification region of the iridial granule based on a plurality of the feature data, received from the feature extracting section, of the animal to be registered;

a dictionary preparing means for, in the registration mode, producing regional feature data of the stable identification region and registering the regional feature data in a dictionary memory; and a collating section for, in the identification mode, collating the feature data on an identification region of the iridial granule of the animal to be identified, derived at the feature extracting section, with the regional feature data registered in the dictionary memory during the registration mode, so as to determine whether the animal to be identified is registered in the dictionary memory.

<Arrangement 16>

An individual animal identification apparatus comprising:

an eye region image pick-up unit for capturing an image of an eye, including an iridial granule, of an animal to obtain an input image, the animal to be registered in a registration mode of the apparatus while identified in an identification mode of the apparatus;

an iridial granule segmenting section for extracting contour data of the iridial granule from the input image;

a memory section for, in the registration mode, registering the contour data, received from the iridial granule segmenting section, of the animal to be registered;

a mean difference calculating section for, in the identification mode, deriving a mean difference value between the contour data, received from the iridial granule segmenting section, of the animal to be identified and each of a plurality of the contour data registered in the memory section; and a collating section for, in the identification mode, selecting the registered contour data whose mean difference value is the smallest and comparing the smallest mean difference value with a predetermined value, so as to determine whether the animal to be identified is registered in the memory section.

<Arrangement 17>

An individual animal identification apparatus comprising:

an eye region image pick-up unit for capturing an image of an eye, including an iridial granule, of an animal to obtain an input image, the animal to be registered in a registration mode of the apparatus while identified in an identification mode of the apparatus;

an iridial granule segmenting section for extracting contour data of the iridial granule from the input image;

a frequency conversion section for applying frequency conversion to the contour data to produce frequency data;

a memory section for, in the registration mode, registering the frequency data, received from the frequency conversion section, of the animal to be registered;

a mean difference calculating section for, in the identification mode, deriving a mean difference value between the frequency data, received from the frequency conversion section, of the animal to be identified and each of a plurality of the frequency data registered in the memory section; and a collating section for, in the identification mode, selecting the registered frequency data whose mean difference value is the smallest and comparing the smallest mean difference value with a predetermined value, so as to determine whether the animal to be identified is registered in the memory section.

<Arrangement 18>

An individual animal identification apparatus comprising:

an eye region image pick-up unit for capturing an image of an eye, including an iridial granule, of an animal to obtain an input image, the animal to be registered in a registration mode of the apparatus while identified in an identification mode of the apparatus;

an iridial granule segmenting section for extracting contour data of the iridial granule from the input image;

a frequency conversion section for applying frequency conversion to the contour data to produce frequency data;

a memory section for, in the registration mode, registering the contour data and the frequency data received from the iridial granule segmenting section and the frequency conversion section, respectively;

a mean difference calculating section for, in the identification mode, deriving a contour data mean difference value between the contour data received from the iridial granule segmenting section and each of a plurality of the contour data registered in the memory section, and further deriving a frequency data mean difference value between the frequency data received from the frequency conversion section and each of a plurality of the frequency data registered in the memory section; and a collating section for, in the identification mode, selecting the registered contour data whose contour data mean difference value is the smallest among the contour data mean difference values and further selecting the registered frequency data whose frequency data mean difference value is the smallest among the frequency data mean difference values, the collating section determining that the animal to be identified is registered in the memory section when the selected contour data and the selected frequency data represent the same animal and when each of the smallest mean difference values is smaller than a predetermined value.

<Arrangement 19>

An individual animal identification apparatus comprising:

an eye region image pick-up unit for capturing an image of an eye, including an iridial granule, of an animal to obtain an input image, the animal to be registered in a registration mode of the apparatus while identified in an identification mode of the apparatus;

a position data output means for outputting position data representing a position of the iridial granule relative to a particular position in a region of the eye in the input image;

a memory section for, in the registration mode, registering the position data, received from the position data output means, of the animal to be registered;

a distance calculating section for, in the identification mode, deriving a position difference between the position data, received from the position data output means, of the animal to be identified and each of a plurality of the position data registered in the memory section; and a collating section for, in the identification mode, selecting the registered position data whose position difference is the smallest and comparing the smallest position difference with a predetermined value, so as to determine whether the animal to be identified is registered in the memory section.

<Arrangement 20>

An individual animal identification apparatus according to Arrangement 19, wherein the position data output means comprises:

a region extracting section for extracting a region of the iridial granule from the input image, deriving a position of the center of gravity of the iridial granule region as the position of the iridial granule and further deriving a position of the center of gravity of a pupil in the eye region as the particular position; and a center of gravity coordinate calculating section for deriving a distance from the position of the center of gravity of the pupil to the position of the center of gravity of the iridial granule region as the position data.

<Arrangement 21>

An individual animal identification apparatus according to Arrangement 20, further comprising:

a shadow removing section for accumulating pixel values along a contour of the iridial granule region extracted at the region extracting section, and determining a contour represented by an accumulated darkest pixel value to be a new contour of the iridial granule region, wherein the center of gravity coordinate calculating section corrects the position of the center of gravity of the iridial granule region corresponding to the new contour so as to derive the position data.

<Arrangement 22>

An image processing method for removing a shadow region included in a region of a three dimensional object in an input image obtained by capturing an image of the three dimensional object, the method comprising:

accumulating pixel values along a contour of the three dimensional object region; and determining a contour represented by an accumulated darkest pixel value to be a new contour of the three dimensional object region.

BRIEF DESCRIPTION OF THE DRAWINGS

FIG. 17 is a structural diagram showing an example of a data storing format of a dictionary memory;

FIG. 19 is a structural diagram of a dictionary memory;

FIG. 24 is an explanatory diagram of calculation executed at a frequency conversion section and a mean difference calculating section in the sixth embodiment;

DESCRIPTION OF THE PREFERRED EMBODIMENTS

Preferred embodiments of the present invention will be described in the following.

<Embodiment 1>

This embodied example of the present invention is an individual animal identification apparatus having data registering and collating functions for registering data on iridial granules and collating animals with registered data in organizations which need to individually manage animals like horses (for horse racing) and cows (for livestock farming) and so on. This apparatus will be described with reference to the case of a horse as the animal to be identified.

Before entering into the description of the apparatus, mention will first be made of the construction of a horse's eye and so on.

Figure 2:
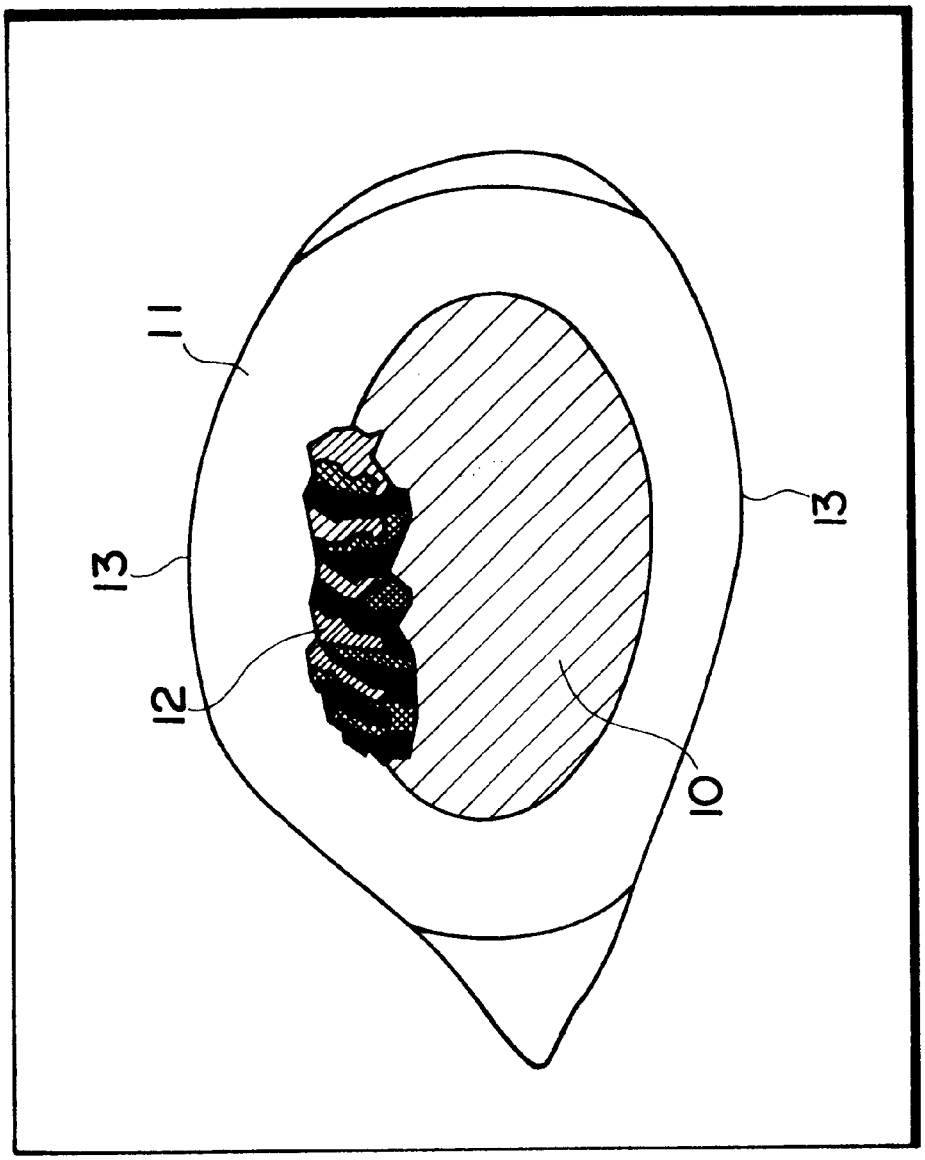
FIG. 2 is an explanatory diagram of an image of a horse's eye.

FIG. 2 is an explanatory diagram of an image of a horse's eye, drawn as a front view in elevation.

A horse's eye includes a pupil 10, an iris 11, and an iridial granule 12, which are located between upper and lower eyelids. A marked difference of a horse's eye from a human being's eye is that the pupil 10 is elliptic and it has a peculiar iridial granule 12 like the remnants do.

External light goes through the pupil 10 and reaches the retina at the end of the eye ball. The iris 11 is a muscle that surrounds the pupil 10 to contract or enlarge the pupil 10, and controls the quantity of light incident to the pupil 10. The iridial granule 12 is located between the iris 11 and the pupil 10, and takes the form of a protuberant train of granules. The iridial granule 12 is dark with much melanin and is said to be able to absorb brilliant light in the daytime even when the iris 11 contracts.

This iridial granule 12 is a three-dimensional body of various sizes and shapes, and has tiny wrinkles or unevenness on its surface. It has not been widely known that there are individual differences in the shape of iridial granule in such a way that the iridial granule differs with different horses and even with the left and right eyes of each horse. The present invention has been made on the basis of this finding, and can be used to identify an individual horse under examination by collating data on the iridial granule 12 from a picture taken of this horse with reference data on the iridial granules 12 previously stored by taking pictures of the eyes of the registered horses.

Referring back to FIG. 1, the composition of each component of the apparatus according to the present invention will be described.

Figure 1:
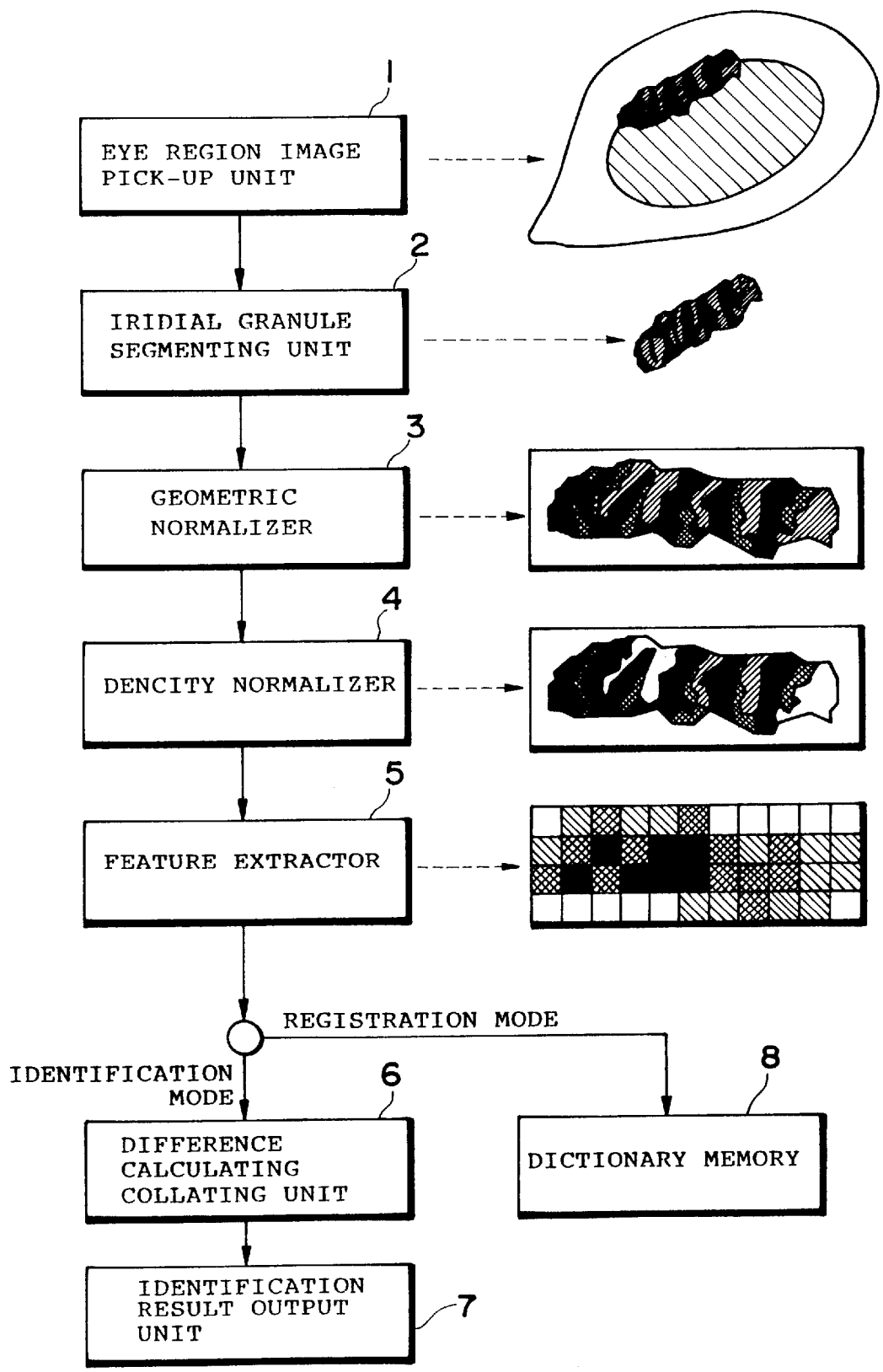
FIG. 1 is a block diagram of an apparatus in a first embodiment.

FIG. 1 shows the composition of a first embodiment of the individual animal identification apparatus using the iridial granule. This apparatus comprises an eye region image pick-up unit 1, an iridial granule segmenting section 2, a geometric normalizer 3, a density normalizer 4, a feature extractor 5, a difference calculating and collating section 6, an identification result output section 7, and a dictionary memory 8. This apparatus is operated in two modes: the "registration mode" for registering images of the iridial granule and ID information, and the "identification mode" for identifying a horse by comparing an input image with the image stored in the dictionary. The dictionary contains iridial granule data on respective horses. In this apparatus, the eye region image pick-up unit 1, the iridial granule segmenting section 2, the geometric normalizer 3, the density normalizer 4, and the feature extractor 5 are used in common in the two modes. However, the difference calculator and collator 6, and the identification result output section 7 are used only in the identification mode. Each component section will be described in the following.

The eye region image pick-up unit 1 is formed by an image input portion, a CCD video camera for example, and an illumination unit, and obtains an image of a horse's eye in the form of a signal. The image input portion takes an image of a horse's eye with a camera, and coverts analog optical information about an image of a horse's eye into a digital electric signal. A light source emitting a light of a wavelength which is hard for animals to sense, such as a red light, or a near infrared or an infrared ray, is used as the illumination unit to take an image of a horse's eye in sharp contrast with a specified light quantity without causing the horse to make a sudden movement in response to a dazzling light.

The iridial granule segmenting section 2, when receiving a general image of a horse's eye from the eye region image pick-up unit 1, detects the upper and lower fringes of the iridial granule region from the received image, and segments only the iridial granule region, and also calculates the dimension of the horizontal width of the iridial granule region from the left and right ends of it.

The geometric normalizer 3 measures the position, inclination and size of the iridial granule image, and normalizes them to specified values by coordinate transformation.

The density normalizer 4 measures the brightness and contrast of the density of the iridial granule image, and normalizes them to specified values.

The feature extractor 5 extracts and encodes the feature of the iridial granule image. Coded iridial granule data is registered in the dictionary memory 8 along with ID information representing the horse's name and the left or right eye in the registration mode, but this coded data is transferred to the difference calculator and collator 6 in the identification mode. The "dictionary" includes ID information and iridial granule data registered in the dictionary memory 8.

The difference calculator and collator 6 is a processing unit which receives iridial granule data from the feature extractor 5, and collates this data with stored data on the recorded horses in the dictionary memory 8 to thereby determine the identity of the horse.

The identification result output section 7 receives output results from the difference calculator and collator 6, and outputs ID information of the identified horse.

The dictionary memory 8 holds ID information and iridial granule data of horses. The dictionary memory 8 additionally stores ID information and iridial granule data on horses, which are newly recorded, in the registration mode, and supplies ID information and iridial granule data on recorded horses to the difference calculator and collator 6 in the identification mode.

<Operation of the Apparatus in Embodiment 1>

Description will first be made of the operation of the eye region image pick-up unit 1. An image is taken of the eye of a horse. The eye of a horse is illuminated by an illumination unit having a light source of a wavelength of a red light, a near infrared ray or an infrared ray, and an image of the eye is made by an image input unit, such as a CCD video camera. The image input unit incorporates a CCD sensor formed of opto-electric conversion elements in a 2-dimensional array, converts voltage levels, produced by opto-electric conversion through fixed-time exposure to reflected rays from an object being imaged, into a digital signal by quantization by a predetermined density gradation.

As shown in FIG. 2, the image obtained by the eye region image pick-up unit 1 includes regions of the eyelids 13, the pupil 10, the iris 11, and the iridial granule 12. The iridial granule segmenting section 2 segments only the iridial granule region 12 from the image.

The operation of the iridial granule segmenting section 2 will be described with reference to FIG. 4. The pupil 10, being an empty space, only slightly reflects the incident light. Therefore, the pupil 10 is expressed as a uniform region with low density. When the image is subjected to a density variation detection process by using the well-known Sobel operator, in the region of the pupil 10 with a uniform density, the density variation becomes almost nil. Accordingly, a continuous region whose density variation is below a predetermined threshold value and whose area is larger than a specified value can be determined as a region of the pupil 10.

Then, the region of the iridial granule 12 is obtained. Above the pupil 10, there is the iridial granule 12, and above the iridial granule 12, there is the iris 11. Compared with the inner areas of these regions, the density varies notably at the borders of these regions. For this reason, in an image treated by the density variation detection process, the pixel density value is larger along the border of the respective regions. Therefore, the center of gravity C of the pupil region is first found and then pixels with values higher than a specified threshold value are searched by starting from the center of gravity C, and thereby the density variation can be detected in the vertical direction. By following this sequence, the point P1 on the border between the pupil region 10 and the iridial granule region 12 is detected in the first place and then the point P2 on the border between the iridial granule region 12 and the iris region 11 is detected.

By repeating a search in the vertical direction starting from other points on a horizontal line L that passes through the center of gravity C by the same sequence as above, the upper and lower fringes of the iridial granule region 12 can be obtained as a continuation of points. The left and right ends of the upper and lower fringes of the iridial granule region can be obtained as points E1 and E2 where the vertical distance between the upper and lower fringes become shorter than a specified small value. By this method, the iridial granule region 12 can be determined.

More specifically, a mask image mxy can be produced when the pixel density value is 1 in the region between the upper and lower fringes and the pixel density value is 0 in the other regions. The dimension of the horizontal width of the iridial granule as a parameter used by the next geometric normalizer 3 can be obtained by calculating the distance (d between E1 and E2) between coordinates at the left and right ends.

The operation of the geometric normalizer 3 will next be described with reference to FIG. 3.

Figure 3:
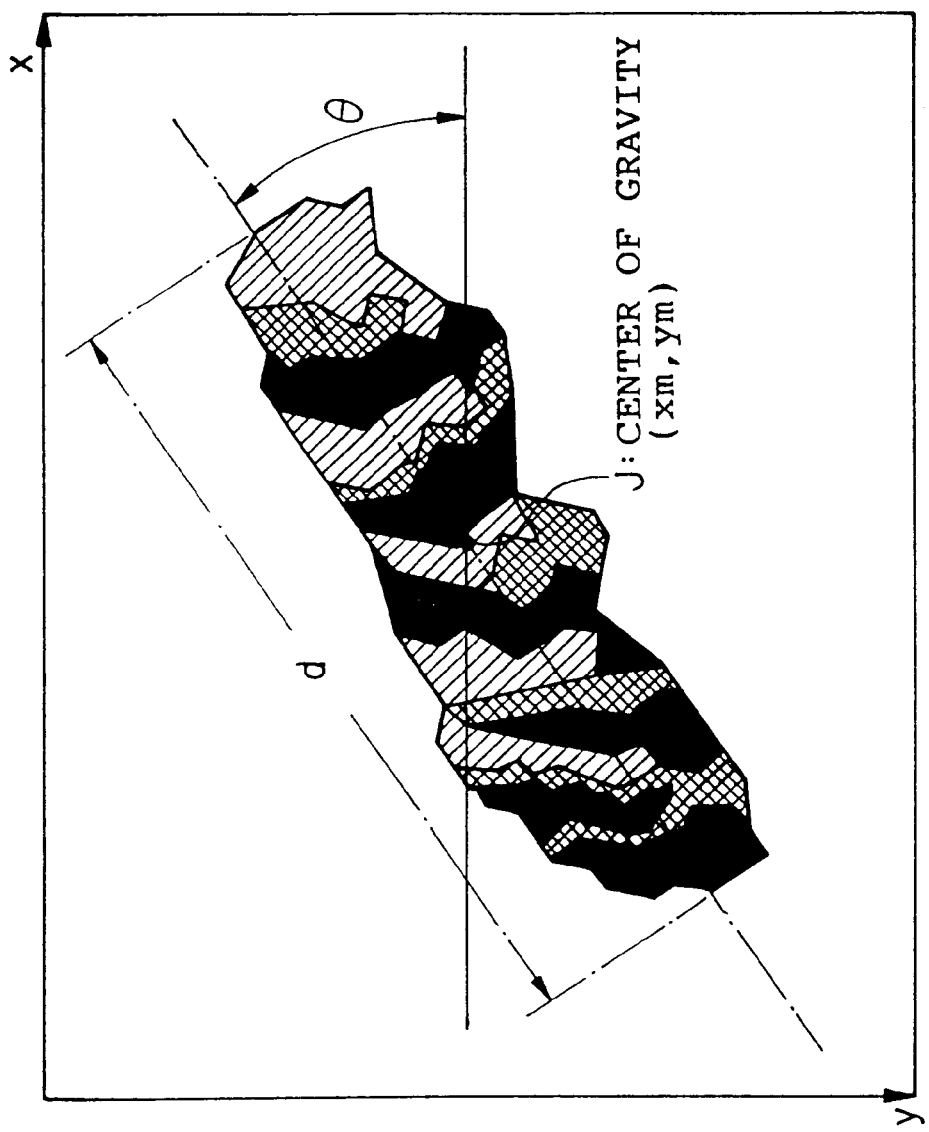
FIG. 3 is an explanatory diagram of an image of iridial granule.

FIG. 3 is an explanatory diagram showing only the iridial granule region 12 on an enlarged scale.

Due to the difficulty to follow the movement of a horse by a man's camera operation, the relative position between the horse and the camera, the inclination of the camera, and the picture-taking distance changes unsteadily, with the result that an actual image of the iridial granule 12 sustains a dislocation, a tilt or a change of size. It is undesirable to collate a geometrically unstable image as it is because it is difficult to correctly determine the corresponding points so that a deterioration of collation accuracy will result. Therefore, the geometric normalizer 3 is used to measure the position, inclination and size of the iridial granule, and normalize and correct those items to obtain a stable image. The method will be described below. Note that in FIG. 3, the position of the iridial granule is normalized by coordinates of the center of gravity J, for instance. The inclination is normalized by θ. The size of the iridial granule is normalized by the length d used as the basic length of the iridial granule.

Description will first be made of a measuring operation to obtain geometric parameters of the iridial granule region 12.

As shown in FIG. 3, 2-dimensional coordinates x, y are set in the image, and are used to determine coordinates (xm, ym) of the center of gravity j for detecting a dislocation, an angle θ showing the inclination to the x-axis, and the longitudinal length d as a measure of the size of the iridial granule region 12. The method of determining the longitudinal length d has been mentioned in the description of the iridial granule segmenting section 2. So, description will now be made of how to find the coordinates (xm, ym) of the center of gravity j and the inclination θ.

The coordinates (xm, ym) of the center of gravity j are obtained from the coordinate values of the pixels of the iridial granule 12 and the inclination θ is obtained by analysis of the principal component. More specifically, the coordinates (xm, ym) of the center of gravity j are obtained by first receiving a horse eye image (FIG. 2) Pxy ($1 \leq x \leq W$, $1 \leq y \leq H$) and also a mask image mxy of the iridial granule 12 from the iridial granule segmenting section 2, and then finding an average value of the coordinate values (x, y) in the iridial granule region, that is, in the mask region (mxy=1), expressed by the following equation, within the coordinates of the eye image Pxy. Note that W and H are the horizontal and vertical image dimensions of the eye image Pxy.

$$xm = (1/n)\Sigma\Sigma mxy \, x \quad (1)$$

$$ym = (1/n)\Sigma\Sigma mxy \, y \quad (2)$$

$$n = (1/n)\Sigma\Sigma mxy \quad (3)$$

where each Σ denotes a total sum in a range of H from y=1 and a total sum in a range of W from x=1.

The inclination (θ) is obtained by using coordinates in the mask image of the iridial granule 12 and also the first principal component in principal component analysis by the following equations. Main component analysis is one method of multivariate analysis, and in this analysis, multivariate data is summarized at a representative dimension, and for an oblong iridial granule, the longest straight line in the longitudinal direction tends to be the first principal component.

$$\theta = \tan(sz/(1-sx)) \quad (4)$$

$$l = (1/2)\left(sx + sy + \sqrt{(sx-sy+4sz)}\right) \quad (5)$$

$$sx^2 = (1/n)\sum\sum mxy(x-xm)^2 \quad (6)$$
$$= \sum\sum mxy(x^2/n - x^2m)$$

$$sy^2 = (1/n)\sum\sum mxy(y-ym)^2 \quad (7)$$
$$= \sum\sum mxy(y^2/n - y^2m)$$

$$sz^2 = (1/n)\sum\sum mxy(x-xm)(y-ym) \quad (8)$$
$$= \sum\sum mxy(xy/n - xm \cdot ym)$$

where each Σ denotes a total sum in a range of H from y–1 and a total sum in a range of W from x=1. The operation for calculating the equations (1) to (8) will be described with reference to FIG. 5.

Figure 5:
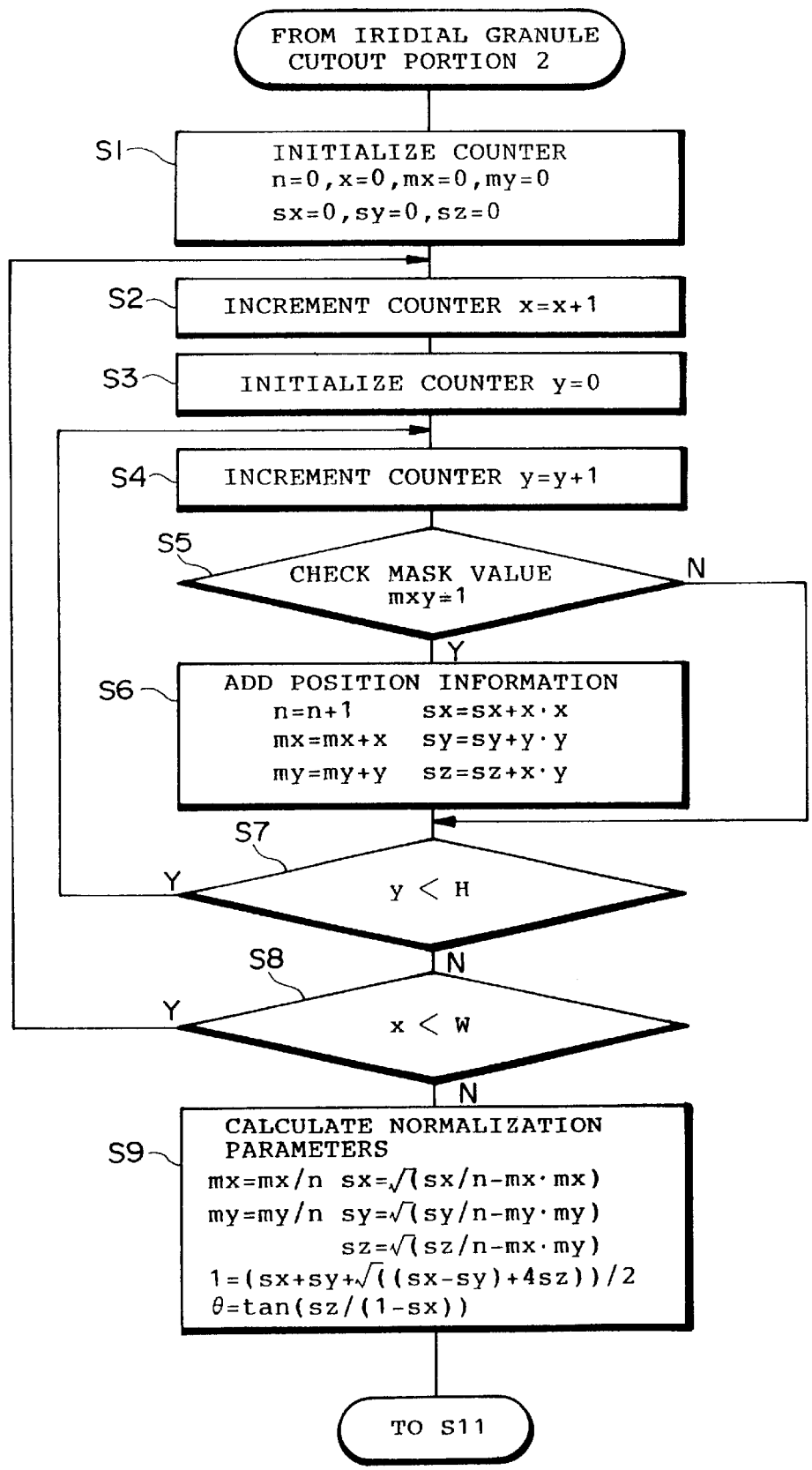
FIG. 5 is a flowchart of an operation of a geometric normalizer (Part 1)

FIG. 5 is an operation flowchart of the process of measuring normalizing parameters from an image of the iridial granule in the geometric normalizer 3.

The symbols in FIG. 5 are as follows. The pixel number counter is denoted as n, the horizontal pixel counter as x, the vertical pixel counter as y, the horizontal center of gravity counter as mx, the vertical center of gravity as my, the horizontal deviation counter as sx, the vertical deviation counter as sy, the horizontal/vertical deviation counter as sz, and a coordinate holder showing the positions of the pixels arranged in a matrix in the mask image mxy supplied from the iridial granule segmenting section 2 as mxy. The horizontal pixel number W and the vertical pixel number H are constants. Each process step is described as follows.

<Step S1>
The pixel number counter n, the horizontal pixel counter x, the horizontal center of gravity counter mx, the vertical center of gravity counter my, the horizontal deviation counter sx, the vertical deviation counter sy, and the horizontal/vertical deviation counter sz are initialized.

<Step S2>
The horizontal pixel counter x is incremented.

<Step S3>
The vertical pixel counter y is initialized.

<Step S4>
The vertical pixel counter y is incremented.

<Step S5>
The mask image mxy supplied from the iridial granule segmenting section 2 is searched for pixels at the coordinates (x, y) obtained from the coordinate holder mxy, and if their values are mxy=1, the pixels correspond to the iridial granule region, so that the process moves on to Step S6. On the other hand, if the pixel values are mxy=0, those pixels correspond to regions other than the iridial granule region and those pixels are not the processing objects, and therefore the process proceeds to Step S7.

<Step S6>
The pixel number counter n is incremented, and necessary operation values at the coordinates (x, y) are added to the horizontal center of gravity counter mx, the vertical center of gravity counter my, the horizontal deviation counter sx, the vertical deviation counter sy, and the horizontal/vertical deviation counter sz.

<Step S7>
The vertical pixel counter y is compared with the constant H, and if y<H, this means that there still remain one or more non-processed horizontal lines with respect to the horizontal pixel number x, and the process proceeds to Step S4. If y=H, this means that the pixels in a vertical line identified by the horizontal pixel number x have been processed, and the process proceeds to Step S8.

<Step S8>
The horizontal pixel counter x is compared with the constant W, and if x<W, this means that there still remain one or more non-processed vertical lines, and the process proceeds to Step S2. If x=W, this means that all the pixels have been processed, and the process moves on to Step S9.

<Step S9>
When processing of all pixels was finished, the coordinate values of the iridial granule region have been added as statistical information to the respective counters, so that the operations of the equations (1) to (8) are performed.

After the process steps have been finished, the coordinate values (xm, ym) of the center of gravity j, the inclination θ, and the longitudinal length d are obtained. For the convenience of description, the processes of all pixels of the image have been discussed. To omit the calculation of the region outside the mask (mxy=0), however, it is possible to confine the processing objects to the range between the upper and lower fringes of the iridial granule.

The normalizing process using the obtained parameters will be described with reference to FIG. 6.

Coordinate transformation, such as parallel displacement, rotating displacement, enlargement and contraction, of the eye image Pxy is performed to obtain an output image Qij (in a matrix form). More specifically, from inverse transformation equations for parallel displacement, rotating displacement, enlargement and contraction of the coordinate values (i, j) of the output image Qij, the coordinate values (x, y) of the input image Pxy are obtained, and set in the output image Qij.

If the size of the iridial granule region after coordinate transformation is designated by D and its inclination by θ and the coordinates of the center of gravity is set at the center (I/2, J/2) of the matrix, transformation equations of the coordinates are as shown below.

$$x = \{(i-I/2)\cos\theta - (j-J/2)\sin\theta\}d/D + xm \quad (9)$$

$$y = \{(i-I/2)\sin\theta + (j-J/2)\cos\theta\}d/D + ym \quad (10)$$

The transformation here includes a step of segmenting only the iridial granule region in a rectangular form and therefore attention needs to be paid to a fact that the size of the input image Pxy ($1 \leq x \leq W$, $1 \leq y \leq H$) differs from that of the output image matrix Qij ($1 \leq i \leq I$, $1 \leq j \leq J$).

Figure 6:
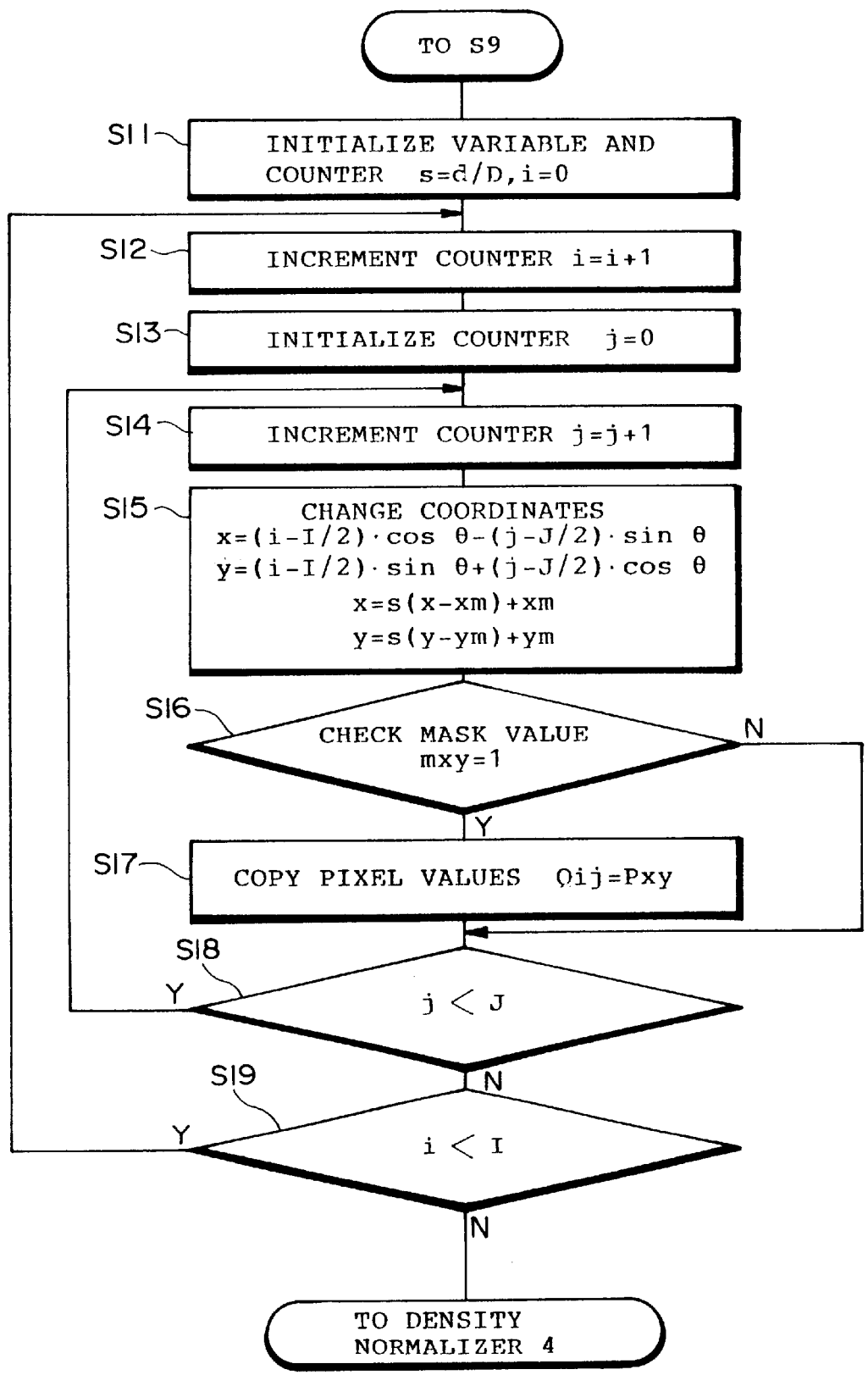
FIG. 6 is a flowchart of an operation of the geometric normalizer (Part 2)

FIG. 6 is a flowchart of the operation of coordinate transformation by the geometric normalizer 3.

Referring to the symbols in FIG. 6, regarding the input image Pxy, the image matrix holder is designated as Pxy, the horizontal pixel counter as x, the vertical pixel counter as y, the horizontal center of gravity counter as mx, the vertical center of gravity counter as my, the matrix holder of the mask image mxy as mxy, and regarding the output image, the image matrix holder is designated as Qij, the horizontal pixel counter as i, the vertical pixel counter as j, and regarding the iridial granule, the center of gravity is designated as (xm, ym), the inclination as θ, the size as d, and the transformation coefficient holder of the size d as s. The constants are the horizontal pixel number W and the vertical pixel number H of the input image Pxy, the horizontal pixel number I and the vertical pixel number J of the output image Qij, and the longitudinal size D of the iridial granule region after normalization. Note that the input image Pxy is obtained from the eye region image pick-up unit 1 and the mask image mxy is obtained from the iridial granule segmenting section 2. The process steps will be described in the following.

<Step S11>
The horizontal pixel counter i is initialized, and the transformation coefficient s of the size d is set.
<Step S12>
The horizontal pixel counter i is incremented.
<Step S13>
The vertical pixel counter j is initialized.
<Step S14>
The vertical pixel counter j is incremented.
<Step S15>
From the inverse transformation equations (9) and (10) for the coordinates (i, j) of the output image Qij, the corresponding coordinates (x, y) of the input image Pxy are obtained.
<Step S16>
A check is made on the pixel density value mxy of a pixel number (x, y) of the mask image mxy obtained by the iridial granule segmenting section 2, and if mxy=1, this value means that this pixel corresponds to the iridial granule, so that the process proceeds to Step S17, and if mxy=0, this pixel is outside the iridial granule, and the process goes to Step S18.
<Step S17>
The values Pxy of the input image obtained by coordinate transformation are set in the output image Qij.

<Step S18>
The vertical pixel counter j is compared with the constant J, and if j<J, this means that there still remain one or more non-processed horizontal lines with respect to the horizontal pixel number i, and the process proceeds to Step S14. If j=J, this means that the pixels in a vertical line identified by the horizontal pixel number i have been processed, and the process proceeds to Step S19.
<Step S19>
The horizontal pixel counter i is compared with the constant I, and if i<I, this means that there still remain one or more non-processed vertical lines, and the process proceeds to Step S12. If i=I, all pixels have been processed, and the iridial granule region, normalized by coordinate transformation, has been set in the output image Qij. Therefore, the process by the geometric normalizer is finished, and the next process by the density normalizer 4 is executed.

The operation of the geometric normalizer 3 is as described above. After the geometric normalizer 3 has completed the process, the iridial granule region of the input image Pxy is normalized and stored in the output image matrix holder Qij. At Step S16, for the pixels decided as outside the iridial granule region in the mask image, the pixel values at S17 are not copied.

Therefore, the iridial granule region of the output image Qij has a density value of not 0 (1 or larger), and the region outside this region has density 0.

The description will move on to the operation of the density normalizer 4. Pictures of the eyes of horses are taken in various places, at various times and under various weather conditions. The brightness and the contrast of the pictures are variable as they are affected by light from the surroundings and the temperature characteristics of the respective CCD sensors. If the pictures are used as they are for collation, there can be notable differences even in the pictures of the eyes of the same horse, resulting in insufficient collation accuracy. The present invention has been made to compensate for variations by normalizing the density in order to suppress the irregularity. Specifically, the mean density qm and the standard deviation qs of the iridial granule region are measured, and the density values of the images are changed so that the measured values become required values (D, K). The mean density qm and the standard deviation qs of the iridial granule region are calculated by the following equations, in which n denotes the number of pixels of the iridial granule region (Qij≠0).

$$qm = (1/n) \sum \sum Qij \quad (11)$$

$$qs^2 = (1/n) \sum \sum (Qij - qm)^2 \quad (12)$$
$$= \sum \sum (Qij^2/n - qm^2)$$

The Σ each denotes a total sum in a range of J from j=1 and a total sum in a range of I from i=1.

Figure 7:
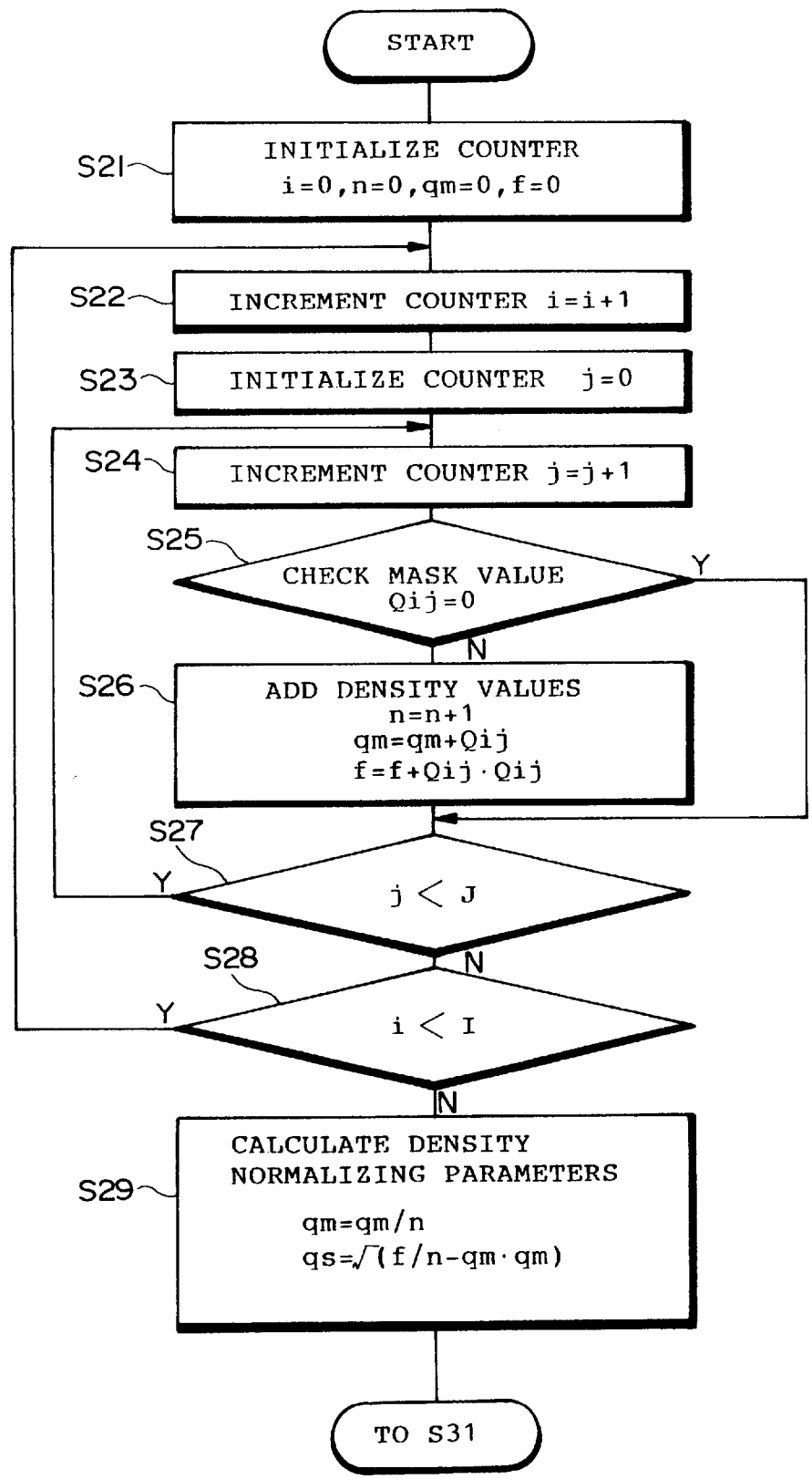
FIG. 7 is a flowchart of an operation of a density normalizer (Part 1)

FIG. 7 is a flowchart (part 1) of the operation of the density normalizer.

To begin with, the operation of calculating the mean density and the standard deviation of the iridial granule region will be described with reference to FIG. 7.

Referring to the symbols in FIG. 7, a pixel number counter is designated as n, the horizontal pixel counter as i, a vertical pixel counter as j, a mean counter as qm, a variance counter as f, a deviation holder as qs, and an output image matrix holder as Qij. The output image Qij is obtained from the geometric normalizer 2. A horizontal pixel number I and the vertical pixel number J are constants. The density normalizer operation will be described step by step.
<Step S21>
The pixel number counter n, the horizontal pixel counter i, the mean counter qm and the variance counter f are initialized.
<Step S22>
The horizontal pixel counter i is incremented.
<Step S23>
The vertical pixel counter j is initialized.
<Step S24>
The vertical pixel counter j is incremented.
<Step S25>
In the output image Qij, the pixels in a region corresponding to the iridial granule region 12 have a density value of not 0, and the pixels outside this region have density 0. Under this arrangement, when a pixel provided by the output image matrix holder Qij shows 0, the process skips over to Step S27. If that pixel of the output image Qij shows a density value other than 0, the process proceeds to the next Step S26. Thus, pixels can be selected to perform the next Step S26 only on the iridial granule region.
<Step S26>
The pixel number counter n is incremented, and an operation value, such as a density value, for example, at each pixel is added to the mean counter qm and the variance counter f.
<Step S27>
The vertical pixel counter j is compared with the constant J, and if j<J, this means that there still remain one or more non-processed horizontal lines with respect to the horizontal pixel number i, and the process proceeds to Step S24. If j=J, this means that the pixels in a vertical line identified by the horizontal pixel number i have been processed, and the process proceeds to Step S28.
<Step S28>
The horizontal pixel counter i is compared with the constant I, and if i<I, this means that there still remain one or more non-processed vertical lines, and the process proceeds to Step S22. If i=I, this means that all pixels have been processed, and the process proceeds to Step S29.
<Step S29>
When processing of all pixels was finished, the density values of the iridial granule region have been added as statistical information to the mean counter qm and the variance counter f. Therefore, the equations (11) and (12) are used to calculate the density mean qm and the density standard deviation qs.

By the above process, the mean and the deviation of the density of the iridial granule region can be calculated.

Description will now be made of the process of density normalization using the calculated values of the density mean and the deviation.

This process performs linear transformation on the pixel values so that the density mean qm and the standard deviation qs of the image become the required values (D, K), respectively.

$$Qij=(Qij-qm)K/qs+D \tag{13}$$

The operation of the process will be described with reference to FIG. 8.

Figure 8:
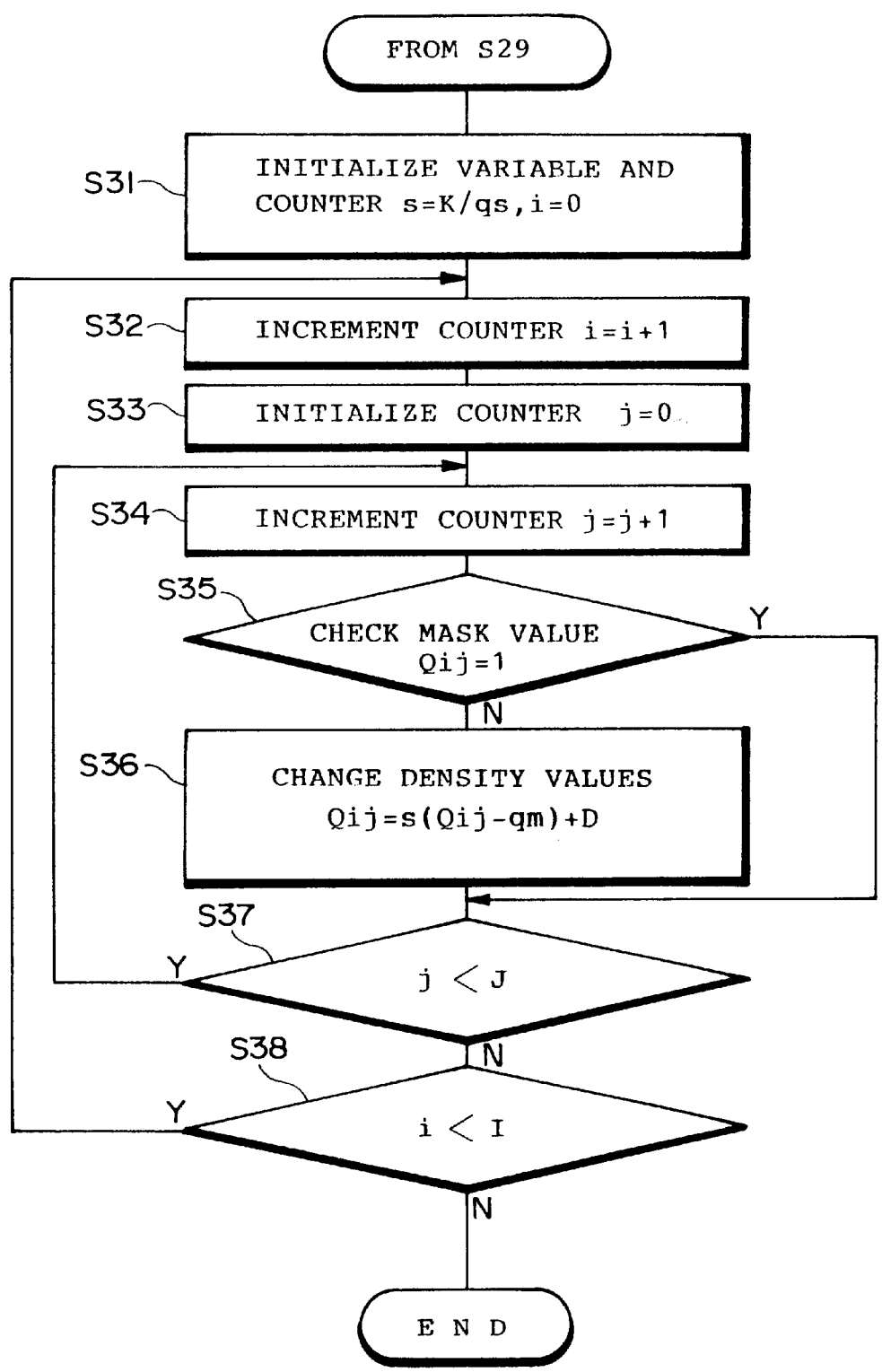
FIG. 8 is a flowchart of an operation of the density normalizer (Part 2)

FIG. 8 is a flowchart (part 2) of the operation of the density normalizer 4.

In FIG. 8, regarding the output image, the matrix holder is denoted as Qij, the horizontal pixel counter as i, the vertical pixel counter as j, the transformation coefficient holder as s, the density mean holder as qm, and the standard deviation holder as qs. The output image Qij is obtained from the geometric normalizer 3, and the density mean qm and the standard deviation qs are obtained in the preceding Step S29. The horizontal pixel number I, the vertical pixel number J, the required density mean value D and the density standard deviation K are constants.
<Step S31>
The horizontal pixel counter i is initialized. An equation s=K/qs for changing the density standard deviation qs to a required value K is set in the transformation coefficient holder s.
<Step S32>
The horizontal pixel counter i is incremented.
<Step S33>
The vertical pixel counter j is initialized.
<Step S34>
The vertical pixel counter j is incremented.
<Step S35>
In the output image Qij, the pixels in the region corresponding to the iridial granule 12 have a density of not 0, and the pixels outside this region has density 0. Under this arrangement, when the pixel density of the output image matrix holder Qij is 0, the process skips over to Step S37. If the pixel density is not 0, the process goes on to Step S36. The pixels are selected so that the next Step S36 is performed only on the iridial granule region.
<Step S36>
By using the equation (13), the density transformation process is performed.
<Step S37>
The vertical pixel counter j is compared with the constant J, and if j<J this means that there still remain one or more non-processed horizontal lines with respect to the horizontal pixel number i, and the process proceeds to Step S34. If j=J, this means that the pixels in a vertical line identified by the horizontal pixel number i have been processed, and the process proceeds to Step S38.
<Step S38>
The horizontal pixel counter i is compared with the constant I, and if i<I, this means that there still remain one or more non-processed vertical lines, and the process proceeds to Step S32. If i=I, this means that all pixels have been processed, so that the process of the density normalizer 4 is finished, and the process moves on to the process by the feature extractor 5.

When the above process is finished, the brightness and the contrast of the iridial granule region in the output image Qij are normalized and adjusted to normalized levels. In this operation, density transformation at S36 is not performed on the pixels which have been decided as those outside the iridial granule region of the output image Qij at Step S35, so that the pixel density value stays at 0. The foregoing is what the operation of the density normalizer 4 is like.

Figure 9:
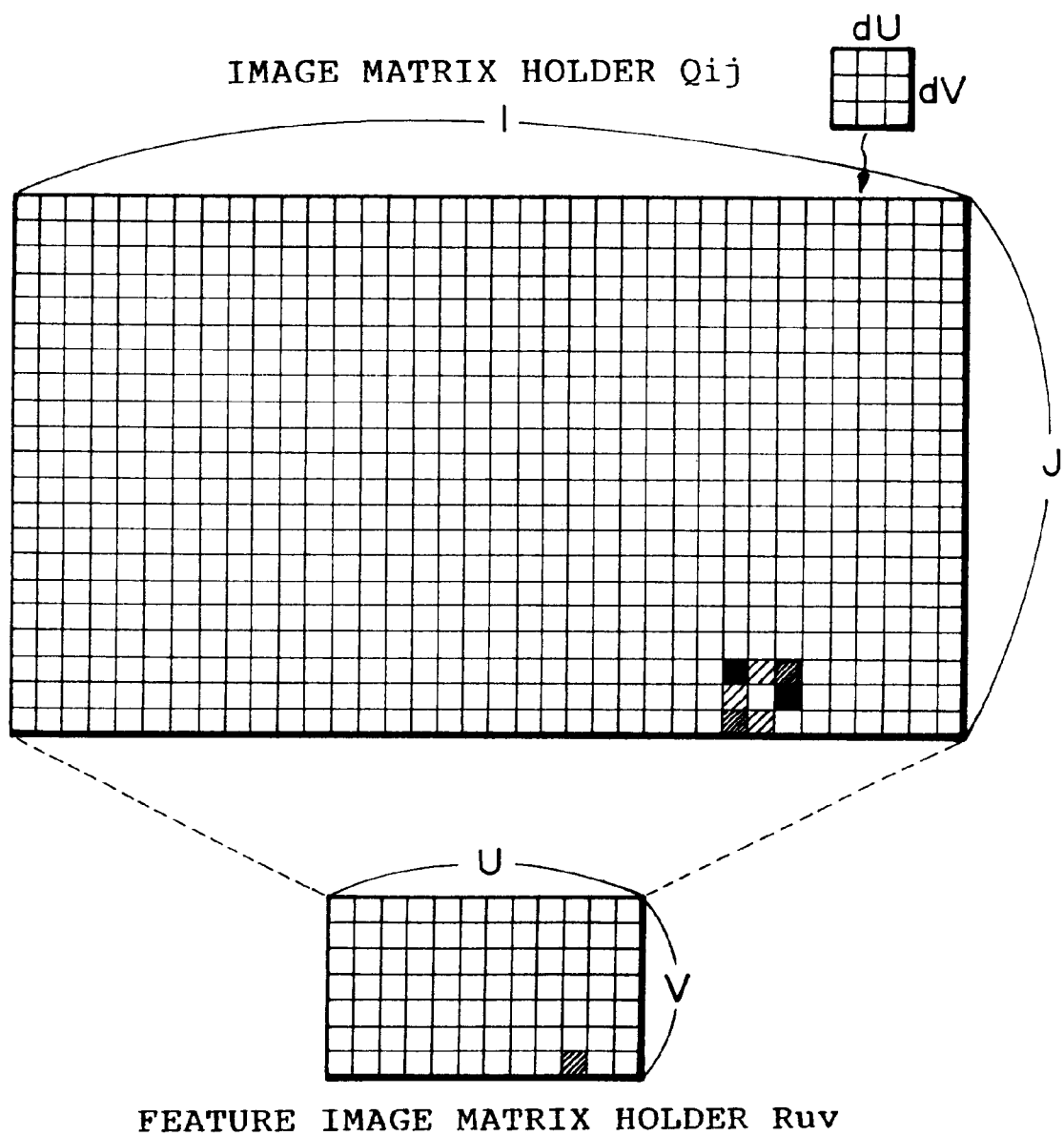
FIG. 9 is an explanatory diagram of an operation of a feature extractor.

FIG. 9 is an explanatory diagram of the operation of the feature extractor 5.

The process by the feature extractor 5 is to divide the two-dimensional iridial granule image into equal subdivision areas, and reduces the mean of the pixel values in each subdivision area into one pixel. Specifically, as shown in FIG. 9, the two-dimensional output image Qij in a I×J size is divided into U×V pieces each consisting of a rectangular dU×dV pixel pattern, and a reduced-size image Ruv, including U×V pixels, is produced in which each pixel carries a mean value of the pixel values of each subdivision area (I in the horizontal direction=U×dU, J in the vertical direction=V×dV).

The reasons for reducing the number of feature data are (1) to miniaturize the memory of registered data, (2) to speed up collation at the time of identification, and (3) to take averages of the density of the subdivision areas to eliminate the instability of pixel values due to tiny noise or an image dislocation to thereby secure a stable collation accuracy.

Figure 10:
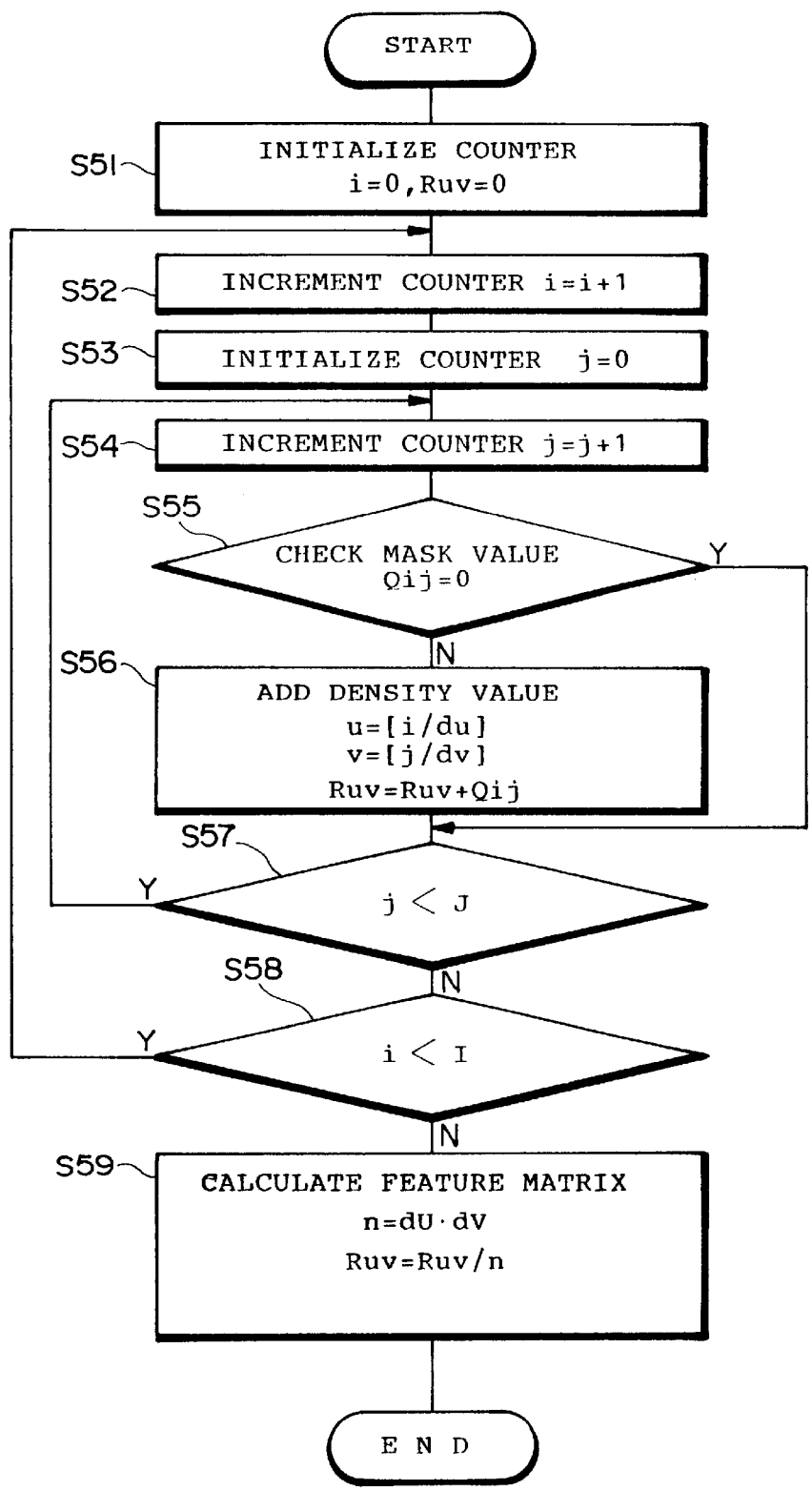
FIG. 10 is a flowchart of the operation of the feature extractor.

FIG. 10 is a flowchart of the operation of the feature extractor 5.

In FIG. 10, an output image matrix holder is denoted as Qij, a feature image matrix holder as Ruv, the horizontal pixel counter as i, the vertical pixel counter as j, and the pixel number holder as n. The constants used include the horizontal pixel number I and the vertical pixel number J of the output image, the horizontal pixel number du and the vertical pixel number dv of each subdivision area, and the horizontal pixel number U and the vertical pixel number V of a feature image.

<Step S51>

The horizontal pixel counter i and the feature image matrix holder Ruv (u=1, ..., U; v=1, ..., V) are initialized.

<Step S52>

The horizontal pixel counter i is incremented.

<Step S53>

The vertical pixel counter j is initialized.

<Step S54>

The vertical pixel counter j is incremented.

<Step S55>

In the output image Qij, the region corresponding to the iridial granule region 12 has a density of not 0, and the region other than the iridial granule region has density 0. Under this arrangement, when the pixel density value of the output image Qij is 0, the process skips over to Step S57. When the pixel density value of the output image Qij is not 0, the process moves on to the next Step S56. The pixels are selected so that the next Step S56 is performed only on the iridial granule region.

<Step S56>

The pixel $(u, v)=([i/du], [j/dv])$ of the reduced-size image, which corresponds to the pixel $(i, j)$ is obtained, and the pixel density value Qij corresponding to the output image is added to the pixel of the feature image Ruv indicated by pixel number $(u, v)$. The symbol [ ] indicates that the number is in gauss, and the decimal fractions are discarded ($[4.5]=4$).

<Step S57>

The vertical pixel counter j is compared with the constant J, and if j<J, this means that there still remain one or more non-processed horizontal lines with respect to the horizontal pixel number i, and the process proceeds to Step S54. If j=J, this means that the pixels in a vertical line identified by the horizontal pixel number i have been processed, and the process proceeds to Step S58.

<Step S58>

The horizontal pixel counter i is compared with the constant I, and if i<I, this means that there still remain one or more non-processed vertical lines, and the process proceeds to Step S52. If i=I, this means that all pixels have been processed, and the process proceeds to Step S59.

<Step S59>

When the process steps up to Step S58 are finished, density values of the pixels in each du×dv area of the output image Qij have been added to a corresponding pixel $(u, v)$ of the feature image Ruv. Therefore, by dividing the accumulated pixel value of each pixel $(u, v)$ of the feature image Ruv by the number of pixels n=du·dv, a mean value of the pixel density values of each du×dv area of a matrix size can be obtained, so that the feature image Ruv becomes a condensed mosaic image of the output image Qij.

The foregoing is the operation of the feature extractor 5. When the process is finished, the features of the iridial granule region of the output image are extracted and stored in the iridial granule region of the output image Qij.

In the "registration mode", feature image data obtained by the feature extractor 5 is stored along with ID information about the horse into the dictionary memory 8.

In the "registration mode", the process is completed by the above process.

In the "identification mode" for identification of horses, in addition to the process described hitherto, the difference calculator and collator 6 and the identification result output section 7 are also operated.

The operation of the difference calculator and collator 6 and the identification result display 7 will be described with reference to FIG. 11.

Figure 11:
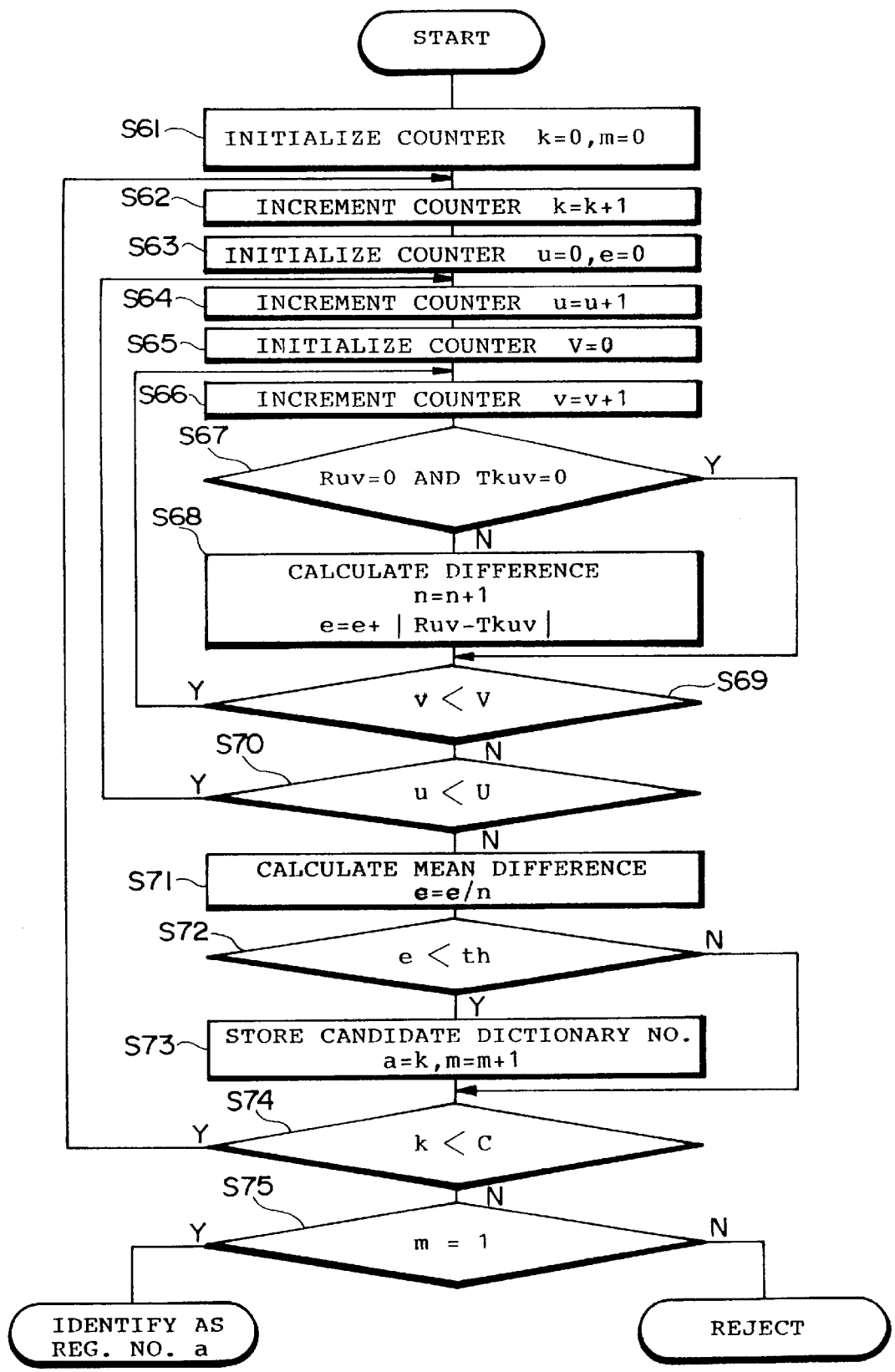
FIG. 11 is a flowchart of an operation of a difference calculator and collator.

FIG. 11 is a flowchart showing the operation of the difference calculator and collator 6. The process executed here is to compare the feature of input image data on a horse with the registered image data in the dictionary memory 8, and a mean value of density difference is obtained, and if the mean value is smaller than a required value, a horse with a specified ID in the dictionary memory 8 is identified as an object of inspection is picked out and output. If the mean value is larger than the specified value, or if two or more horses are picked out, the input image is rejected for the reason that there is no registered horse that matches the input image.

A concrete example of the operation of the difference calculator and collator 6 will be described with reference to FIG. 11.

In FIG. 11, a feature image matrix holder Ruv of the currently input image is denoted as Ruv, the dictionary (data) matrix holder as Tkuv, the pixel number counter as n, the dictionary (data) number counter as k, the candidate dictionary (data) number counter as m, the candidate dictionary number holder as a, the mean difference counter as Sk, the horizontal pixel counter as u, the vertical pixel counter as v, and the difference counter as e. The size of a feature image Ruv (FIG. 9), a dictionary (data) number C and a threshold value th are constants.

<Step S61>

The dictionary number counter k and the candidate dictionary counter m are initialized.

<Step S62>

The dictionary number counter k is incremented.

<Step S63>

The horizontal pixel counter u and the difference counter e are initialized.

<Step S64>

The horizontal pixel counter u is incremented.

<Step S65>

The vertical pixel counter v is initialized.

<Step S66>

The vertical pixel counter v is incremented.

<Step S67>

In a feature image Ruv from a currently input image and a registered feature image in the dictionary matrix holder Tkuv (hereafter referred to as a dictionary image), the pixels of the iridial granule region have a density of not 0, and the pixels outside this region have a density 0. Under this arrangement, when the pixels corresponding to the feature image Ruv and the dictionary image Tkuv are both 0 in density, the process skips over to Step S69, and if any of those two images is not 0 in density, the process proceeds to Step S68. Thus, the corresponding pixels of the iridial granule regions of the two images can be associated and collated.

Each time the pixel number counter n is incremented, a density difference is obtained between the corresponding pixels of the feature image in the feature image matrix holder Ruv and a dictionary image in the dictionary matrix holder Tkuv and the density difference value is added to the difference counter e.

<Step S69>

The vertical pixel counter v is compared with the constant V, and if v<V, this means that there still remain one or more non-processed horizontal lines with respect to the horizontal pixel number u, and the process proceeds to Step S66. If v=V, this means that the pixels in a vertical line identified by the horizontal pixel number u have been processed, and the process proceeds to Step S70.

<Step S70>

The horizontal pixel counter u is compared with the constant U, and if u<U, this means that there still remain one or more non-processed vertical lines, and the process proceeds to Step S64. If u=U, this means that all pixels have been processed, and the process proceeds to Step S71.

<Step S71>

When the steps up to S58 have been completed, differences in density value at those pixels which constitute each feature image Ruv and each dictionary image Tkuv have been added to the difference counter e. Therefore, by dividing the total sum of the difference counter e by the number of pixels n, a mean density difference per pixel can be obtained.

<Step S72>

When the difference counter e is compared with a threshold th, if e<th, the horse in the input image is a candidate as the same horse as designated by registered data (dictionary image) in the dictionary memory, and the process proceeds to the next Step S73. If e≧th, the horse in the input image is different from the registered horse, and the process proceeds to Step S74 for investigation of the next dictionary image.

<Step S73>

When a dictionary image as a correct candidate for a correct horse is obtained, this dictionary number k is stored in the candidate dictionary number holder a, and the candidate dictionary number counter m is incremented.

<Step S74>

The value of the dictionary number counter k is compared with the dictionary number C, and if the dictionary number counter k is smaller than the largest dictionary number (k<C), this means that there is one or more dictionary images which have not been subjected to collation, the process proceeds to Step S62. If k≧C, the input image has been collated with all dictionary images, and the process proceeds to the next Step S75.

<Step S75>

When the steps from S61 to S74 have been finished, the number of a dictionary image Tkuv whose difference e from the input feature image Ruv is smaller than th (e<th) is counted in the candidate dictionary number counter m. Also, the dictionary number of the dictionary image selected last is stored in the candidate dictionary number holder a. The identification condition in this embodiment is that the horse's identity is declared only when there is one dictionary image (m=1) whose difference value is smaller than the threshold value (e<th). Accordingly, a check is made to see if the candidate dictionary number counter m has 1, and when the number m is 1, the input horse is determined to be the same as the registered horse, and ID information about the horse designated by the candidate dictionary number holder a is displayed at the identification result output section 7. If the candidate dictionary number counter m shows a number other than 1, rejection information to the effect that the input horse is not the registered horse is displayed on the identification result output section 7.

The difference calculator and collator 6 and the identification result display 7 operate as described above. The threshold value th used in Step S72 is to be designed to be small enough to preclude misidentification.

Identification results are output on the display, printer or the like.

The first embodiment has been described.

<Effects of Embodiment 1>

The first embodiment described above offers the following effects.

1. In the first embodiment, the position, the inclination and the size of the iridial granule 12 are measured, normalized and compensated by the geometric normalizer 3, for which reason even if a horse's face or eyeball moves, or the camera angle is not fixed, the iridial granule region can be corrected to a stable position, size and angle for collation, making it possible to perform identification with high accuracy.

2. The density normalizer 4 is used to normalize and correct the brightness and the contrast of the iridial granule 12 to fixed values. On account of this, stable collation can be achieved with no effects of environmental conditions, such as place, time and weather and the instability of the optical system, such as the temperature characteristics of the CCD sensor, and so on.

3. The feature extractor 5 takes averages of the density of subdivision areas of the iridial granule region to thereby reduce the required number of pixels, so that the size of feature data can be decreased and the size of the dictionary memory 8 can be reduced.

4. Because the data size of feature images is reduced, the high speed identification in the difference calculator and collator 6 can be achieved.

5. Because averaged data obtained by the feature extractor 5 is used for each pixel of the feature image matrix holder, even if noise enters the image or the image is dislocated, the pixel density values are not much affected, thus making it possible to perform stable collation.

<Embodiment 2>

In the first embodiment, through the iridial granule segmenting section 2 and the geometric normalizer 3, a two-dimensional image of the iridial granule is obtained and from this image, geometric parameters are calculated, and by using parameters, geometric normalization is carried out. However, if a geometric parameter is extracted from a 2-dimensional image of the iridial granule 12, which is in a 3-dimensional form, it is sometimes hard to find a dictionary image which adequately matches the input image depending on the camera angle of the image. To take an example, when an input feature image taken from the slightly left side is collated with a dictionary image taken from the front side, because of the iridial granule 12 being 3-dimensional, the input feature image shows the left side of the object more than in the dictionary image, but the right side view is shown smaller and some part of the right side is hidden.

A second embodiment is conceived to execute a normalization process by using various normalizing quantities which vary slightly in the geometric normalizer 3 to search correct corresponding positions of the iridial granule and reduce a position discrepancy between the corresponding points of the input image and a stored image caused by an inadequate camera angle.

Figure 12:
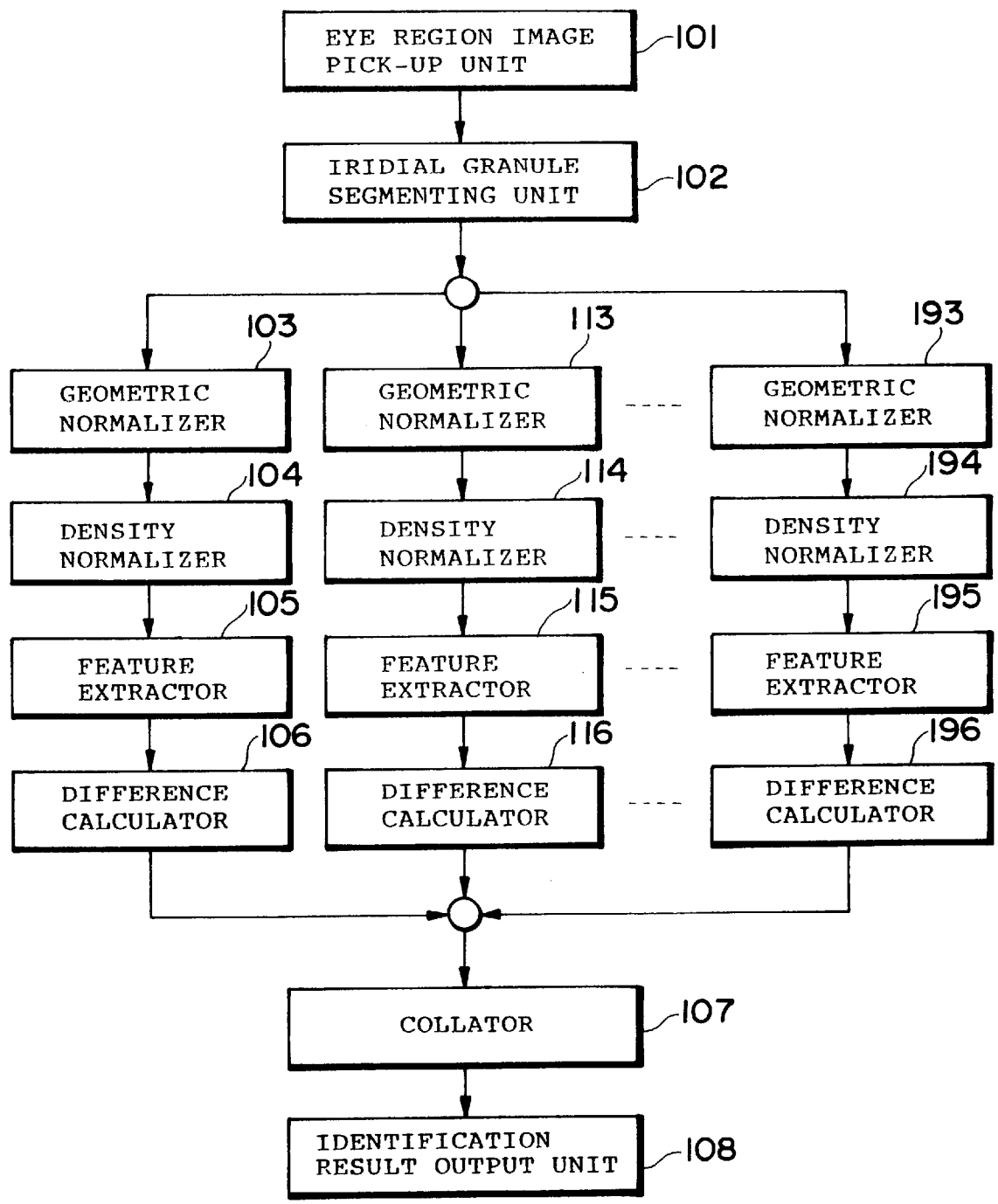
FIG. 12 is a block diagram of an apparatus in a second embodiment.

FIG. 12 is a block diagram of the apparatus according to a second embodiment of the present invention.

This apparatus comprises an eye region image pick-up unit 101, an iridial granule segmenting section 102, geometric normalizers 103, 113, . . . , 193, density normalizers 104, 114, . . . , 194, feature extractors 105, 115, . . . , 195, difference calculators 106, 116, . . . , 196, a collator 107, and an identification result output section 108. This embodiment has the geometric normalizer 3, density normalizer 4, and the feature extractor 5 of FIG. 1 arranged in multiple and parallel lines. However, instead of the single difference calculating and collator 6 of the first embodiment, separate units are used in the second embodiment, more specifically, the difference calculators 106, 116, . . . , 196 are arranged in parallel and are tied to one collator 107 which summarizes the parallel processing results. The second embodiment will be described in the following.

The eye region image pick-up unit 101 includes an image input portion, a CCD video camera for example, and an illumination unit, and obtains an image of a horse's eye in the form of a signal. The image input portion takes an image of a horse's eye with a camera, and coverts analog optical information about an image of a horse's eye into a digital electric signal. An illumination unit is used to produce an image of a horse's eye in sharp contrast. As the light source, a light of wavelength which is hard for animals to sense is used, such as a red light, a near infrared or an infrared ray to prevent the horse making a sudden movement in response to a dazzling light.

The iridial granule segmenting section 102, when receiving a general image of a horse's eye from the eye region image pick-up unit 101, detects the upper and lower fringes of the iridial granule region from the received image, and segments only the iridial granule region, and also calculates the dimension of the horizontal width of the iridial granule region from the left and right ends of it.

The geometric normalizers 103, 113, . . . , 193 each measure the position, inclination and size of the iridial granule image detected by the iridial granule segmenting section, and normalizes those items to specified values by coordinate transformation. Specifically, the normalizing quantities are calculated from the center of gravity position, the inclination of the principal component direction and the horizontal width of the iridial granule region, and geometric normalization is performed by using values, which are obtained by having the respective normalizing quantities added with or multiplied by predetermined small values. The above-mentioned small values vary with different geometric normalizers 103, 113, . . . , 193 arranged in parallel.

The density normalizer 104, 114, . . . , 194 each measure the brightness and contrast of the density of the iridial granule image, and normalizes them to specified values to attain the required brightness and the contrast. Those density normalizers are arranged in parallel to show another example to compare with the first embodiment, but they need not necessarily be arranged in parallel and only one density normalizer may be provided at a stage subsequent to the geometric normalizers 103, . . . , 193.

The feature extractors 105, 115, . . . , 195 each extract and encode the feature of the iridial granule image. Since the correction quantities differ with different geometric normalizers 103, 113, . . . , 193, the processing results of the feature extractors 105, 115, . . . , 195 differ.

The difference calculator and collators 106, 116, . . . , 196 respectively receive iridial granule codes from the feature extractors 105, 115, . . . , 195, and compare those codes with the dictionary images of the horses in the dictionary memory, and thereby obtain a dictionary image with the smallest difference. Here in FIG. 12, the dictionary memory is omitted, but the dictionary memory in the second embodiment has the same composition and uses the same dictionary creating method as in the first embodiment.

The collator 107 receives a candidate dictionary and a difference from each of the difference calculators 106, 116, . . . , 196, and determines as the ID of the correct horse an ID corresponding to a dictionary image having the smallest difference and a value smaller than a required value.

The identification result output section 108 receives output from the collator 106, and outputs ID information about the horse checked for identity.

<Operation of Embodiment 2>

The operation in the "identification mode" of the second embodiment will be described with reference to FIGS. 13 and 14.

As has been described when mention was made of the arrangement, this second embodiment is made to execute the processes from the geometric normalizer stage onwards in multiple and parallel lines to perform more appropriate geometric normalization, and therefore uses various normalizing parameters in the execution of geometric normalization. Consequently, some processes are the same as in the first embodiment. So, description here is limited to the geometric normalizers 103, 113, . . . , 193, and the difference calculator 106, and the collator 107.

Description will start with the operation of the geometric normalizers 103, 113, . . . , 193. As has been described in the first embodiment, the geometric normalizer 3 measures the position, inclination and size of the iridial granule image, and normalizes and corrects them to specified values by coordinate transformation. In the second embodiment, this geometric normalization is performed with various kinds of normalizing parameters. Therefore, the difference from the first embodiment is that the second embodiment has another step that the normalizing parameters are added with or multiplied by predetermined values.

Specifically, when normalizing the iridial granule region with geometric parameters (center of gravity (xm, ym), inclination $\theta$, scale d), each geometric normalizer adds small variations (($\Delta x$, $\Delta y$), $\Delta\theta$, $\Delta d$) to the respective parameters. Accordingly, coordinate inverse transformation equations for parallel displacement, rotating displacement, enlargement and contraction are $$x=\{(i-I/2)\cos(\theta+\Delta\theta)-(j-J/2)\sin(\theta+\Delta\theta)\}(d+\Delta d)/D+xm+\Delta x \quad (14)$$

$$y=\{(i-I/2)\sin(\theta+\Delta\theta)+(j-J/2)\cos(\theta+\Delta\theta)\}(d+\Delta d)/D+ym+\Delta y \quad (15)$$

where Pxy is the input image, Qij is the output image, D is the iridial granule size, $\theta$ is the iridial granule angle, and (I/2, J/2) refers to the center of matrix.

Figure 13:
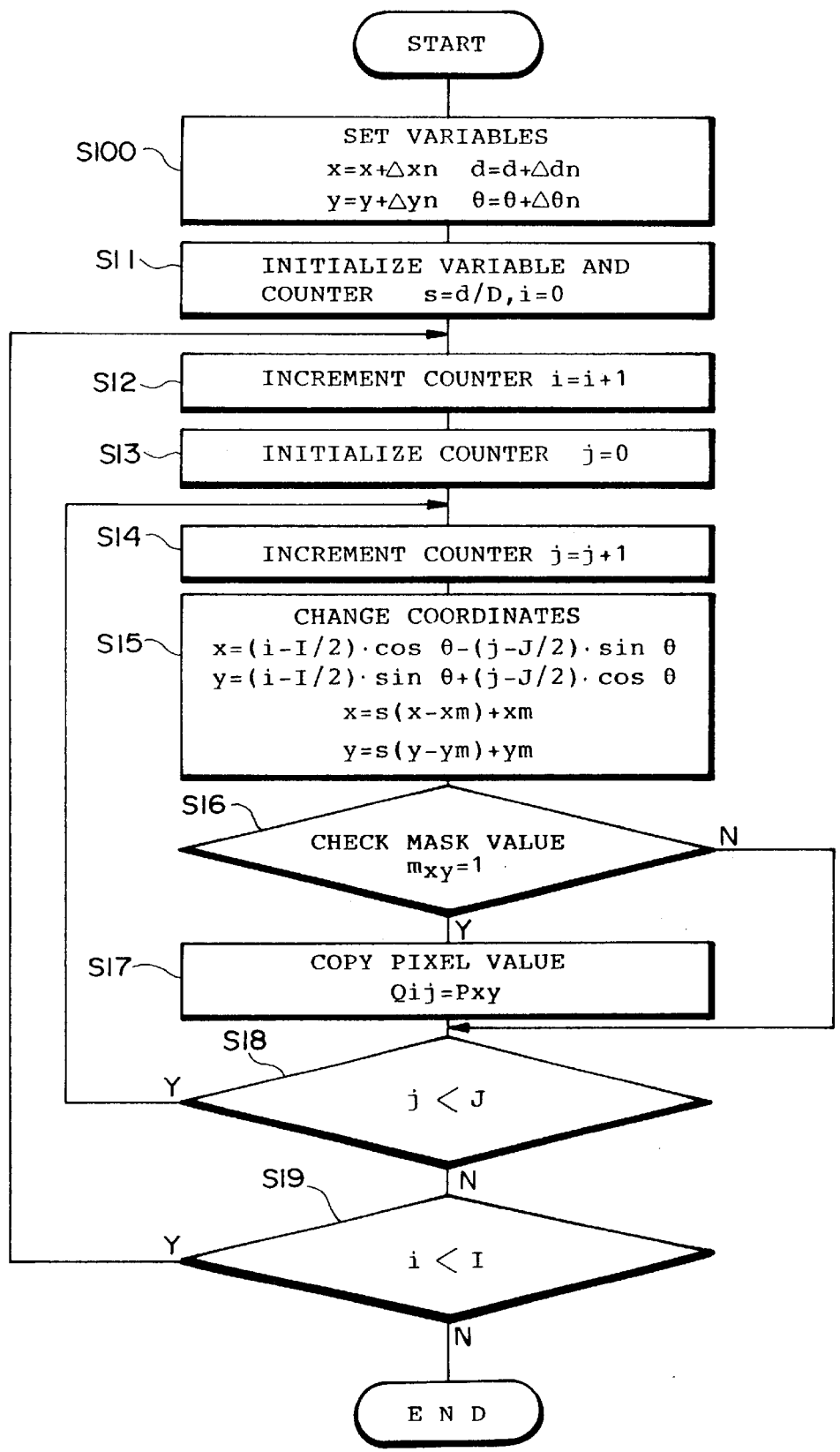
FIG. 13 is a flowchart of an operation of a geometric normalizer in the second embodiment.

FIG. 13 is a flowchart of the operation of the geometric normalizer.

An actual operation will be described with reference to FIG. 13. A step peculiar to the second embodiment is the alteration of the normalizing parameters at Step S100, but the other steps are the same as in the first embodiment. In FIG. 13, regarding the input image, the matrix holder is designated as Pxy, the horizontal pixel counter as x, the vertical pixel counter as y, the horizontal center of gravity counter as mx, the vertical center of gravity counter as my, the mask image matrix holder as mxy, an output image matrix holder as Qij, the horizontal pixel counter as i, the vertical pixel counter as j, and regarding the iridial granule, the center of gravity is designated as (xm, ym), the inclination as $\theta$, the size as d and the transformation coefficient of the size d as s. The horizontal pixel number W and the vertical pixel number H of the input image, the horizontal pixel number I and the vertical pixel number J of the output image, and the size D of the iridial granule after normalization are constants. Also, a variation ($\Delta x$, $\Delta y$) of the gravity, a variation Δθ of the inclination, and a variation Δd of the size are set as different constants in the different normalizers. The input image Pxy is obtained from the eye region image pick-up unit 101, and the mask image mxy is obtained from the iridial granule segmenting section 102.
<Step S100>

Small variations ((Δx, Δy), Δθ, Δd) are added to the measured geometric parameters (center of gravity (xm, ym), inclination θ, scale d). The variations ((Δx, Δy), Δθ, Δd) may have a plus or a minus sign.
<Step S11>

The horizontal pixel counter i is initialized, and a size transformation coefficient s is set.
<Step S12>

The horizontal pixel counter i is incremented.
<Step S13>

The vertical pixel counter j is initialized.
<Step S14>

The vertical pixel counter j is incremented.
<Step S15>

Using the geometric parameters in Step S100, coordinates (i, j) of the output image Qij are transformed by the equations (14) and (15) to obtain the corresponding coordinates (x, y) of the input image Pxy.
<Step S16>

The value mxy of a pixel number (x, y) of the mask image mxy obtained from the iridial granule segmenting section 2 is checked, and if mxy=1, the pixel corresponds to the iridial granule, and the process proceeds to the next Step S17. Or, if mxy=0, the pixel is outside the iridial granule region, and is not the processing object, and the process proceeds to Step S18.
<Step S17>

The values of coordinates (x, y) of the corresponding pixels in the input image matrix holder Pxy are set at the pixel coordinates in the output image matrix holder Qij.
<Step S18>

The vertical pixel counter j is compared with the constant J, and if j<J, this means that there still remain one or more non-processed horizontal lines with respect to the horizontal pixel number i, and the process proceeds to Step S14. If j=J, this means that the pixels in a vertical line identified by the horizontal pixel number i have been processed, and the process proceeds to Step S19.
<Step S19>

The horizontal pixel counter i is compared with the constant I, and if i<I, this means that there still remain one or more non-processed vertical lines, and the process proceeds to Step S12. If i=I, all pixels have been processed, and the iridial granule region normalized by coordinate transformation has been stored in the output image matrix holder Qij, so that geometric normalization is finished, and the operation proceeds to the process steps by the density normalizers 104, 114, . . . , 194.

The operation of the geometric normalizers 103, 113, . . . , 193 has been described. After this operation, the iridial granule region in the input image matrix holder Pxy is normalized, and stored in the output image matrix holder Qij. At this time, the pixels determined as outside the mask region at S16 do not have their values copied at S17, and the iridial granule region in the output image matrix holder Qij has a density value of not 0, while the region other than the iridial granule region has a density value of 0.

Figure 14:
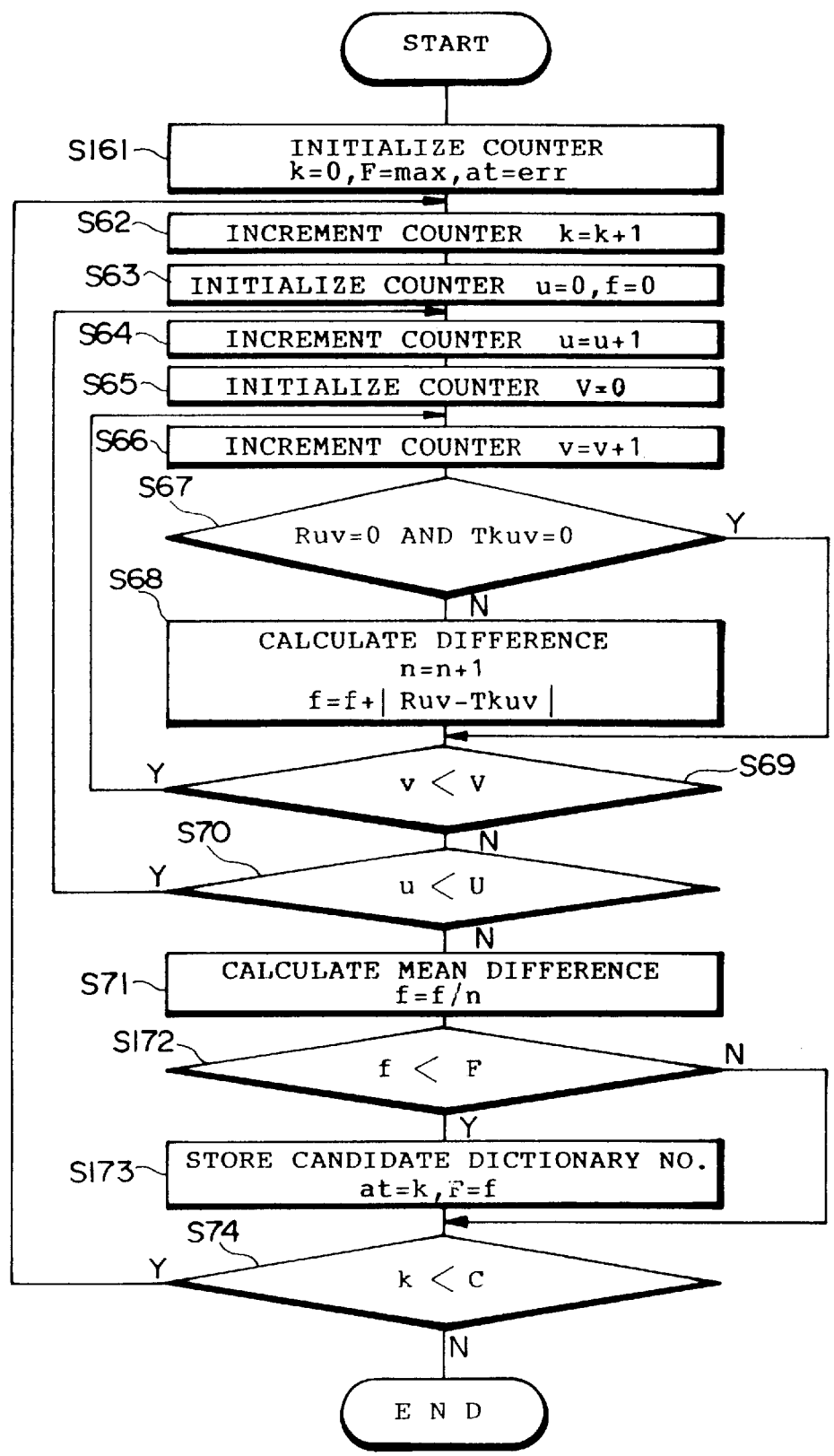
FIG. 14 is a flowchart of an operation of a difference calculator in the second embodiment.

FIG. 14 is a flowchart of the operation of the difference calculator.

The process shown in FIG. 14 is to compare the feature of an input image with registered dictionary image to obtain a mean value of density difference, and transfer ID of a dictionary image having the smallest mean difference value and the mean difference value to the next collator 107.

The different aspect of the difference calculators 106 and so on from the first embodiment is to perform relative evaluation which searches ID of a dictionary image with the smallest mean difference value instead of absolute evaluation which compares the mean difference value with a required value. Therefore, the steps in FIG. 14 which differ from the steps in the first embodiment are Steps S161, S172, and S173. In FIG. 14, the feature image matrix holder is designated as Ruv, the dictionary matrix holder as Tkuv, the pixel number counter as n, the dictionary number counter as k, the candidate dictionary number counter as m, the candidate dictionary number holder as at, the mean difference holder as F, the horizontal pixel counter as u, the vertical pixel counter as v, and the difference counter as f. The feature image size U×V, the dictionary number C and the threshold value th are constants.
<Step S161>

The dictionary number counter k, the mean difference holder F and the candidate dictionary number holder at are initialized. A sufficiently large difference value is set initially at the mean difference holder F. The candidate dictionary number holder at is initialized at an error number. The mean difference holder F is used to store a mean difference value obtained when an input image is compared with a plurality of dictionary images by replacing the previous difference value with this mean difference value if this mean difference value is smaller than the previous one, and the reason for this arrangement is to preclude a case in which the absence of a corresponding dictionary image is declared when the initial setting value is too small. The reason why the candidate dictionary number holder at is initialized to an error number is to let such an error be detected by the subsequent collator 107.
<Step S62>

The dictionary number counter k is incremented.
<Step S63>

The horizontal pixel counter u and the difference counter f are initialized.
<Step S64>

The horizontal pixel counter u is incremented.
<Step S65>

The vertical pixel counter v is initialized.
<Step S66>

The vertical pixel counter v is incremented.
<Step S67>

The pixels that form the iridial granule region in the feature image matrix holder Ruv and the dictionary image matrix holder Tkuv have a density value of not 0, and the pixels of the region other than the iridial granule region have a density 0. Under this arrangement, if the pixel of the feature image Ruv and the pixel of the dictionary image Tkuv both have a density 0, the process skips over to Step S69. If either one of the two groups of pixels have a density of not 0, the process proceeds to the next Step S68. Thus, collation can be limited to the iridial granule regions of those two kinds of images.
<Step S68>

The pixel number counter n is incremented, and a density difference is obtained between the corresponding pixels of the feature image matrix holder Ruv and the dictionary image Tkuv, and added to the difference counter f.
<Step S69>

The vertical pixel counter v is compared with the constant V, and if v<V, this means that there still remain one or more non-processed horizontal lines with respect to the horizontal pixel number u, and the process proceeds to Step S66. If v=V, this means that the pixels in a vertical line identified by the horizontal pixel number u have been processed, and the process proceeds to Step S70.

<Step S70>

The horizontal pixel counter u is compared with the constant U, and if u<U, this means that there still remain one or more non-processed vertical lines, and the process proceeds to Step S64. If u=U, this means that all pixels have been processed, and the process proceeds to Step S71.

<Step S71>

When the steps up to S68 have been completed, density differences at all pixels between the feature image Ruv and the dictionary image Tkuv have been added to the difference counter f. Therefore, by dividing the value of the difference counter f by the number of pixels n, the mean difference value of density per pixel can be obtained.

<Step S172>

The mean difference value set on the difference counter f is compared with the mean difference value set on the mean difference holder F, and if f<F, this means that the horse in the input image is included in the dictionary candidates, and the process proceeds to Step S173. If f>F, there is no candidate dictionary, and the process proceeds to Step S74.

<Step S173>

The dictionary number k of the dictionary image as the correct candidate is stored in the candidate dictionary number holder at, and when a small mean difference value f is obtained, this value f is stored in the mean difference holder F by replacing the previous difference value.

<Step S74>

When the value of the dictionary number counter k is compared with the dictionary number C, if the value of the dictionary number counter k is smaller than the dictionary number (k<C), this means that there is one or more uncollated dictionary images, and the process proceeds to Step S62. Or otherwise (k≧C), collation with all dictionary images has been finished, and the process proceeds to the operation of the collator 107.

The difference calculators, such as 106, have been described. Description will now move on to the operation of the collator 107. When Steps S61 to S74 of the difference calculators 106, 116, . . . , 196 were finished, a dictionary number k with the smallest mean difference value with respect to the input image has been stored in the candidate dictionary number holder at, and the smallest mean difference value f has been stored in the mean difference holder F. The horse identification condition is that the horse's identity is established only when there is only one dictionary image (m=1) whose mean difference value is smaller than a threshold value (F<th). The collator 107 checks the values of all mean difference holders F of the difference calculators 106, 116, . . . , 196, and sends ID information to the identification result output section 108 when there is only one dictionary image whose mean difference is smaller than the threshold value th, or otherwise sends reject information that the input horse is not a registered horse to the result output section 108. The threshold value th is to be set at a value small enough to preclude misidentification.

<Effects of Embodiment 2>

The apparatus according to the second embodiment offers the following effects.

1. Since the normalizing parameters are varied in many ways for geometric normalization and difference calculation, even if a 2-dimensional picture is taken of the 3-dimensional iridial granule, it is possible to correct a position discrepancy between the corresponding points of the input iridial granule region and a dictionary image due to difference in camera angle, so that identification with high accuracy can be achieved.

2. Geometric normalization conducted by varying the normalizing parameters in many ways increases a possibility that precise parameters can be secured even when there are errors in measurement of the geometric parameters of the iridial granule region, and accurate normalization can be performed.

<Modes of Application>

1. The present invention has been described centering on the identification of the iridial granule region, but the present invention can be applied to identification of any 3-dimensional objects in which there are generally individual differences.

2. With regard to the difference calculator, description has been made of a case where an inspected object image is collated with a stored dictionary image by using an OR region of the iridial granule, but the present invention can also be applied to an AND region or an XOR region. In other words, the present invention can be applied to the collation of an overlapping AND region which is done when the two iridial granule region images do not overlap completely, or to the collation of an OR region, including the above-mentioned AND region and regions each having extending therein a portion of only either one of the two, input and stored, imaged objects. The present invention can be applied to an XOR region where there is either one image or the other image at each pixel. If a difference between the portion not covered by the other is small enough, the two images can be determined to be similar in shape.

3. In the difference calculator, the mean difference value of density is treated as a difference, but another optional quantity, such as a sum of differences or the number of pixels which have pixel values difference larger than a specified value, can be used as a difference.

4. In the second embodiment, the geometric normalizers are arranged in multiple parallel lines, but the multiple number may be any number.

<Embodiment 3>

Since the iridial granule 12 has a three dimensional shape, its shapes and shadows appearing on images thereof differ depending on camera angles upon capturing the images. In the third embodiment, a plurality of image data captured at various camera angles are processed and registered, and registered image data with camera angles which are the closest to camera angles of an input image to be identified are selected upon collation.

A structure of the apparatus according to this embodiment will be described in detail with reference to FIG. 15.

Figure 15:
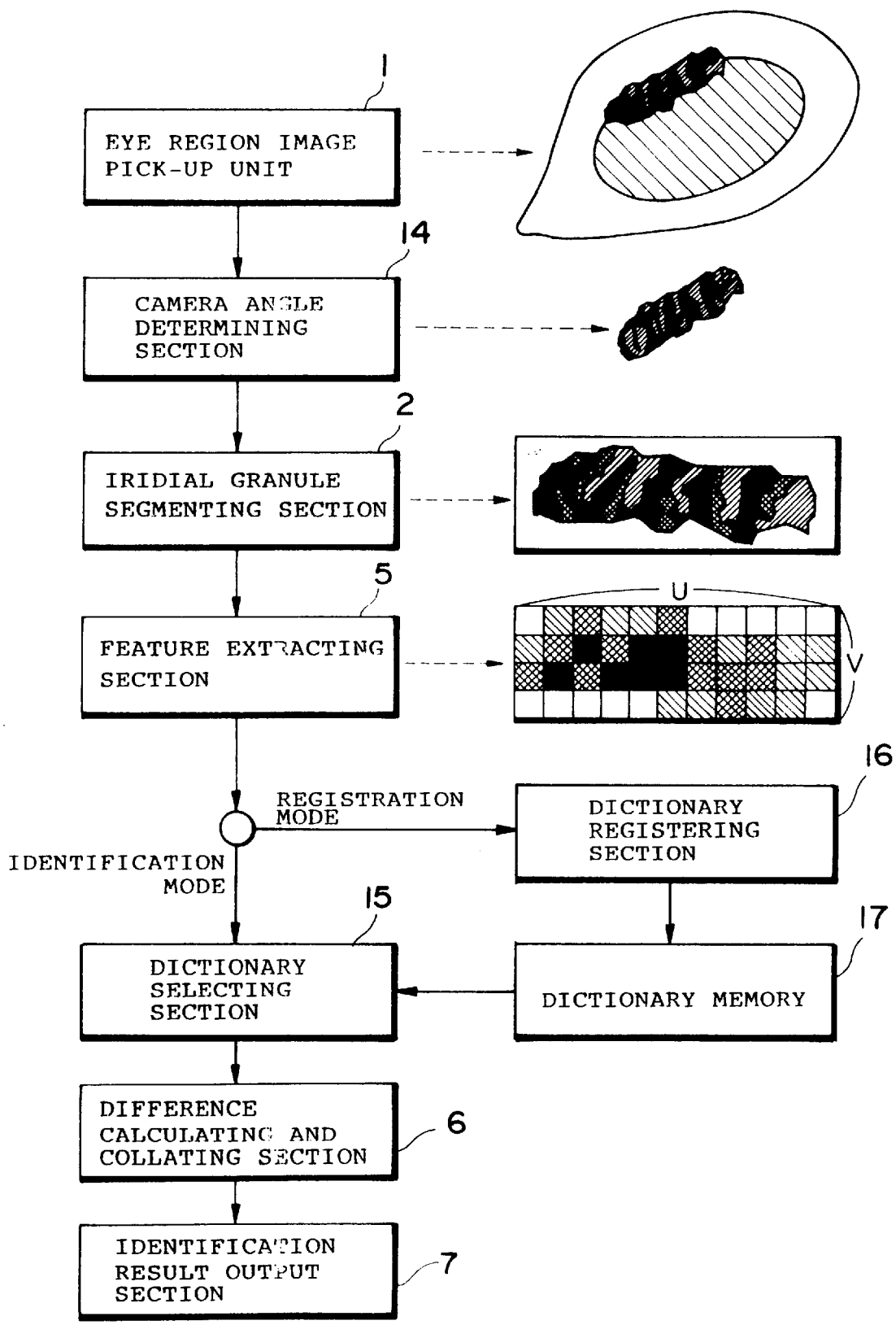
FIG. 15 is a block diagram of an individual animal identification apparatus in a third embodiment.

As shown in FIG. 15, the apparatus comprises an eye region image pick-up unit 1, a camera angle determining section 14, an iridial granule segmenting section 2, a feature extracting section 5, a dictionary selecting section 15, a difference calculating and collating section 6, an identification result output section 7, a dictionary registering section 16 and a dictionary memory 17. The apparatus has two operation modes to be selectively set, that is, "registration mode" for registering feature data of the iridial granule 12 shown in FIG. 2 and corresponding ID information, and "identification mode" for identifying a horse by comparing an input image with the registered feature data.

The eye region image pick-up unit 1 comprises an image input portion, a CCD video camera for example, and an illumination unit, and captures an image of a horse's eye in the form of a signal. Specifically, the image input portion captures an image of a horse's eye with a camera, and coverts analog optical information about the image of the horse's eye into a digital electric signal using a CCD sensor. The illumination unit incorporates a light source for emitting light of a wavelength which is hard for animals to sense, such as red light, near infrared light or infrared light, so as to capture a contrastful image of a horse's eye without causing the horse to be dazzled by the light to make a sudden movement.

The camera angle determining section 14 measures camera angles of the camera relative to the horse's eye upon capturing an image thereof. The camera angles may be measured in various ways. In this embodiment, a range finder is used as one example. The range finder measures distances between the camera and portions on the surface of the iris 11 shown in FIG. 2 and determines camera angles based on a positional relationship between the camera and the iris 11. The determined camera angles are used for a selection process at the dictionary selecting section 15 in "identification mode" and for a registration process at the dictionary registering section 16 in "registration mode".

The iridial granule segmenting section 2, upon receiving a general image of a horse's eye from the eye region image pick-up unit 1, detects the upper and lower fringes of a region of the iridial granule 12 in the received image, and segments only the iridial granule region.

The feature extracting section 5 extracts and encodes the feature of the iridial granule region to derive iridial granule feature data. The coded iridial granule feature data is registered in the dictionary memory 17 along with ID information representing a corresponding horse's name and a left or right eye in "registration mode". On the other hand, in "identification mode", the coded iridial granule feature data is transferred to the difference calculating and collating section 6 to be used for collation with the dictionary data registered in the dictionary memory 17. The ID information and the iridial granule feature data registered in the dictionary memory 17 constitute "dictionary".

The dictionary selecting section 15 receives the camera angle data from the camera angle determining section 14 and selects the dictionary data with the corresponding camera angle data in the dictionary memory 17.

The difference calculating and collating section 6 collates the dictionary data selected at the dictionary selecting section 15 with the iridial granule feature data from the feature extracting section 5 to thereby determine the identity of the horse.

The identification result output section 7 receives the output results from the difference calculating and collating section 6, and displays or prints out the ID information, i.e. a name or the like, of the identified horse.

The dictionary registering section 16 registers the ID information of the horse and the corresponding iridial granule feature data into the dictionary memory 17. In this process, based on the camera angle data received from the camera angle determining section 14, the iridial granule feature data is classified and registered per camera angle data.

Accordingly, in the dictionary memory 17, the ID information and the iridial granule feature data of each horse are stored being classified per camera angle data.

<Operation of Embodiment 3>

First, the operation of the camera angle determining section 14 will be described with reference to FIG. 16.

Figure 16:
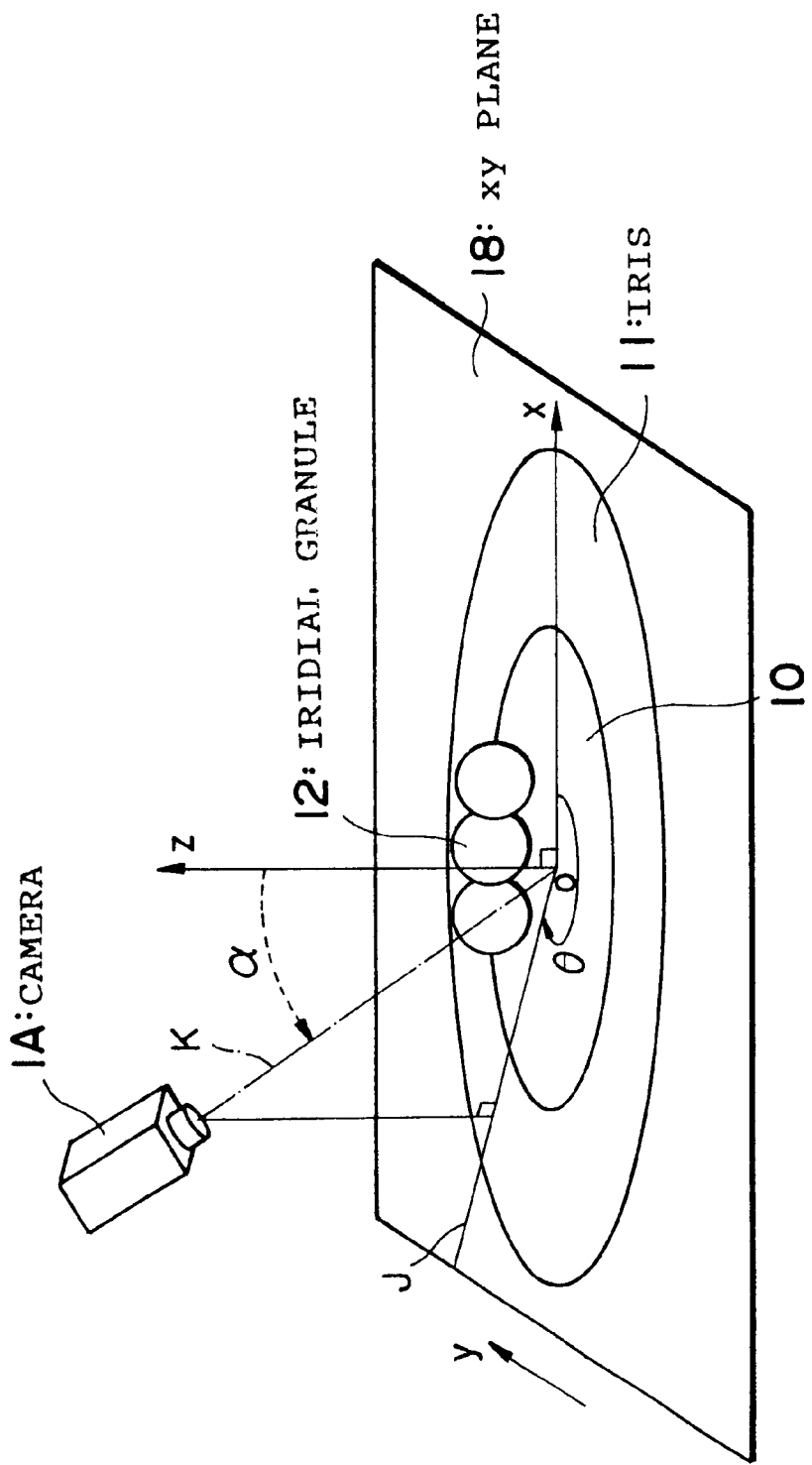
FIG. 16 is a diagram for explaining camera angles relative to a horse's eye upon capturing an image thereof.

FIG. 16 is a diagram for explaining camera angles of a camera 1A relative to a horse's eye upon capturing an image thereof, using a three dimensional coordinate system.

In the figure, the iris 11, the iridial granule 12, the camera 1A and the xy plane 18 are shown. Since the shape of the iris 11 is approximately flat, the plane of the iris 11 is superposed on the xy plane 18 and the origin is matched with the center of the iris, that is, the pupil center o. In the figure, camera angles of the camera 1A are determined by a rotation angle $\theta$ between an x-axis and an axis J on the xy plane 18 advancing from the center o in a direction to the camera 1A which direction is orthogonally projected onto the xy plane 18, and an angle a between a z-axis advancing from the center o in the vertical direction and an axis K advancing from the center o to the camera 1A. The camera angle determining section 14 derives these angles $\theta$ and $\alpha$. Hereinbelow, an angle deriving method using a distance image of the iris surface obtained by a range finder will be explained. However, the present invention is not limited to this angle deriving method.

As is well known, the range finder is a camera which can numerically express a distance to an object. Thus, when an eye is the object, the range finder can derive distances from the camera 1A to portions of the iris 11 and the pupil 10 per pixel unit. If these pixel values are two-valued using a threshold value, the iris and the pupil can be distinguished from each other. This is because the distances to the pupil are measured as distances to the retina located deeper than the iris. Assuming space having three axes representing horizontal-vertical components and a distance value component of the distance image of the iris 11, a three dimensional positional relationship of the iris 11 to the camera 1A is determined and, by applying this to the foregoing figure (FIG. 16), the angles $\alpha$ and $\theta$ can be derived through a coordinate transformation. Accordingly, by providing the range finder in addition to the CCD camera, the camera angles $\alpha$ and $\theta$ can be derived. The derived camera angles are used at the dictionary registering section 16 in "registration mode" and at the dictionary selecting section 15 in "identification mode".

Figure 4:
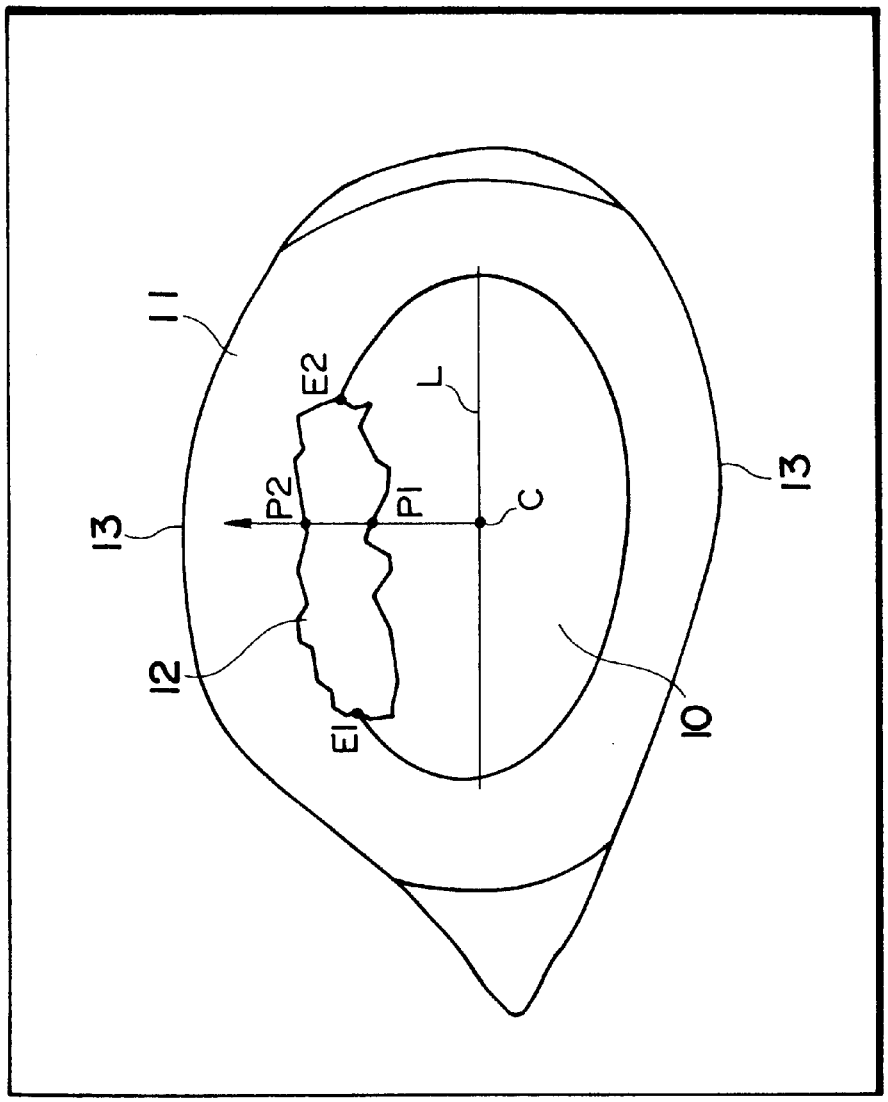
FIG. 4 is an explanatory diagram of an operation of an iridial granule segmenting section.

Then, like in the first embodiment as shown in FIG. 4, the iridial granule segmenting section 2 segments the iridial granule 12 by deriving the contour thereof.

Then, like in the first embodiment as shown in FIG. 9, the feature extracting section 5 divides the iridial granule region into subdivisions, derives a mean value of pixel densities of each subdivision, and outputs feature data in the form of U×V condensed image data with pixels each having the mean density value of the corresponding subdivision.

Now, operations of the dictionary selecting section 15 and the dictionary memory 17 will be described with reference to FIG. 17.

FIG. 17 is a structural diagram in the form of a table showing an example of a data storing format of the dictionary memory 17.

At columns of the table, ID information of horses and feature data of iridial granules are stored. As shown in FIG. 17, the dictionary memory 17 stores the feature data of the iridial granule of each horse as being classified per camera angles. The dictionary selecting section 15 shown in FIG. 15 receives the camera angles $\alpha$ and $\theta$ from the camera angle determining section 14 and selects in the dictionary memory 17 the dictionary data (feature data) classified to the camera angles which are the closest to the camera angles received from the camera angle determining section 14. This makes it possible to reduce an error caused by a difference in camera angle which occurs upon collation of the three dimensional iridial granule.

<Identification Mode>

Now, operations of the difference calculating and collating section 6 and the identification result output section 7 will be described.

Although various difference calculating methods may be applied to the present invention, one of them will be explained as an example, wherein a mean difference of pixel density values is derived as representing a difference degree. Specifically, the difference calculating and collating section 6 receives the feature data of the iridial granule from the feature extracting section 5 and further receives the selected registered feature data from the dictionary selecting section 15, sums up differences between pixel density values of both feature data with respect to all the pixels, and derives a mean difference value as a difference degree by dividing the sum by the number of the pixels of the feature data. If there is only one registered feature data whose difference degree is smaller than a threshold value, the difference calculating and collating section 6 outputs ID information of a corresponding horse to the identification result output section 7 as an identification result.

The identification result output section 7 is an output device including a display, a printer or the like and, if there is no feature data or more than one feature data whose difference degree is small than the threshold value, displays or prints out a reject indication for the reason that there is no registered horse corresponding to the input image. As described above, based on existence of individual differences in size, shape and wrinkle of the iridial granules and utilizing the fact that a difference degree relative to a correct horse dictionary is smaller than a difference degree relative to a wrong horse dictionary, both can be distinguished by setting a proper difference degree threshold value.

<Registration Mode>

Upon registration, images of a horse's eye to be registered are repeatedly captured at various camera angles which may include camera angles in "identification mode", by rotating the camera 1A about the horse's eye.

Since subsequent operations of the eye region image pick-up unit 1 through the feature extracting section 5 in "registration mode" are the same as those in "identification mode", explanation thereof will be omitted. In "registration mode", the dictionary registering section 16 carries out a registration process for registering the feature data of the iridial granule corresponding to the camera angles in the dictionary memory 17. Specifically, in "registration mode", a plurality of feature data and ID information of a corresponding horse are stored in the dictionary memory 17 as being classified per camera angles α and θ as shown in FIG. 17.

As appreciated, if no ID information of an input horse is found in the dictionary memory 17, ID information of the input horse is newly registered in the ID column and the foregoing registration process is carried out.

<Effects of Embodiment 3>

The third embodiment offers the following effects:

Since the individual animal identification apparatus includes the camera angle determining section 14, the dictionary registering section 16, the dictionary selecting section 15 and the dictionary memory 17 classified per camera angles and since the dictionary registering section 16 receives the camera angles from the camera angle determining section 14 and registers the feature data of the iridial granule per camera angles in the dictionary memory 17, even if an image of a horse's eye to be identified can not be captured at given camera angles, the identification of a horse can be achieved with high accuracy.

<Embodiment 4>

The individual animal identification apparatus in the third embodiment is provided with the camera angle determining section 14 including the range finder as a principal component. However, the apparatus becomes costly when the input means other than the eye region image pick-up unit 1, such as the range finder, is used. In view of this, in the fourth embodiment, there is provided an individual animal identification apparatus which is capable of achieving reliable collation without providing the camera angle determining section even if camera angles relative to the three dimensional iridial granule change.

The principle of this embodiment is that, in "registration mode", a plurality of feature images of an iridial granule are captured at various camera angles for dictionary preparation, and the representative feature data with large difference degrees to each other are automatically selected from among them by clustering to obtain dictionary data. In "identification mode", collation with all the dictionary data is carried out with respect to all classes, and ID information of a class to which dictionary data with the smallest difference degree belongs is outputted. In this specification, a class represents a set belonging to one of right and left eyes of the same horse.

Figure 18:
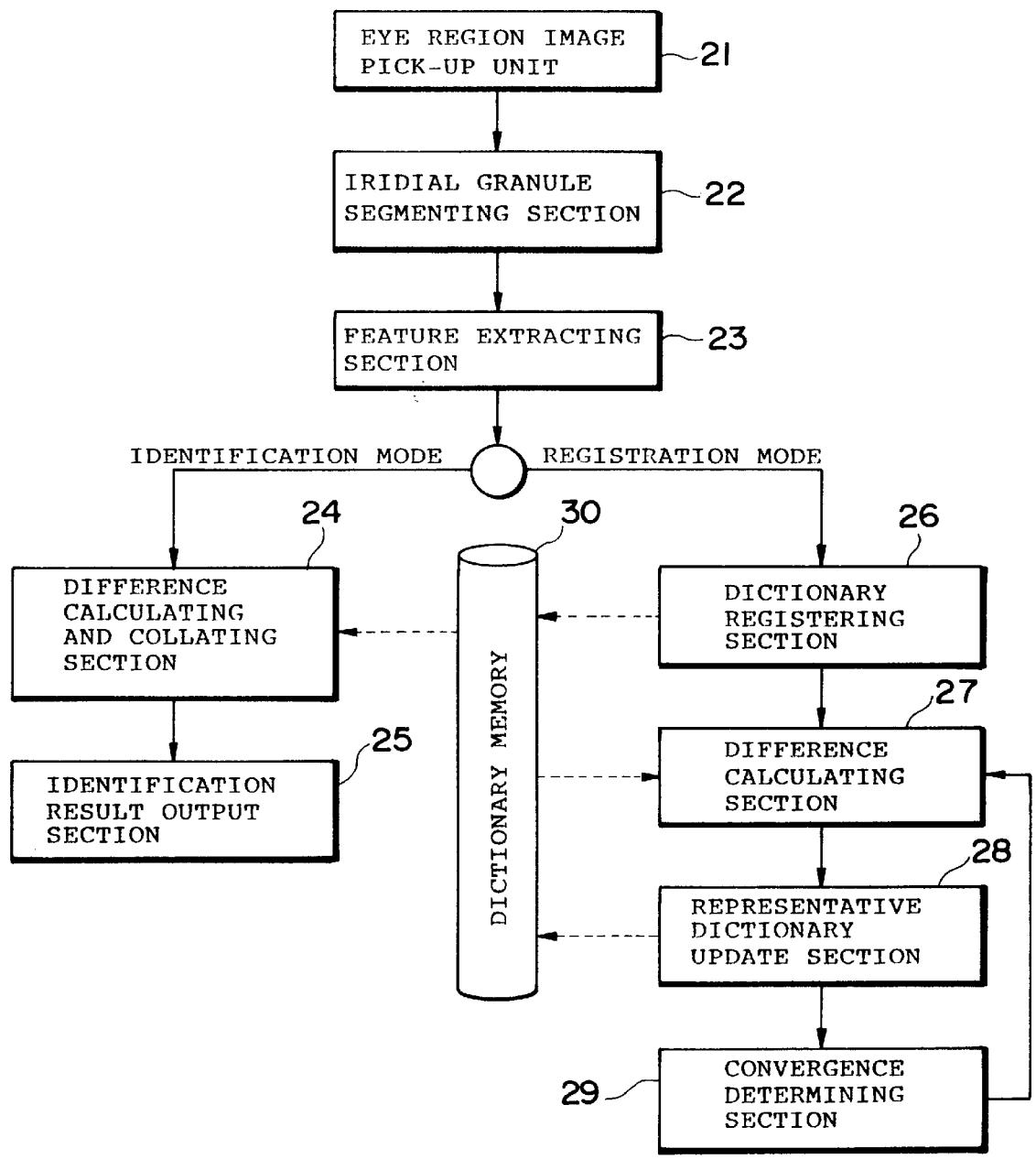
FIG. 18 is a block diagram of an individual animal identification apparatus in a fourth embodiment.

FIG. 18 is a block diagram showing a structure of the apparatus according to this embodiment.

As shown in FIG. 18, the apparatus comprises an eye region image pick-up unit 21, an iridial granule segmenting section 22, a feature extracting section 23, a difference calculating and collating section 24, an identification result output section 25, a dictionary registering section 26, a difference calculating section 27, a representative dictionary update section 28, a convergence determining section 29 and a dictionary memory 30. Among them, the eye region image pick-up unit 21, the iridial granule segmenting section 22, the feature extracting section 23 and the dictionary memory 30 are used both in "identification mode" and "registration mode". On other hand, the difference calculating and collating section 24 and the identification result output section 25 are used only in "identification mode", while the dictionary registering section 26, the difference calculating section 27, the representative dictionary update section 28 and the convergence determining section 29 are used only in "registration mode". This embodiment is particularly characterized in that the difference calculating section 27, the representative dictionary update section 28 and the convergence determining section 29 are provided in "registration mode".

Hereinbelow, the foregoing sections will be described in detail.

Like in the first embodiment, the eye region image pick-up unit 21 comprises an image input portion, a CCD video camera for example, and an illumination unit, and captures an image of a horse's eye in the form of a signal. Specifically, the image input portion captures an image of a horse's eye with a camera, and coverts analog optical information about the image of the horse's eye into a digital electric signal using a CCD sensor. The illumination unit incorporates a light source for emitting light of a wavelength which is hard for animals to sense, such as red light, near infrared light or infrared light, so as to capture a contrastful image of a horse's eye without causing the horse to be dazzled by the light to make a sudden movement.

Also like in the first embodiment, the iridial granule segmenting section 22, upon receiving a general image of a horse's eye from the eye region image pick-up unit 21, detects the upper and lower fringes of a region of the iridial granule 12 in the received image, and segments only the iridial granule region.

The feature extracting section 23 extracts and encodes the feature of the iridial granule region to derive iridial granule feature data. The coded iridial granule feature data is registered in the dictionary memory 30 along with ID information representing a corresponding horse's name and a left or right eye in "registration mode". On the other hand, in "identification mode", the coded iridial granule feature data is transferred to the difference calculating and collating section 24 to be used for collation with the dictionary data registered in the dictionary memory 30. The ID information and the iridial granule feature data registered in the dictionary memory 30 constitute "dictionary".

The difference calculating and collating section 24 collates all the dictionary data in the dictionary memory 30 with the iridial granule feature data from the feature extracting section 23 to thereby determine the identity of the horse.

The identification result output section 25 receives the output results from the difference calculating and collating section 24, and displays or prints out the ID information, i.e. a name or the like, of the identified horse.

The dictionary registering section 26 registers the ID information of the horse and the corresponding iridial granule feature data into the dictionary memory 30. In this embodiment, "registration mode" is carried out using a plurality of dictionary preparing images. Specifically, a plurality of dictionary preparing images captured relative to one horse are subjected to processes up to the feature extracting section 23 so as to obtain feature data thereof, respectively, and then the dictionary registering section 26 stores the feature data in order into the dictionary memory 30. After registering all the feature data into the dictionary memory 30, a clustering process subsequent to the difference calculating section 27 is carried out. For carrying out the clustering process, the dictionary registering section 26 further includes a function of determining completion of registration of all the dictionary data and a function of determining initial representative dictionary data for clustering.

The difference calculating section 27 derives difference degrees between representative dictionary data and all the other feature data among all the feature data stored in the dictionary memory 30 by the dictionary registering section 26.

The representative dictionary update section 28 derives new representative dictionary data based on the difference degrees derived at the difference calculating section 27, and updates the previous representative dictionary data stored in the dictionary memory 30.

The convergence determining section 29 performs determination on convergence in repetition processes until determination of representative dictionary data.

FIG. 19 is a structural diagram of the dictionary memory 30.

As shown in FIG. 19, the dictionary memory 30 comprises columns of ID information, iridial granule feature data, representative dictionary mark and history mark. In "registration mode", the dictionary memory 30 temporarily stores the iridial granule feature data for dictionary preparation, and further stores the dictionary data selected therefrom by clustering. Clustering is executed for registering in the dictionary memory 30 a plurality of proper representative feature data selected from numbers of image data captured at various conditions relative to one horse. The registered dictionary data are used at the difference calculating and collating section 24 in "identification mode".

<Operation of Embodiment 4>

The operation of this embodiment will be described with reference to FIG. 18. This embodiment also has "identification mode" and "registration mode", and is particularly characterized by "registration mode". Hereinbelow, "identification mode" will be first described. Since operations of the eye region image pick-up section 21, the iridial granule segmenting section 22 and the feature extracting section 23 are the same as those of the eye region image pick-up section 1, the iridial granule segmenting section 2 and the feature extracting section 5 in the first embodiment, explanation thereof will be omitted.

Operations of the difference calculating and collating section 24 and the identification result output section 25 will be described. The difference calculating and collating section 24 collates the feature data received from the feature extracting section 23 with the dictionary data of all the classes, each class having a plurality of the dictionary data, stored in the dictionary memory 30. Thus, assuming that each class has K dictionary data, the number of the dictionary data for collation becomes K times as compared with the first embodiment. Although various difference calculating methods may be applied to the present invention, one of them will be explained as an example, wherein a mean difference of pixel density values is derived as representing a difference degree. Specifically, the difference calculating and collating section 24 receives the feature data of the iridial granule from the feature extracting section 23 and reads in the dictionary data (feature data) from the dictionary memory 30, sums up differences between pixel density values of both feature data with respect to all the pixels, and derives a mean difference value as a difference degree by dividing the sum by the number of the pixels of the feature data. If there is only one dictionary data whose difference degree is smaller than a threshold value, the difference calculating and collating section 24 outputs ID information of a corresponding horse to the identification result output section 25 as an identification result.

The identification result output section 25 is an output device including a display, a printer or the like and, if there is no dictionary data or more than one dictionary data whose difference degree is small than the threshold value, displays or prints out a reject indication for the reason that there is no registered horse corresponding to the input image. As described above, based on existence of individual differences in size, shape and wrinkle of the iridial granules and utilizing the fact that a difference degree relative to a correct horse dictionary is smaller than a difference degree relative to a wrong horse dictionary, the identification of a horse can be achieved by setting a proper difference degree threshold value.

<Registration Mode>

Now, "registration mode" will be described.

As described before, since the iridial granule 12 has a three dimensional shape, the third embodiment is required to hold the iridial granule feature data at various camera angles as the dictionary data for ensuring reliable identification of a horse irrespective of camera angles. In the fourth embodiment, however, the dictionary data at various camera angles can be prepared without using the camera angle determining section.

In this embodiment, numbers of iridial granule feature data captured by variously changing camera angles are stored in the dictionary memory 30 for dictionary preparation. A difference degree between two feature data becomes smaller as their camera angles become closer to each other, and thus increases as their camera angles differ largely. This embodiment pays attention thereto. In this embodiment, the feature data are classified into different camera angle groups by clustering, and the representative feature data is selected from each of the groups and stored in the dictionary memory 30 as dictionary data. Clustering is defined as classifying into a plurality of groups based on properties of their own. Some methods are available for clustering, and in this embodiment, a dictionary preparing operation using the K-mean method will be described.

Hereinafter, the dictionary data selected from the feature data and used in "identification mode" will be referred to as "representative dictionary data" so as to be distinguished from others.

The dictionary registering section 26 registers ID information of a horse and corresponding iridial granule feature data into the dictionary memory 30. Since the clustering is carried out relative to numbers of feature data of an iridial granule of the same class extracted at the feature extracting section 23, the dictionary registering section 26 temporarily stores all the feature data belonging to the same class into the dictionary memory 30.

As shown in FIG. 19, when new feature data is inputted, the dictionary memory 30 registers the inputted feature data relative to the same ID information by changing a line. For enhancing the accuracy of the dictionary data, it is preferable that images of the same horse's eye are captured under as many conditions as possible so as to obtain numbers of feature data. After determining that all the feature data for dictionary preparation have been stored, the dictionary registering section 26 selects at random K initial representative dictionary data from among all the stored feature data. The selected representative dictionary data are given representative dictionary marks in the dictionary memory 30, respectively, so as to be distinguished from the other feature data. For example, as shown in FIG. 19, "1" is assigned in case of representative dictionary data, while "0" is assigned otherwise. Since the K-mean method carried out by the difference calculating section 27, the representative dictionary update section 28 and the convergence determining section 29 performs repetition processes about dictionary data selection, the dictionary memory 30 is provided, in addition to the column of representative dictionary mark, with the column of history mark for indicating whether or not the data was representative dictionary data in the last process. The history mark is used in the convergence determining section 29.

The difference calculating section 27 uses all the dictionary data stored in the dictionary memory 30 and calculates difference degrees with respect to all distance combinations between the representative dictionary data and all the other dictionary data, respectively. For deriving the difference degree, various methods may be applied, for example, the method of deriving the mean difference of pixel density values as described with respect to the difference calculating and collating section 24 in "identification mode".

Figure 20:
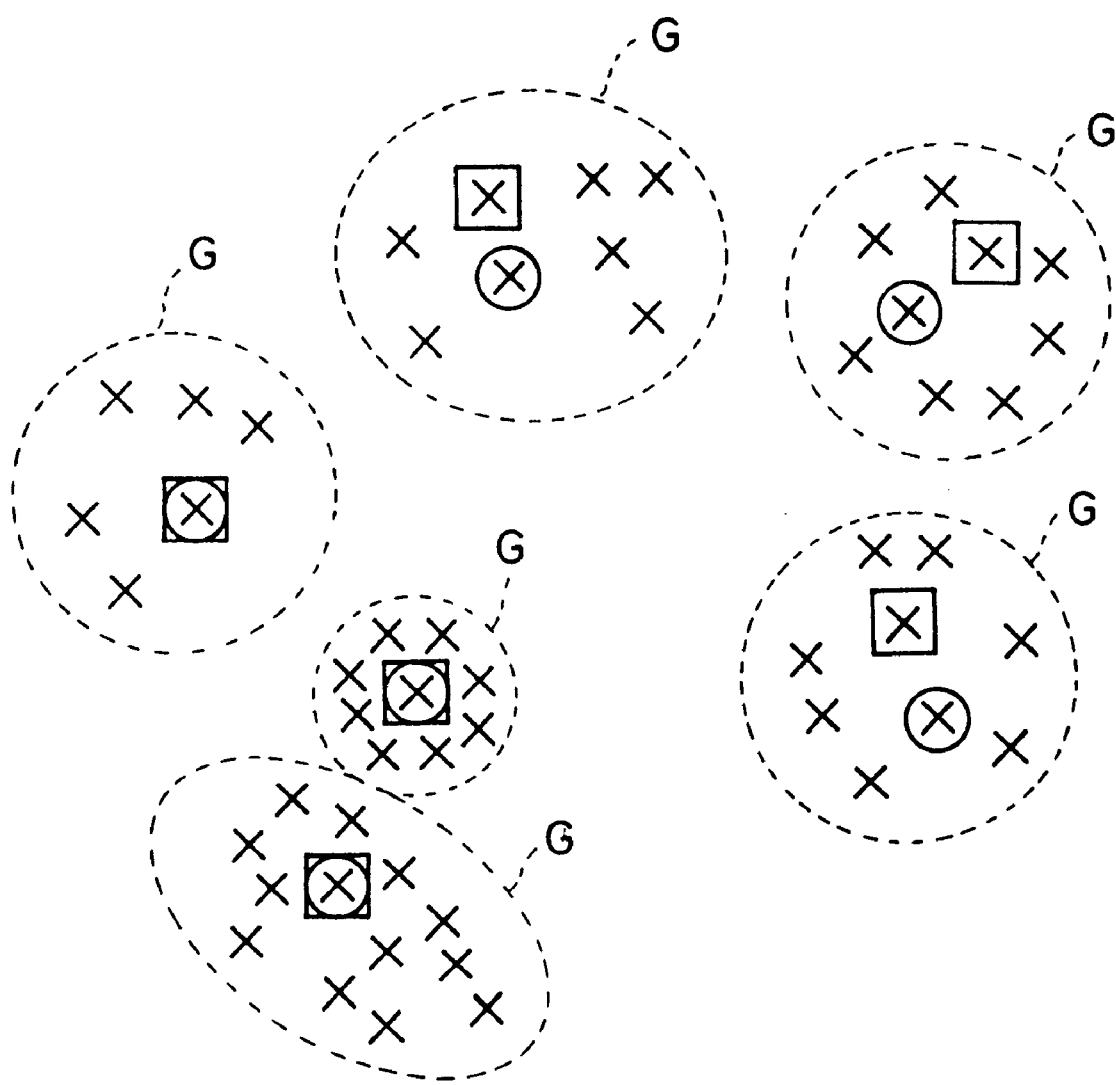
FIG. 20 is an explanatory diagram of an operation of a representative dictionary update section.

FIG. 20 is a diagram for explaining an operation of the representative dictionary update section 28.

In FIG. 20, numbers of the feature data identified by x have been obtained by variously changing conditions, such as camera angles or illumination. Among them, encircled x represent the representative dictionary data selected at random.

Based on the difference degree of each of the feature data relative to each of the representative dictionary data derived at the difference calculating section 27, the representative dictionary update section 28 forms K groups G each including one representative dictionary data and a plurality of the feature data having the smallest difference degrees relative to the representative dictionary data in the same group. In the figure, each group is identified by a circle of broken line. The representative dictionary update section 28 uses the feature data to derive mean feature data for each of the groups G. The mean feature data has pixels each having a mean value of the corresponding pixels of the respective feature data. The representative dictionary update section 28 calculates again distances between the mean feature data and all the feature data and selects the closest feature data as new representative dictionary data. The new representative dictionary data is identified by a square in each group. After determining the new representative dictionary data as described above, the representative dictionary update section 28 deletes the representative dictionary mark "1" of the old representative dictionary data and inserts "1" in the history mark column thereof in the dictionary memory 30. Then, "1" is inserted in the representative dictionary mark column of the new representative dictionary data.

Finally, the convergence determining section 29 checks whether there is the representative dictionary data having "1" in both the representative dictionary mark column and the history mark column. If all K representative dictionary data have "1" in both the representative dictionary mark column and the history mark column, this means that the selected representative dictionary data have not been changed. Thus, the repetition is finished as being determined that the selection process has converged. If otherwise, the processes of the difference calculating section 27 and the representative dictionary update section 28 are repeated until the selection process converges. After the convergence is achieved, the feature data other than the representative dictionary data are deleted for saving the storage area of the dictionary memory 30.

In this manner, a plurality of the representative dictionary data are provided relative to one horse, and the identification of a horse is carried out like in the first embodiment.

<Effects of Embodiment 4>

The fourth embodiment offers the following effects:

1. Since the individual animal identification apparatus includes the difference calculating section 27, the representative dictionary update section 28 and the convergence determining section 29, it is possible to register, in the dictionary memory 30, the representative dictionary data obtained under various image pick-up conditions irrespective of camera angles. Accordingly, upon identification, the reliable collation free of influence of variation of the three dimensional iridial granule due to camera angles can be achieved through collation with those representative dictionary data.

2. Since information itself about image pick-up conditions, such as camera angles or illumination, is not used in the dictionary registering process, the image pick-up unit can be simple in structure and the data processing is also facilitated.

<Embodiment 5>

The individual animal identification apparatus according to the fourth embodiment has the merit of being able to omit the camera angle determining section 14 (see FIG. 15) of the third embodiment using the clustering in selecting camera angles upon the dictionary registration. However, in the fourth embodiment, it is necessary to collate one feature data with a plurality of representative dictionary data upon identification. Thus, although there is no problem upon dealing with a small number of horses for collation, when dealing with a large number of horses, the number of dictionary data becomes enormous so that it takes much time for the identification process. For example, assuming that the number of classes (corresponding to the number of horses) is C and the number of dictionary data for each class to be derived by the K-mean method is K, the number of dictionary data upon collation becomes C in the third embodiment, while KC in the fourth embodiment. Thus, when dealing with a large number of horses, for example, when C=50 and K=20, the number of collation data becomes 50 in the third embodiment, while as many as 1,000 in the fourth embodiment.

In order to carry out the collation of such a large number of dictionary data at high speed for ensuring user's convenience, the apparatus should have a high throughput, resulting in high production cost. In view of this, for solving the problem upon dealing with a large number of horses for collation, the fifth embodiment aims to provide an individual animal identification apparatus wherein the number of dictionary data for collation is as many as that in the third embodiment without using the camera angle determining section.

The principle of this embodiment is that, for carrying out the reliable collation relative to the image pick-up conditions, such as variation in camera angle, the collation between an object and dictionary data is performed by limiting collation regions only to those regions which are free of influence of variation of the three dimensional iridial granule due to camera angles or the like. Specifically, each class has one dictionary data limited to those identification regions which are free of influence even when camera angles or the like are changed upon registration, and difference degrees are derived with respect to only those regions upon identification.

Figure 21:
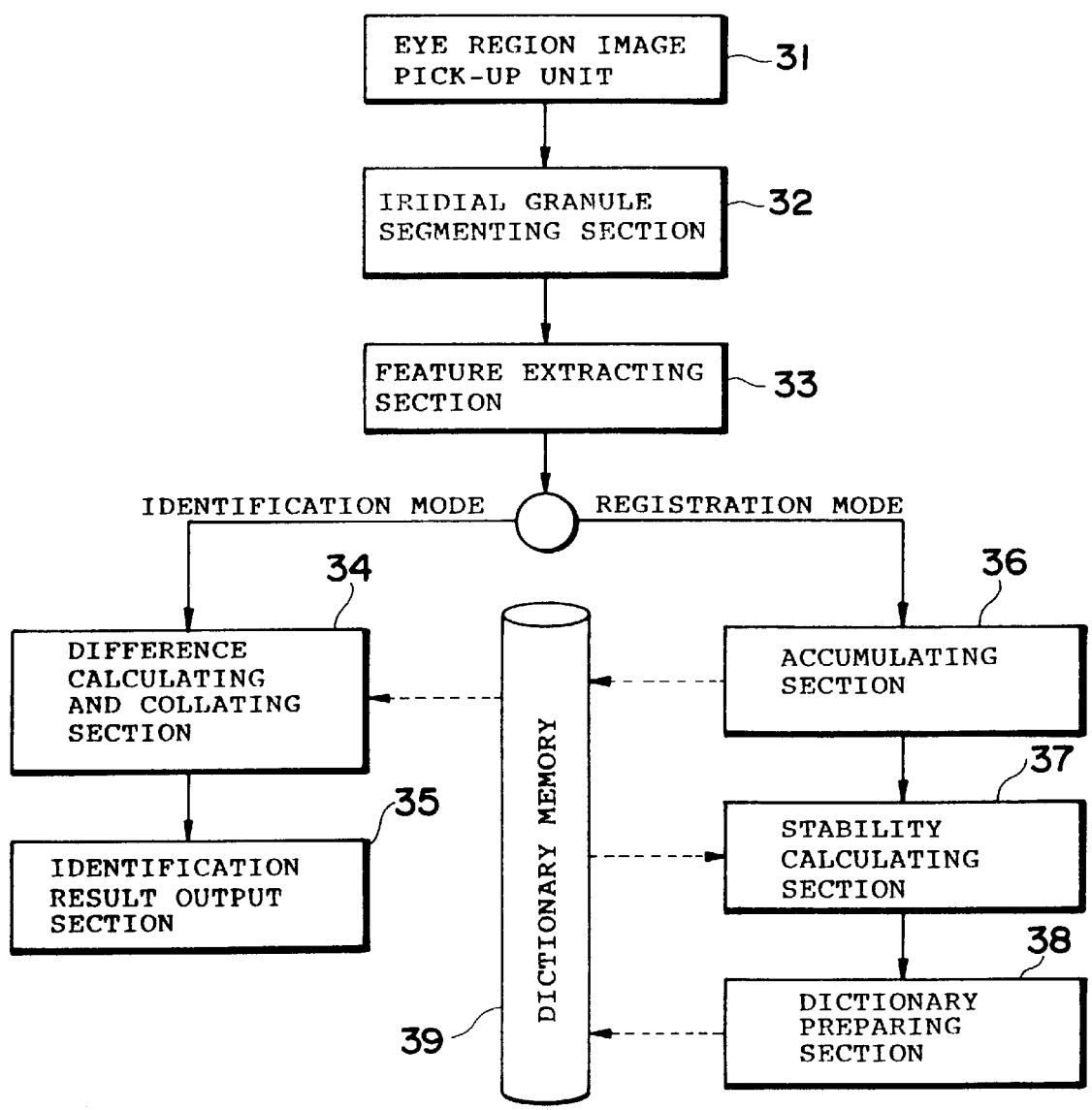
FIG. 21 is a block diagram of an individual animal identification apparatus in a fifth embodiment.

FIG. 21 is a block diagram showing a structure of the apparatus according to this embodiment.

As shown in FIG. 21, the apparatus comprises an eye region image pick-up unit 31, an iridial granule segmenting section 32, a feature extracting section 33, a difference calculating and collating section 34, an identification result output section 35, an accumulating section 36, a stability calculating section 37, a dictionary preparing section 38 and a dictionary memory 39. Among them, the eye region image pick-up unit 31, the iridial granule segmenting section 32, the feature extracting section 33 and the dictionary memory 39 are used both in "identification mode" and "registration mode". On other hand, the difference calculating and collating section 34 and the identification result output section 35 are used only in "identification mode", while the accumulating section 36, the stability calculating section 37 and the dictionary preparing section 38 are used only in "registration mode". This embodiment is particularly characterized in that the accumulating section 36, the stability calculating section 37 and the dictionary preparing section 38 are provided in "registration mode".

Hereinbelow, the foregoing sections will be described in detail.

Structures of the eye region image pick-up unit 31 and the iridial granule segmenting section 32 are the same as those in the foregoing second embodiment.

Coded iridial granule feature data outputted from the feature extracting section 33 is registered in the dictionary memory 39 along with ID information representing a corresponding horse's name and a left or right eye in "registration mode". On the other hand, in "identification mode", the coded iridial granule feature data is transferred to the difference calculating and collating section 34 to be used for collation with the dictionary data registered in the dictionary memory 39.

The difference calculating and collating section 34 collates all the dictionary data in the dictionary memory 39 with the iridial granule feature data from the feature extracting section 33 to thereby determine the identity of the horse.

The identification result output section 35 receives the output results from the difference calculating and collating section 34, and displays or prints out the ID information, i.e. a name or the like, of the identified horse.

The accumulating section 36 accumulates the iridial granule feature data per class and per pixel in the dictionary memory 39.

The stability calculating section 37 derives a stability per pixel based on a corresponding accumulated value received from the accumulating section 36.

The dictionary preparing section 38 selects pixels for collation based on the stabilities calculated at the stability calculating section 37 and obtains one dictionary data per class relevant to only those regions including the selected pixels.

The dictionary memory 39 stores the dictionary data derived in "registration mode" and offers the stored dictionary data to the difference calculating and collating section 34 in "identification mode".

The operation of this embodiment will be described with reference to FIG. 21. This embodiment also has "identification mode" and "registration mode", and is particularly characterized by "registration mode". Hereinbelow, "identification mode" will be first described. Since operations of the eye region image pick-up section 31, the iridial granule segmenting section 32 and the feature extracting section 33 are the same as those of the eye region image pick-up section 1, the iridial granule segmenting section 2 and the feature extracting section 5 in the first embodiment, explanation thereof will be omitted.

First, operations of the difference calculating and collating section 34 and the identification result output section 35 will be described.

In "identification mode", the difference calculating and collating section 34 receives the feature data from the feature extracting section 33, reads in one dictionary data per class from the dictionary memory 39 and carries out collation therebetween. Upon the collation, in this embodiment, difference degrees are calculated with respect to only those identification regions where pixel density values of the dictionary data are non-zero. Specifically, as described later, the dictionary data are registered in "registration mode" such that those regions largely influenced by camera angles are set to zero. Thus, the regions whose pixel density values are zero are not used in difference degree calculation. This ensures the reliable collation free of influence of camera angles. The mean density difference is used for representing the difference degree as explained in the foregoing embodiment.

Various kinds of values are applicable for representing the difference degree.

If there is only one dictionary data whose difference degree is smaller than a threshold value, the difference calculating and collating section 34 outputs ID information of a corresponding horse to the identification result output section 35. On the other hand, if there is no dictionary data or more than one dictionary data whose difference degree is small than the threshold value, the difference calculating and collating section 34 sends a reject indication to the identification result output section 35.

<Registration Mode>

Now, "registration mode" will be described.

In this embodiment, the collation between an object to be identified and the dictionary data is carried out by limiting identification regions only to those regions which are free of camera angles. Specifically, in "registration mode", iridial granule identification regions free of camera angles are selected from a plurality of feature data (sample images) provided for dictionary preparation so as to prepare the dictionary data. Operations of the respective sections will be described hereinbelow.

The accumulating section 36 accumulates the feature data, extracted at the feature extracting section 33, per pixel in the dictionary memory 39. Specifically, for deriving a mean value and a standard deviation per pixel, the sum and the sum of squares of pixel density values of all the samples are derived with respect to each pixel j in a class.

Assuming that the number of all pixels is K and pixel density values of sample number k (k=1, ... , K) are represented by xkij, the sum Vij and the sum of squares Sij per pixel are given by the following equations:

$$Vij = \Sigma \times kij \quad (16)$$

$$Sij = \Sigma x^2 kij \quad (17)$$

wherein each $\Sigma$ represents the sum in the range of k=1 to K and i=1 to I.

Then, the stability calculating section 37 derives a mean density value $\mu ij$ and a standard deviation $\sigma ij$ per pixel using the sum Vij and the sum of squares Sij accumulated in the dictionary memory 39, and further derives a stability Tij per pixel using them, which are given by:

$$\mu ij = Vij/K \quad (18)$$

$$\sigma = \sqrt{Sij/K - \mu^2 ij} \quad (19)$$

$$Tij = \sigma ij/\mu ij \quad (20)$$

In this manner, the stability Tij is derived.

When the identification regions are determined based on the stabilities Tij calculated at the stability calculating section 37, the dictionary preparing section 38 prepares the dictionary data. In the equation (20), the standard deviation representing irregularities per pixel is corrected by the mean density value, and a larger value of Tij represents larger fluctuation due to environmental change. Accordingly, in this embodiment, only those pixels whose Tij are not greater than a threshold value are determined to be the identification regions. The dictionary preparing section 38 produces regional feature data using the mean density value $\mu ij$ per pixel in the identification regions. With this arrangement, since the identification is limited only to those regions essentially free of influence of camera angles or the like, the camera angle determining section is not required, and further, the number of dictionary data for collation becomes one per class. Thus, the identification result can be shown to a user for a short time.

Figure 22:
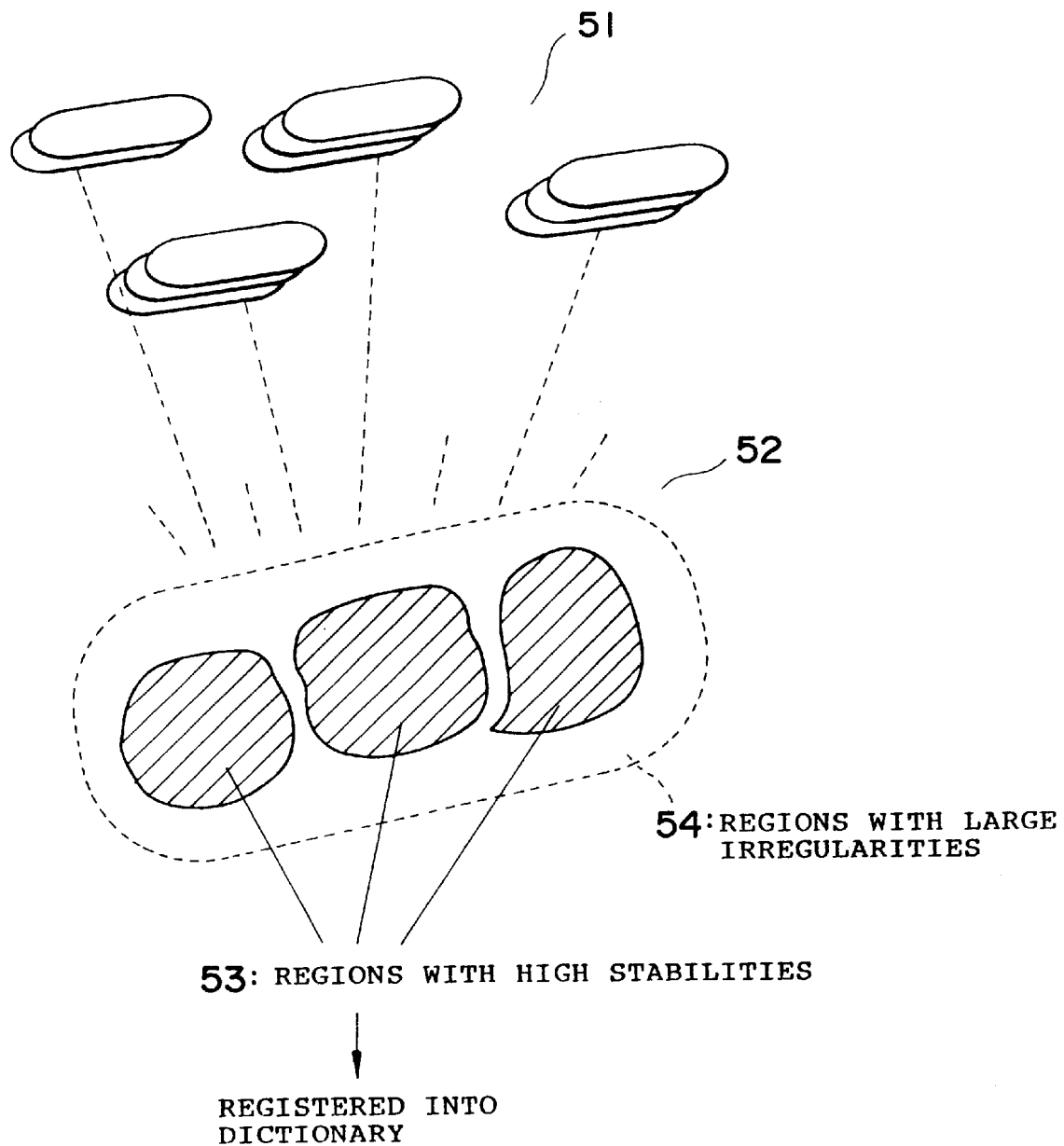
FIG. 22 is an explanatory diagram of an operation of a stability calculating section in the fifth embodiment.

FIG. 22 is a diagram for explaining the operation of the stability calculating section 37 in this embodiment.

As shown in the figure, the foregoing stability calculation is carried out relative to numbers of feature data (sample images) 51 obtained from images of an eye of one horse. As a result, mean pixel values $\mu ij$ of hatched identification regions 53 whose stabilities are high are registered in the dictionary memory 39 as regional feature data. In other words, in the whole image surrounded by a broken line, those pixels in regions 54 where irregularities are large are excluded from the subject of identification.

<Effects of Embodiment 5>

The fifth embodiment offers the following effects:

1. Since the individual animal identification apparatus is provided with the accumulating section 36, the stability calculating section 37 and the dictionary preparing section 38, the identification regions of the feature data essentially free of the camera angles or other image pick-up conditions can be prepared as the dictionary data so that the accurate identification result can be achieved.

2. Since the number of dictionary data for collation becomes one per class, the high-speed identification can be ensured.

<Embodiment 6>

In an individual animal identification apparatus according to this embodiment, the contour and its frequency components of an iridial granule of each of horses are registered and used for collation.

Figure 23:
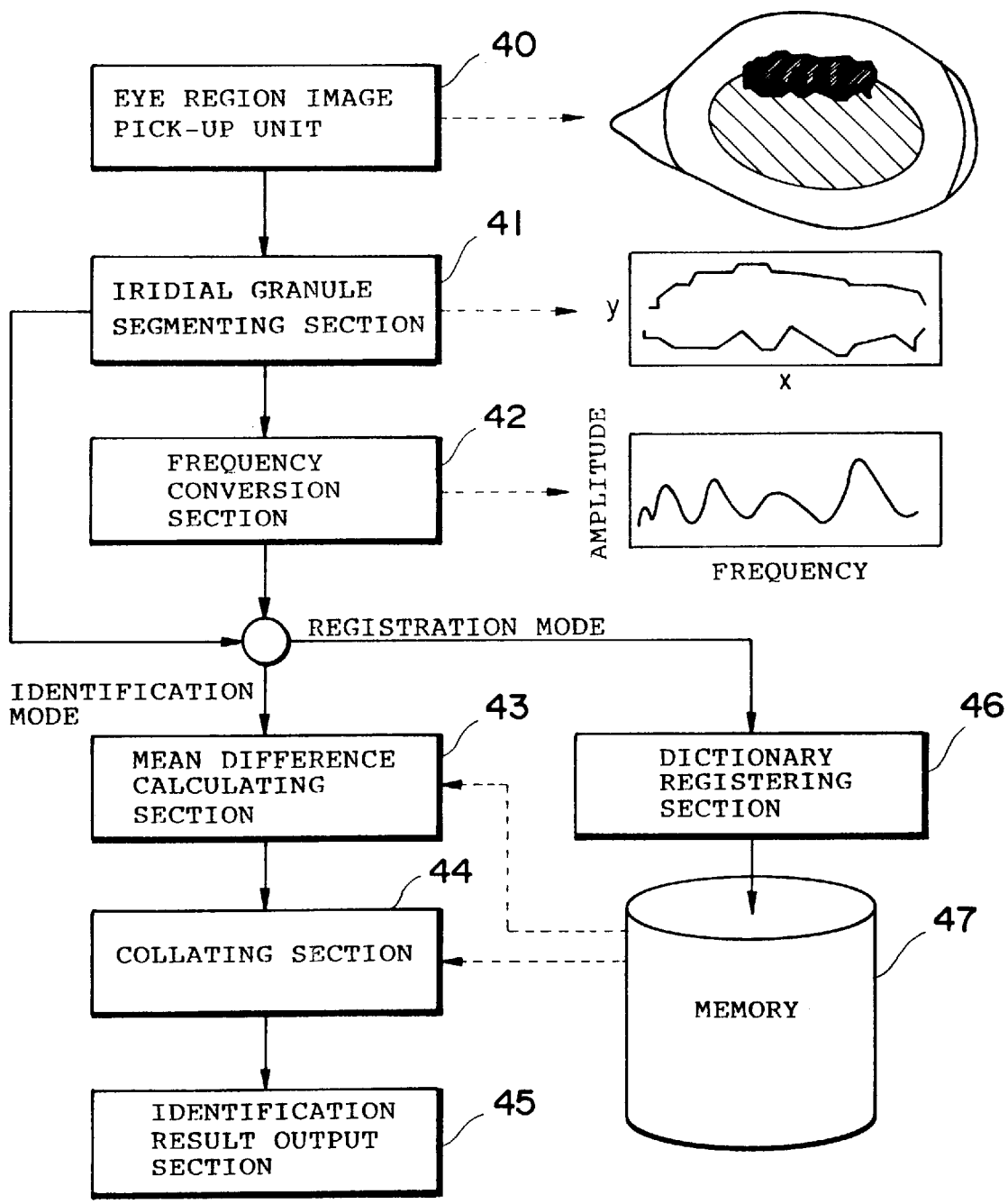
FIG. 23 is a block diagram of an individual animal identification apparatus in a sixth embodiment.

FIG. 23 is a block diagram showing a structure of the apparatus according to this embodiment.

As shown in FIG. 23, the apparatus comprises an eye region image pick-up unit 40, an iridial granule segmenting section 41, a frequency conversion section 42, a mean difference calculating section 43, a collating section 44, an identification result output section 45, a dictionary registering section 46 and a memory 47.

The eye region image pick-up unit 40 and the iridial granule segmenting section 41 have the same structures as those in the foregoing embodiments.

The frequency conversion section 42 has a function of performing the Fourier transformation and converts contour data of the iridial granule 12 into frequency amplitude data.

The mean difference calculating section 43 has a dictionary data reading function, a difference calculating function and an accumulating function, and compares the contour data and the frequency data with those of the dictionary data to derive mean differences therebetween, respectively.

The collating section 44 has a mean difference comparing function and a dictionary attribute data reading function, and selects the dictionary data having the smallest value among the mean differences relative to all the dictionary data derived at the mean difference calculating section 43 and reads out an attribute of a corresponding horse from the memory 47.

The identification result output section 45 is in the form of an output device including a display, a printer or the like, and outputs the attribute of the horse, i.e. the output result of the collating section 44, to a user.

The dictionary registering section 46 has a dictionary data/attribute registering function, and registers the contour data and the frequency data derived at the iridial granule segmenting section 41 and the frequency conversion section 42 into the memory 47 along with attribute data of a corresponding horse.

The memory 47 comprises a recording medium, such as a hard disk or a tape, a recording head and a control circuit, and has functions of storing the attribute data of a horse and the contour data and its frequency data of the iridial granule 12 and further offering those stored data upon identification.

<Operation of Embodiment 6>

The apparatus in this embodiment also carries out "registration mode" and "identification mode" selectively.

The eye region image pick-up unit 40, the iridial granule segmenting section 41, the frequency conversion section 42 and the memory 47 are used both in "registration mode" and "identification mode". On other hand, the dictionary registering section 46 is used only in "registration mode", while the mean difference calculating section 43, the collating section 44 and the identification result output section 45 are used only in "identification mode".

When an input image obtained at the eye region image pick-up unit 40 is inputted to the iridial granule segmenting section 41, the iridial granule segmenting section 41 derives the center of gravity C of the pupil region as shown in FIG. 4 and produces the mask image mxy as described before. Thus, the contour of the upper and lower fringes of the iridial granule 12 can be extracted to obtain the contour data.

The frequency conversion section 42 performs the Fourier transformation relative to the extracted contour data to accomplish frequency conversion so as to derive amplitude components at the respective frequencies. This is carried out for stressing only particularly effective components among the frequency components of the contour so as to enhance effects of the identification. It also aims to remove high-frequency noise components so as to ensure the reliable collation. Since the contour data is considered to have a waveform containing various frequency components, a relationship between frequencies and amplitudes can be shown as an output waveform of the frequency conversion section 42 in FIG. 23.

FIG. 24 is an explanatory diagram of calculation executed at the frequency conversion section 42 and the mean difference calculating section 43.

Assuming that a point sequence of the contour data extracted at the iridial granule segmenting section 41 is plotted along an x-axis in order as $x_i(i=1, \ldots, N-1, N$: range of points) and the contour data is subjected to the Fourier transformation using an equation (b) in FIG. 24, frequency components $X_k(k=1, \ldots, N-1)$ and amplitude components Ak thereof are given by equations (a) and (c) in FIG. 24. In the equation (c), R and I represent a real part and an imaginary part of Xk, respectively.

The amplitude components $A_k$ thus obtained are given to the mean difference calculating section 43 in "identification mode" and to the dictionary registering section 46 in "registration mode".

The mean difference calculating section 43 uses both the contour data obtained from the iridial granule segmenting section 41 and the frequency data obtained from the frequency conversion section 42 and calculates mean difference values between those data and all the dictionary data read out from the memory 47, respectively.

Figure 25:
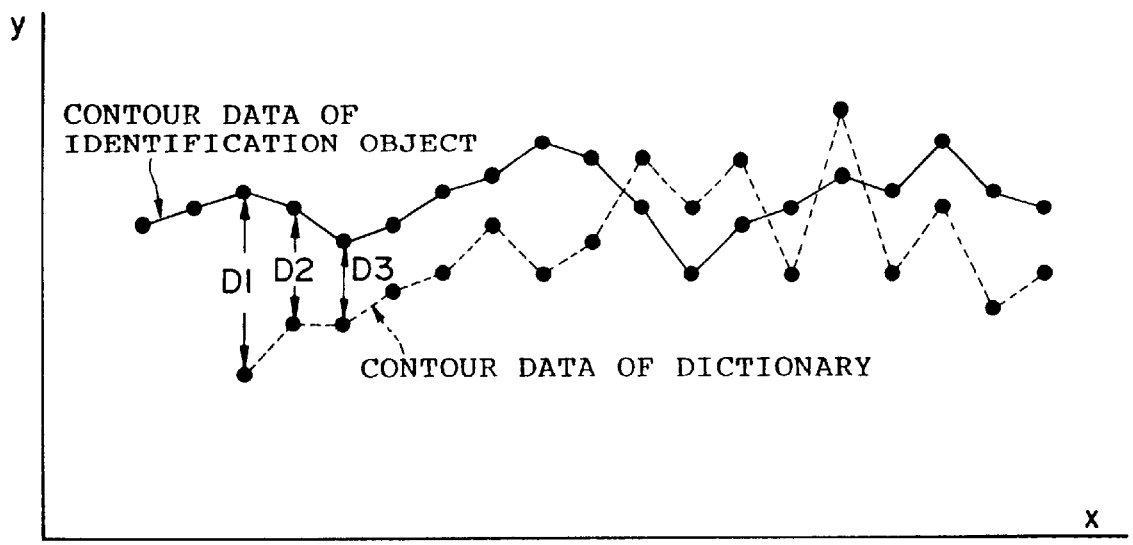
FIG. 25 is an explanatory diagram of a mean difference calculating method in the sixth embodiment.

FIG. 25 is an explanatory diagram of a mean difference calculating method.

Each point of the contour data is defined by an x-coordinate and a y-coordinate, and each point of the frequency data can be defined by a frequency and an amplitude value. Both data differ in kind, but are common in that they are both discrete point sequences. Thus, the same calculation method is used for deriving the mean difference values with respect to the contour data and the frequency data. Accordingly, although the calculation method for the contour data will be explained with reference to FIG. 25, the same calculation method is applicable to the frequency data for deriving the mean difference value.

FIG. 25 shows two kinds of data sequences representing "contour data of identification object" and "contour data of dictionary", respectively. In the figure, an x-axis represents coordinate values of an axis of abscissa of an image, while a y-axis represents coordinate values of an axis of ordinate of the image. Since the extracted iridial granule contour has been derived with respect to successive pixels on the coordinates, correspondence between points of the identification object contour data and the dictionary contour data can be achieved with respect to the x-coordinate. Accordingly, difference values can be derived between points on the same x-coordinates, respectively, in order of D1, D2, D3—as shown in FIG. 25. A mean value of these difference values is set to be a difference degree between the identification object contour data and the dictionary contour data. On the other hand, since lengths of iridial granules differ depending on individuals, start points and/or end points thereof do not necessarily fall on the same x-coordinates, respectively. In this case, it is arranged that only those points having common x-coordinates constitute a comparison region.

Specifically, assuming that y-coordinate values of the contour points of the identification object data are set to $f_i$ ($i=1, \ldots, N_f$; $N_f$ represents the number of the contour points of the identification object), y-coordinate values of the contour points of the dictionary data are set to $g_i$ ($i=1, \ldots, N_g$; $N_g$ represents the number of the contour points of the dictionary data), an x-coordinate value of the contour points of the dictionary data relative to the contour points of the identification object data is set to m, and the number of points having common x-coordinates (comparison region) is set to M, a mean difference value D is given by an equation (d) in FIG. 24.

For carrying out the difference calculation more effectively for the identification, the comparison region M may be properly limited in advance. For example, as described before, the high-frequency components may be removed from the comparison region M for eliminating the noise components.

When mean difference values are derived with respect to all the dictionary data, a mean difference data sequence $D_k$ ($k=1, \ldots, K$: K represents the number of dictionary data) is obtained. As appreciated, a mean difference data sequence $E_k$ ($k=1, \ldots, K$: K represents the number of dictionary data) of the frequency data can also be obtained in the same manner.

The collating section 44 selects the smallest values among $D_k$ and $E_k$, respectively, and identifies the corresponding dictionary data, respectively. Then, only when those smallest values (smallest difference degrees) are not greater than predetermined threshold values, the collating section 44 reads out the corresponding attribute data from the memory 47. Then, only when the read-out attribute data agree with each other for the contour data and the frequency data, the attribute data is sent to the identification result output section 45 as determining that the identification object horse has been identified as a registered horse. On the other hand, if at least one of the smallest difference degrees is greater than the corresponding threshold value, or if the read-out attribute data disagree with each other, the collating section 44 notifies the identification result output section 45 that the identification object horse is not a registered horse.

The identification result output section 45 displays or prints out the identification result.

The foregoing is the explanation of the operation of "identification mode" in this embodiment.

Now, "registration mode" in this embodiment will be described.

It is necessary for a user to capture an image of a horse's eye so as to register dictionary data into the memory 47. The operations up to the frequency conversion section 42 are the same as those in "identification mode". The dictionary registering section 46 receives contour data and frequency data from the iridial granule segmenting section 41 and the frequency conversion section 42, respectively, and registers those data into the memory 47 as dictionary data along with attribute data of the horse. The attribute data includes information about name, age, blood, case history, indication of right or left eye and the like, which is inputted by the user.

<Effects of Embodiment 6>

The sixth embodiment offers the following effects:

1. By using the contour data and the frequency data of the iridial granule, the reliable individual identification can be achieved without being influenced by difference in illumination angle or difference in brightness of an image.
2. By using the frequency components corresponding to the contour of the iridial granule, the frequency components with much noise can be removed and, by using only such a frequency band where an individual difference is distinctly reflected, the stable and accurate individual identification can be carried out.

<Embodiment 7>

In the foregoing sixth embodiment, explanation has been made to the individual animal identification apparatus using the contour of the iridial granule 12. In an individual animal identification apparatus according to this embodiment, a position of the center of gravity of the iridial granule 12 relative to the pupil 10 is registered in advance as an identification feature and used for collation.

Depending on individuals, the iridial granules differ not only in shape and pattern, but also in position thereof on the boundary between the elliptic iris and pupil. Therefore, by using positional information of the iridial granule as an identification feature, the individual identification can be achieved. In this embodiment, for example, a position of the center of gravity of the iridial granule is used as positional information. Since the positional information can be formed only by coordinate values of one point, the reduction in dictionary size and the speed-up of collation process can be achieved so that it is particularly effective for an apparatus for large-scale individual identification. As described later, however, there is a problem that an error tends to be caused upon calculation of the center of gravity of the iridial granule due to an influence of shadow of the iridial granule caused by illumination.

The problem caused by the shadow of the iridial granule will be explained with reference to FIG. 26.

Figure 26:
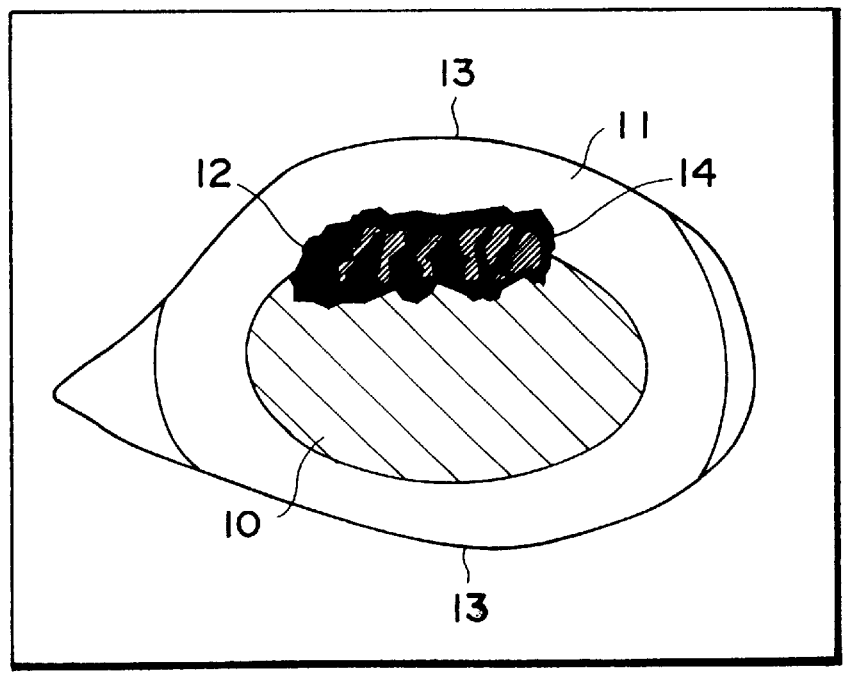
FIG. 26 is an explanatory diagram of a shadow of an iridial granule.

FIG. 26 is an explanatory diagram of the shadow of the iridial granule. Since the iridial granule 12 has a three dimensional rising shape, when a horse's eye is illuminated from below, a shadow 14 is generated at an upper side of the iridial granule 12. The shadow 14 renders indistinct the contour of the upper fringe of the iridial granule 12. As a result, it is possible that the upper fringe of the shadow 14, not the iridial granule 12, may be extracted as representing the contour. If the upper fringe of the shadow 14 is extracted, the position of the iridial granule 12 is miscalculated to cause misidentification.

In this embodiment, a shadow removing section is provided for overcoming such a problem. Hereinbelow, a structure of this embodiment will be described.

<Structure>

Figure 27:
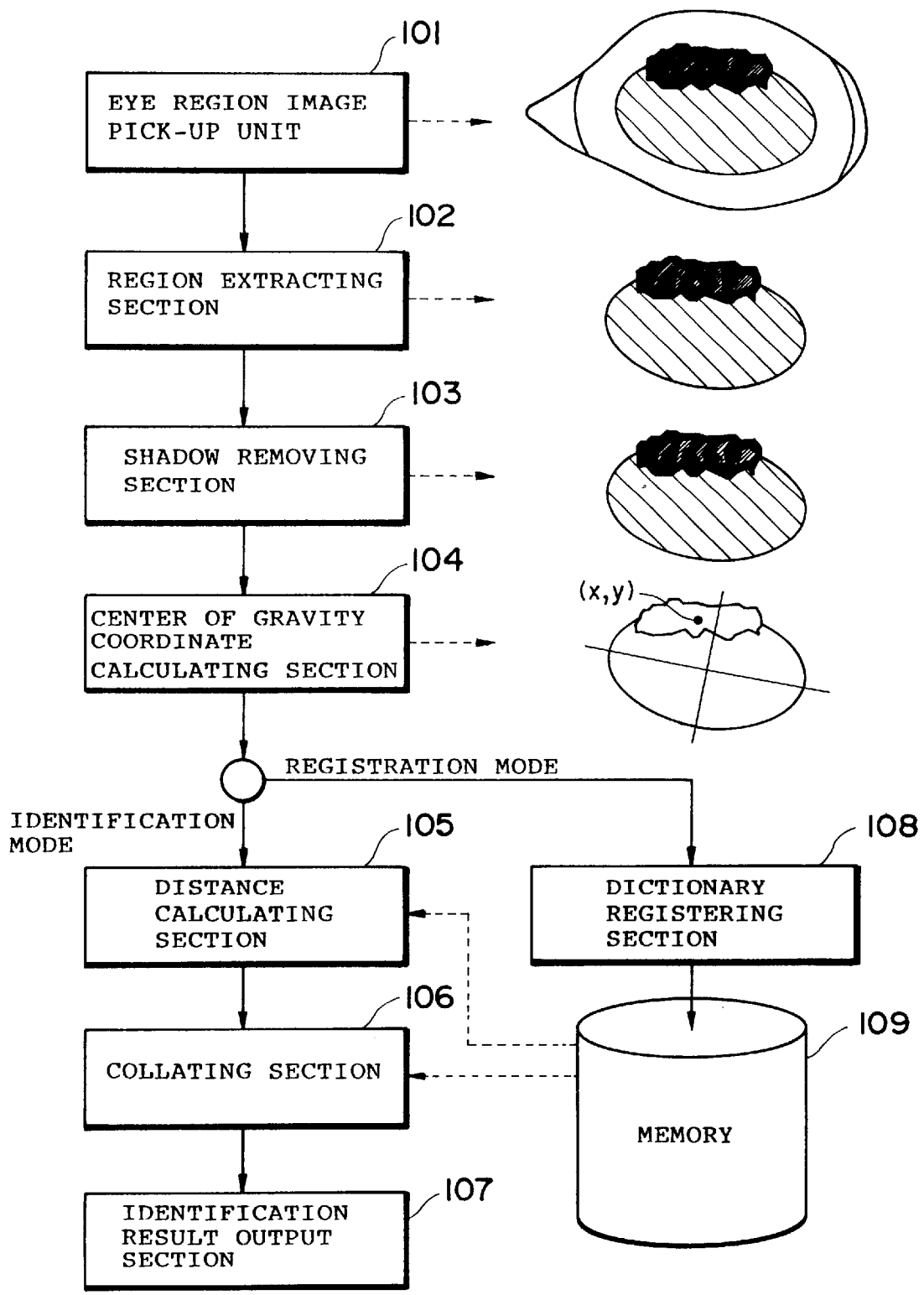
FIG. 27 is a block diagram of an individual animal identification apparatus in a seventh embodiment.

FIG. 27 is a structural diagram showing the individual animal identification apparatus according to this embodiment.

As shown in the figure, the apparatus comprises an eye region image pick-up unit 101, a region extracting section 102, a shadow removing section 103, a center of gravity coordinate calculating section 104, a distance calculating section 105, a collating section 106, an identification result output section 107, a dictionary registering section 108 and a memory 109. Structures of the respective sections will be described in detail.

As in the foregoing embodiments, the eye region image pick-up unit 101 converts an image of a horse's eye into an electric signal to output an input image.

As in the sixth embodiment, the region extracting section 102 extracts the contour of the iridial granule 12 and further determines coordinate axes of the pupil. The coordinate axes are in the form of the horizontal and vertical axes of the pupil which are used as the reference when the region extracting section 102 determines coordinates of the center of gravity of the iridial granule 12.

The shadow removing section 103 has functions of accumulating pixel values on the contour and comparing accumulated values, and removes the shadow 14 of the iridial granule 12.

The center of gravity coordinate calculating section 104 has a coordinate transforming function and carries out transformation of a coordinate system based on position coordinates of the iridial granule 12 and the pupil coordinate axes.

The distance calculating section 105 has a dictionary data reading function and a distance calculating function, and compares position data of the iridial granule to be identified (identification object) with a plurality of dictionary data to derive distances therebetween, respectively.

The collating section 106 has a distance comparing function and a dictionary attribute data reading function, and derives dictionary data whose distance to the identification object is the smallest and reads out attribute data of a corresponding horse from the memory 109.

The identification result output section 107 is in the form of a display or printer and outputs attribute data of the horse, i.e. the output result of the collating section 106, to a user.

The dictionary registering section 108 has a dictionary data/dictionary attribute data registering function, and registers the position data obtained from the center of gravity coordinate calculating section 104 into the memory 109 along with the corresponding attribute data.

The memory 109 comprises a recording medium, such as a hard disk or a tape, a recording head and a control circuit, and has functions of storing the attribute data of a horse and the position data of the iridial granule 12 and further offering those stored data upon identification.

Figure 28:
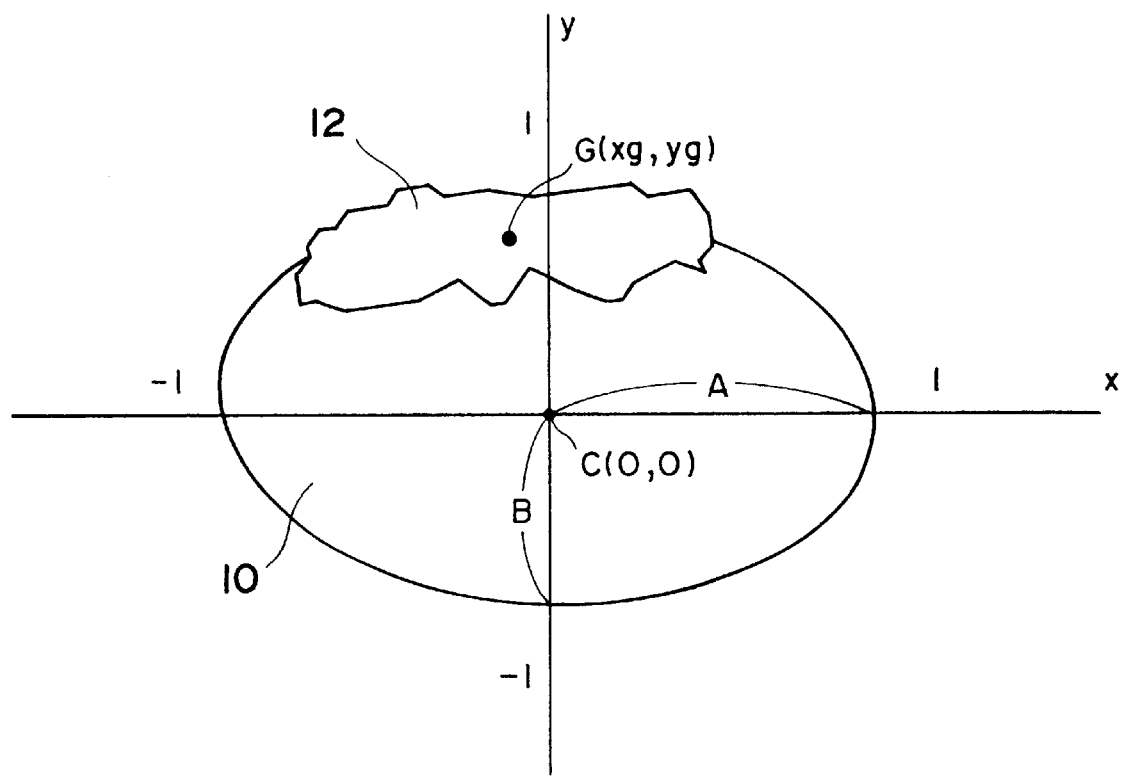
FIG. 28 is an explanatory diagram of an operation of a center of gravity coordinate calculating section in the seventh embodiment.

Now, the operation of the region extracting section 102 will be first described with reference to FIG. 28. Since the derivation of the pupil region and the contour of the iridial granule has been explained in the foregoing embodiments, explanation will be made only to an operation of determining the coordinate axes of the pupil.

The region extracting section 102 derives a horizontal axis and a vertical axis of the pupil for determining the coordinate axes. Specifically, for avoiding influence of the inclination of the eye and the opening degree of the pupil to the calculation of the center of gravity of the iridial granule, the horizontal and vertical axes are derived as the reference axes. The derived coordinate axes are given to the center of gravity coordinate calculating section 104.

The horizontal axis is arranged to coincide with a major axis of the elliptic pupil, while the vertical axis is arranged to coincide with a minor axis thereof. As one method of deriving a major axis direction from a region shape, a regression straight line is applied. Specifically, assuming that, on an image, coordinates of pixels are given by (x, y), the derived coordinates of the center of gravity of the pupil are given by C(xc, yc), a set of coordinates within the pupil region is given by Q, and the number of pixels is given by $N_Q$, a regression straight line y is expressed by equations (1) to (3) in FIG. 29.

In the equations (2) and (3), symbol $S_x^Q$ (in the figure, Q and x are aligned relative to $\Sigma$) means that the sum is derived with respect to only those pixels included in the region Q. Accordingly, the major axis is derived. Since the minor axis is a straight line perpendicular to the major axis and passing through the center of gravity, it can be expressed by a regression straight line y of an equation (4) in FIG. 29.

The foregoing is the operation of the region extracting section 102.

Now, the operation of the shadow removing section 103 will be described.

As described above, it is possible that the iridial granule region 12 derived by the region extracting section 102 may include the shadow 14 which is not preferable in view of the identification accuracy. Therefore, a region of the shadow is removed by the shadow removing section 103.

Specifically, attention has been paid to the fact that there is the darkest region of an upper fringe contour shape in the region of the shadow 14 just above the iridial granule 12, and thus, by shifting the erroneously detected upper fringe contour of the shadow to the darkest region, the influence of the shadow is removed.

Figures 29, 30:
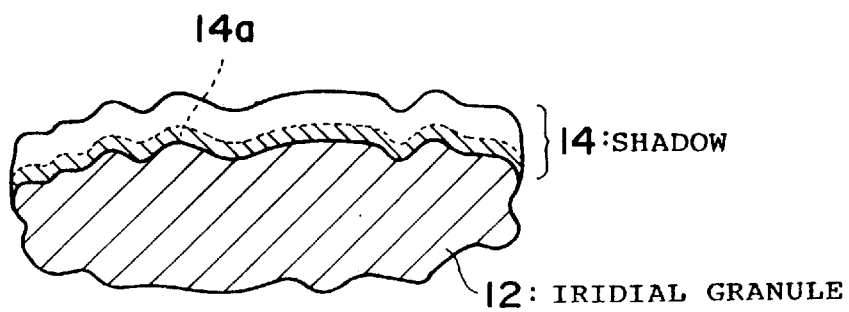
FIG. 29 is an explanatory diagram of calculation executed at a region extracting section through a distance calculating section in the seventh embodiment.
FIG. 30 is an explanatory diagram of a region subjected to an influence of shadow.

FIG. 30 is an explanatory diagram of the darkest region 14a in the shadow 14.

As shown in the figure, in the region of the shadow 14, there exists the darkest region 14a along the upper outer fringe of the iridial granule 12. Accordingly, the region 14a can be found by searching the position where an accumulated value of pixel values in the shadow region becomes the smallest. Specifically, assuming that a set of coordinates (x, y) on the upper fringe contour is given by L, pixel values of coordinates (x, y) are given by Pxy, and search displacement amounts are given by (u, v), an accumulated value R(u, v) is expressed by an equation (5) in FIG. 29.

In the equation (5), symbol $\Sigma_{x,y}^{L}$ (in the figure, L and x are aligned relative to $\Sigma$) means that the sum is derived only when coordinate values (x, y) are on the contour. Accordingly, at the darkest region 14a, an accumulated value R(u, v) obtained by changing u, v in a certain range becomes the smallest. Thus, the contour added with displacement amounts (u, v) of the upper fringe contour of the shadow 14 becomes the contour of the iridial granule 12 after removal of the shadow 14. Therefore, the stable iridial granule region can be obtained with the corrected new contour. Specifically, the shadow removing section 103 feeds the correct contour data of the iridial granule region to the region extracting section 102. The region extracting section 102 again derives a position of the center of gravity of the iridial granule region.

Subsequently, the center of gravity coordinate calculating section 104 transforms coordinates of the center of gravity of the iridial granule 12 after removal of the shadow 14 into a coordinate system having as the center the center of gravity of the pupil extracted at the region extraction section 102. This will be explained with reference to FIG. 28. The coordinate transformation is carried out for normalization of the inclination of the eye and the size of the pupil.

It may also be arranged that the center of gravity coordinate calculating section 104 receives the new contour data from the shadow removing section 103 and corrects the position of the center of gravity of the iridial granule already received.

With respect to the inclination of the eye, the foregoing inclination of the pupil is corrected. With respect to the pupil size, as shown in FIG. 28, a scale is adjusted so that the pupil takes values of 1 and −1 on each of the x- and y-axes. Specifically, assuming that coordinates of the center of gravity of the iridial granule in the coordinate system before the transformation are given by ($X_G$, $Y_G$), coordinates C of the center of gravity of the pupil are given by ($X_C$, $Y_C$), a length of the pupil in the major axis direction is given by 2A, and a length of the pupil in the minor axis direction is given by 2B, coordinates (xg, yg) of the iridial granule 12 after the transformation are expressed by transform equations (6) to (8) in FIG. 29. As appreciated, after the transformation, coordinates of the center of gravity of the pupil fall on the origin, and widths of the pupil along the major and minor axes are both 2.

The center of gravity position information of the iridial granule thus obtained is registered in the memory 109 by the dictionary registering section 108 in "registration mode" and used for deriving a distance relative to the dictionary data at the distance calculating section 105 in "identification mode".

The distance calculating section 105 calculates a distance between the position data obtained from the region extracting section 102 and the dictionary data read out from the memory 109. In this embodiment, the Euclidean distance is used, but the present invention is not limited thereto. A Euclidean distance d between the center of gravity data (x1, y1) of the identification object and the dictionary data (x2, y2) can be derived by an equation (9) in FIG. 29. The distance calculating section 105 derives distances d with respect to all the dictionary data and feeds them to the subsequent collating section 106.

The collating section 106 derives the dictionary data whose distance (difference degree) is the smallest among the distances received from the distance calculating section 105. Only when the smallest difference degree is not greater than a predetermined threshold value, the collating section 106 reads out attribute data of a correspond horse from the memory 109 and sends it to the identification result output section 107. If the smallest difference degree is greater than the threshold value, the collating section 106 notifies the identification result output section 107 that the identification object horse is not registered.

The identification result output section 107 displays or prints out the identification result.

The foregoing is the explanation about the operation of this embodiment.

<Effects of Embodiment 7>

The seventh embodiment offers the following effects:

1. Since the individual identification is carried out using the center of gravity of the iridial granule, the reduction in dictionary size and the speed-up of collation process can be achieved so that it is effective for large-scale individual identification.
2. Since the coordinates of the center of gravity of the iridial granule are normalized based on the inclination and the size of the pupil, the stable identification free of the inclination or the opening degree of the pupil can be achieved.
3. Since the center of gravity of the iridial granule is derived after removal of the shadow, the stable identification not liable to influence of the illumination angle can be carried out.

In the seventh embodiment, the shadow is removed at the shadow removing section 103. Similarly, also in the sixth embodiment, it may be arranged that the contour of the iridial granule is derived after removing the shadow from the iridial granule region.

What is claimed is:

1. An individual animal identification apparatus comprising:

an eye region image pick-up unit for obtaining an input image by taking a picture of an eye, including an iridial granule in an iridial granule region, of an animal to be registered and identified;

a geometric normalizer for performing a coordinate transformation process to normalize said iridial granule by using a specified parameter to move said iridial granule region of the input image onto predetermined coordinates;

a feature extractor for extracting a feature of said normalized iridial granule;

a dictionary memory for registering feature data on features of iridial granule regions corresponding to animals to be registered, said data having been extracted by said feature extractor; and a collator for checking whether or not an animal to be identified has been registered by comparing data on said feature of said iridial granule region corresponding to the animal under identification, said feature having been extracted by said feature extractor, with said feature data registered in said dictionary memory.

2. An individual animal identification apparatus according to claim 1, wherein said geometric normalizer decides a center-of-gravity position of said iridial granule region as said parameter and performs said coordinate transformation process using said parameter.

3. An individual animal identification apparatus according to claim 2, wherein said geometric normalizer performs the coordinate transformation process by converting said center-of-gravity position to a predetermined coordinate position.

4. An individual animal identification apparatus according to claim 1, wherein said geometric normalizer decides an inclination of a principal component of said iridial granule region as said parameter and performs said coordinate transformation process by using said parameter.

5. An individual animal identification apparatus according to claim 4, wherein said geometric normalizer performs the coordinate transformation process by converting said inclination to a predetermined value.

6. An individual animal identification apparatus according to claim 1, wherein said geometric normalizer decides as a longitudinal dimension of said iridial granule region as said parameter and performs said coordinate transformation process by using said parameter.

7. An individual animal identification apparatus according to claim 6, wherein said geometric normalizer performs the coordinate transformation process by converting said longitudinal dimension to a predetermined value.

8. An individual animal identification apparatus according to claim 1, further comprising a density normalizer for calculating a mean value of the density of said iridial granule region in connection with the contrast, and normalizing the density of said iridial granule region on the basis of said mean value.

9. An individual animal identification apparatus according to claim 8, wherein said density normalizer calculates a standard deviation of the density of said iridial granule region by regarding said standard deviation as the contrast, and normalizes the density by using said standard deviation and said mean value.

10. An individual animal identification apparatus according to claim 1, wherein said feature extractor divides said iridial granule region into a plurality of subdivisions, converts said subdivisions into compressed regions each having a mean value of pixel densities, and uses density values of said compressed regions as data on said feature.

11. An individual animal identification apparatus according to claim 10, said collator performs an arithmetic operation on differences between the density values of the compressed regions extracted by said feature extractor and the density values of the compressed regions registered in said dictionary memory, and uses a obtained difference as a difference for identification of said animal.

12. An individual animal identification apparatus according to claim 11, wherein said collator calculates a mean density difference of said compressed regions by dividing the total sum of said density values by the number of said compressed regions, and uses a mean density difference as said difference.

13. An individual animal identification apparatus according to claim 1, further comprising at least one additional geometric normalizer, wherein said geometric normalizers respectively perform a coordinate transformation process on said iridial granule region by using a parameter which is different from the parameters used by the other normalizers.

14. An individual animal identification apparatus comprising:

an eye region image pick-up unit for capturing images of an eye, including an iridial granule in an iridial granule region, of an animal at a plurality of camera angles to obtain input images, said animal to be registered in a registration mode of the apparatus and to be identified in an identification mode of the apparatus;

a camera angle determining section for deriving data on said camera angles;

a feature extracting section for extracting a feature of said iridial granule region from said input images to derive corresponding feature data;

a dictionary memory for, in said registration mode, registering said feature data of the animal to be registered along with the corresponding camera angle data; and a collating section for, in said identification mode, collating the feature data of the animal to be identified, derived at said feature extracting section, with the feature data registered in said dictionary memory during said registration mode and having the camera angle data corresponding to the camera angle data of the feature data of the animal to be identified, so as to determine whether the animal to be identified is registered in said dictionary memory.

15. An individual animal identification apparatus comprising:

an eye region image pick-up unit for capturing images of an eye, including an iridial granule in an iridial granule region, of an animal to obtain input images, said animal to be registered in a registration mode of the apparatus and to be identified in an identification mode of the apparatus;

a feature extracting section for extracting a feature of said iridial granule region from said input images to derive corresponding feature data;

a data classifying means for, in said registration mode, classifying a plurality of the feature data, received from said feature extracting section, of the animal to be registered into a plurality of groups based on image pick-up conditions, respectively;

a representative dictionary setting means for, in said registration mode, determining representative feature data in each of said groups and registering in a dictionary memory said representative feature data determined in each of said groups; and a collating section for, in said identification mode, collating the feature data of the animal to be identified, derived at said feature extracting section, with each of said representative feature data registered in said dictionary memory during said registration mode, so as to determine whether the animal to be identified is registered in said dictionary memory.

16. An individual animal identification apparatus according to claim 15, wherein said data classifying means determines a plurality of temporary representative feature data among said plurality of the feature data received from said feature extracting section and classifies said plurality of the feature data into said groups each having one of said temporary representative feature data and those feature data having small difference degrees relative to said one of said temporary representative feature data.

17. An individual animal identification apparatus according to claim 15, wherein said representative dictionary setting means derives mean pixel values of the feature data in each of said groups and determines, as said representative feature data, the feature data having pixel values which are the closest to said mean pixel values.

18. An individual animal identification apparatus comprising:

an eye region image pick-up unit for capturing an image of an eye, including an iridial granule, in an iridial granule region of an animal to obtain an input image, said animal to be registered in a registration mode of the apparatus an to be identified in an identification mode of the apparatus;

a feature extracting section for extracting a feature of a region of said iridial granule region from said input image to derive corresponding feature data;

a region selecting means for, in said registration mode, selecting a stable identification region of said iridial granule based on a plurality of the feature data, received from said feature extracting section, of the animal to be registered;

a dictionary preparing means for, in said registration mode, producing regional feature data of said stable identification region and registering said regional feature data in a dictionary memory; and a collating section for, in said identification mode, collating the feature data on an identification region of the iridial granule of the animal to be identified, derived at said feature extracting section, with the regional feature data registered in said dictionary memory during said registration mode, so as to determine whether the animal to be identified is registered in said dictionary memory.

19. An individual animal identification apparatus comprising:

an eye region image pick-up unit for capturing an image of an eye, including an iridial granule, of an animal to obtain an input image, said animal to be registered in a registration mode of the apparatus and to be identified in an identification mode of the apparatus;

a position data output means for outputting position data representing a position of said iridial granule relative to a particular position in a region of said eye in said input image, said position data output means including a region extracting section for extracting a region of said iridial granule from said input image, deriving a position of the center of gravity of said iridial granule region as said position of said iridial granule and further deriving a position of the center of gravity of a pupil in said eye region as said particular position, a shadow removing section for accumulating pixel values along a contour of said iridial granule region extracted at said region extracting section, and determining a contour represented by an accumulated darkest pixel value to be a new contour of said iridial granule region, and a center of gravity coordinate calculating section for deriving a distance from the position of the center of gravity of said pupil to the position of the center of gravity of aid iridial granule region as said position data, said center of gravity coordinate calculating section correcting the position of the center of gravity of said iridial granule region corresponding to said new contour so as to derive said position data;

a memory section for, in said registration mode, registering said position data, received from said position data output means of the animal to be registered;

a distance calculating section for, in said identification mode, deriving a position difference between said position data, received form said position data output means, of the animal to be identified and each of a plurality of the position data registered in said memory section; and a collating section for, in said identification mode, selecting the registered position data whose position difference is the smallest and comparing the smallest position difference with a predetermined value, so as to determine whether the animal to be identified is registered in said memory section.

* * * * *